(12) United States Patent
Vermeulen

(10) Patent No.: US 10,556,464 B2
(45) Date of Patent: Feb. 11, 2020

(54) SPOKED HUMAN-POWERABLE VEHICLE WHEEL WITH USER-REMOVABLE HUB AND PLURALITY OF CONICAL HUB-TO-ANNULUS ATTACHMENT ELEMENTS

(71) Applicant: Bert Vermeulen, Cheyenne, WY (US)

(72) Inventor: Bert Vermeulen, Cheyenne, WY (US)

(\*) Notice: Subject to any disclaimer, the term of this patent is extended or adjusted under 35 U.S.C. 154(b) by 0 days.

(21) Appl. No.: 16/516,200

(22) Filed: Jul. 18, 2019

(65) Prior Publication Data
US 2019/0337333 A1    Nov. 7, 2019

Related U.S. Application Data

(63) Continuation-in-part of application No. 16/239,505, filed on Jan. 3, 2019, now Pat. No. 10,392,072.
(Continued)

(51) Int. Cl.
*B60B 27/02* (2006.01)
*B60B 1/00* (2006.01)
(Continued)

(52) U.S. Cl.
CPC ............ *B60B 27/026* (2013.01); *B60B 1/003* (2013.01); *B60B 1/02* (2013.01); *B62K 3/00* (2013.01);
(Continued)

(58) Field of Classification Search
CPC ... B60B 1/003; B60B 27/023; B60B 2320/10; B60B 2900/50
See application file for complete search history.

(56) References Cited

U.S. PATENT DOCUMENTS 578,350 A    3/1897    McCain
605,870 A    6/1898    Gubelmann
(Continued)

FOREIGN PATENT DOCUMENTS

CN    204473020    7/2015
EP    2628673    8/2013
WO    WO 20100048723    5/2010

OTHER PUBLICATIONS

Author: Airnimal Folding Bikes Title: Airnimal Chameleon B&W Clapton Case Fold Video on www.youtube.com/watch?v=87CjA-PTsT4 Published: Jul. 11, 2013.
(Continued)

*Primary Examiner* — John D Walters
*Assistant Examiner* — James J Triggs

(57) ABSTRACT

A wheel for a bicycle, or other human powerable vehicle, has a hub that includes: (a) an axle for attachment to a bicycle frame; (b) a set of bearings that connect the axle to a rotating sleeve; and (c) at least three connection points fixedly connected to the rotating sleeve. The connection points are used to detachably attach an annular module to the hub using attachment elements that each comprise conical frustum surfaces. The attachment elements are configured to axially press a portion of the hub to a portion of the annular module, as well as radially aligning the hub to the annular module. The annular module also has a set of spoke attachment points configured for tensioned spokes that connect the annular module to a wheel rim. The spoke attachment points are in a circular configuration on two parallel offset planes that are perpendicular to the axis of rotation of the rim.

20 Claims, 24 Drawing Sheets

Related U.S. Application Data

(60) Provisional application No. 62/619,874, filed on Jan. 21, 2018.

(51) Int. Cl.
*B62K 3/00* (2006.01)
*B60B 1/02* (2006.01)
B62M 6/55 (2010.01)
B62K 15/00 (2006.01)

(52) U.S. Cl.
CPC ....... *B60B 2200/47* (2013.01); *B60B 2320/10* (2013.01); *B60B 2900/531* (2013.01); *B60Y 2200/13* (2013.01); *B62K 15/006* (2013.01); *B62M 6/55* (2013.01)

(56) References Cited

U.S. PATENT DOCUMENTS

| | | | |
|---|---|---|---|
| 1,410,047 A | 3/1922 | Williams | |
| 1,511,291 A | 10/1924 | McGrath | |
| 1,593,474 A | 7/1926 | Serrao | |
| 2,297,960 A | 10/1942 | Hood | |
| 2,447,956 A | 8/1948 | Morders | |
| 2,917,816 A | 12/1959 | Samson | |
| 3,304,099 A | 2/1967 | Jankowski | |
| 3,329,444 A | 7/1967 | Lidov | |
| 3,922,018 A | 11/1975 | Shook | |
| 3,929,225 A * | 12/1975 | Locke | B65D 5/5038 206/335 |
| 4,149,634 A * | 4/1979 | Lewis, Jr. | B65D 85/68 206/335 |
| 4,154,327 A | 5/1979 | Haeussinger | |
| 4,182,522 A | 1/1980 | Ritchie | |
| 4,252,335 A | 2/1981 | Brenner | |
| 4,353,484 A * | 10/1982 | Crawford, III | A47J 31/0605 222/461 |
| 4,666,216 A | 5/1987 | Smith | |
| 4,758,416 A * | 7/1988 | Fong | B01D 53/1406 422/626 |
| 5,052,706 A | 10/1991 | Tsai et al. | |
| 5,205,573 A | 4/1993 | Mhedhbi | |
| 5,419,619 A | 5/1995 | Lew | |
| 5,553,950 A | 9/1996 | Pawsat et al. | |
| 5,586,652 A | 12/1996 | Smilanick | |
| 5,647,643 A | 7/1997 | Noble | |
| 5,810,453 A | 9/1998 | O'Brien | |
| 5,813,770 A | 9/1998 | Chiang | |
| 5,975,551 A | 11/1999 | Montague et al. | |
| 6,030,052 A | 2/2000 | Watarai et al. | |
| 6,267,237 B1 * | 7/2001 | McNeill | B65D 85/68 206/335 |
| 6,364,424 B1 | 4/2002 | Lashlee et al. | |
| 6,374,975 B1 | 4/2002 | Schlanger | |
| 6,485,335 B1 | 11/2002 | Dewdney | |
| 6,702,312 B1 | 3/2004 | Miksik | |
| 6,886,844 B2 | 5/2005 | Ritchey | |
| 6,929,277 B2 | 8/2005 | Chao | |
| 6,981,749 B2 | 1/2006 | Cavazos et al. | |
| 7,125,029 B2 | 10/2006 | Knox | |
| 7,357,460 B2 | 4/2008 | Schlanaer | |
| 7,490,842 B1 | 2/2009 | Ulrich et al. | |
| 7,658,450 B2 | 2/2010 | Mercat et al. | |
| 7,665,928 B2 | 2/2010 | Winefordner et al. | |
| 7,874,625 B2 | 1/2011 | Addink | |
| 7,909,412 B2 | 3/2011 | Ashman | |
| 7,942,434 B2 | 5/2011 | Myers | |
| 7,950,747 B2 | 5/2011 | Mercat et al. | |
| 8,007,052 B2 | 8/2011 | Passarotto et al. | |
| 8,052,225 B2 | 11/2011 | Inoue et al. | |
| 8,113,529 B2 | 2/2012 | Spahr et al. | |
| 8,113,593 B2 | 2/2012 | Spahr et al. | |
| 8,123,243 B2 | 2/2012 | Ho | |
| 8,141,893 B2 | 3/2012 | Lin | |
| 8,162,344 B2 | 4/2012 | Hoogendoorn | |
| 8,205,902 B2 | 6/2012 | Uimonen et al. | |
| 8,251,460 B2 | 8/2012 | Veux | |
| 8,308,178 B2 | 11/2012 | Hoerdum et al. | |
| 8,328,219 B2 | 12/2012 | Laxstroem | |
| 8,371,659 B2 | 2/2013 | Fitzsimons | |
| 8,414,006 B2 | 4/2013 | Souvanny | |
| 8,430,414 B1 | 4/2013 | Yap | |
| 8,882,124 B2 | 11/2014 | Yap | |
| 8,894,084 B1 | 11/2014 | Yap | |
| 9,266,579 B2 | 2/2016 | Yap | |
| 9,701,156 B2 | 7/2017 | Baiz et al. | |
| 9,821,948 B2 * | 11/2017 | Noer | A45C 5/14 |
| 9,969,213 B1 | 5/2018 | Hays et al. | |
| 10,040,505 B2 | 8/2018 | Boutakis | |
| 10,150,529 B2 | 12/2018 | Augustinoy et al. | |
| 2007/0187922 A1 | 8/2007 | Boutakis | |
| 2007/0205577 A1 | 9/2007 | Lau | |
| 2010/0052410 A1 | 3/2010 | Sherman et al. | |
| 2011/0049966 A1 | 3/2011 | Sartin et al. | |
| 2017/0267307 A1 | 9/2017 | Vodev | |
| 2018/0251185 A1 | 9/2018 | Vodev | |

OTHER PUBLICATIONS

Author: Mark Sharon Title: Bike Review—Airnimal Chameleon Downloaded from www.dailypeloton.com/displayarticle.asp?pk=12871 Published: Jun. 16, 2008.

* cited by examiner

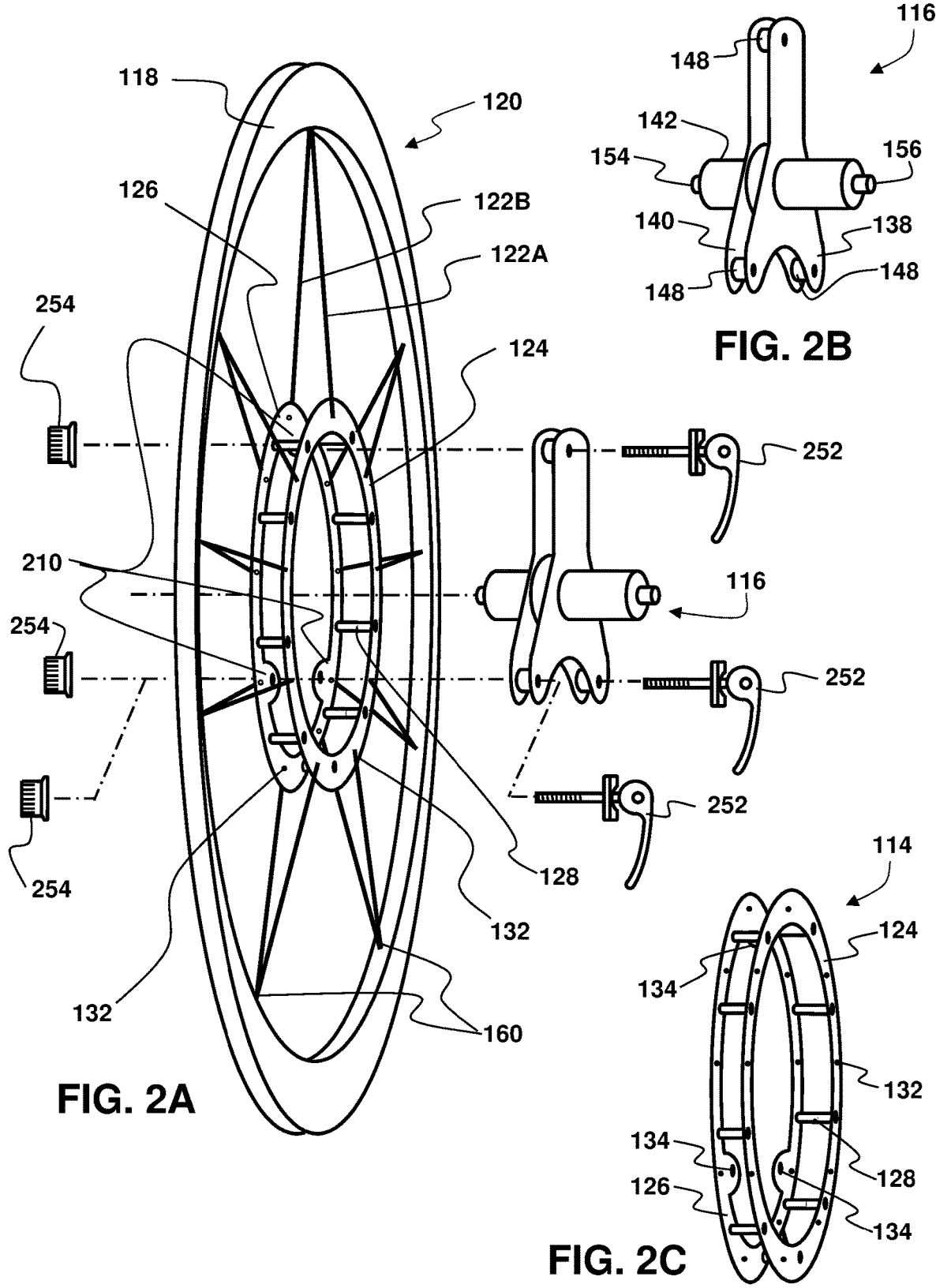

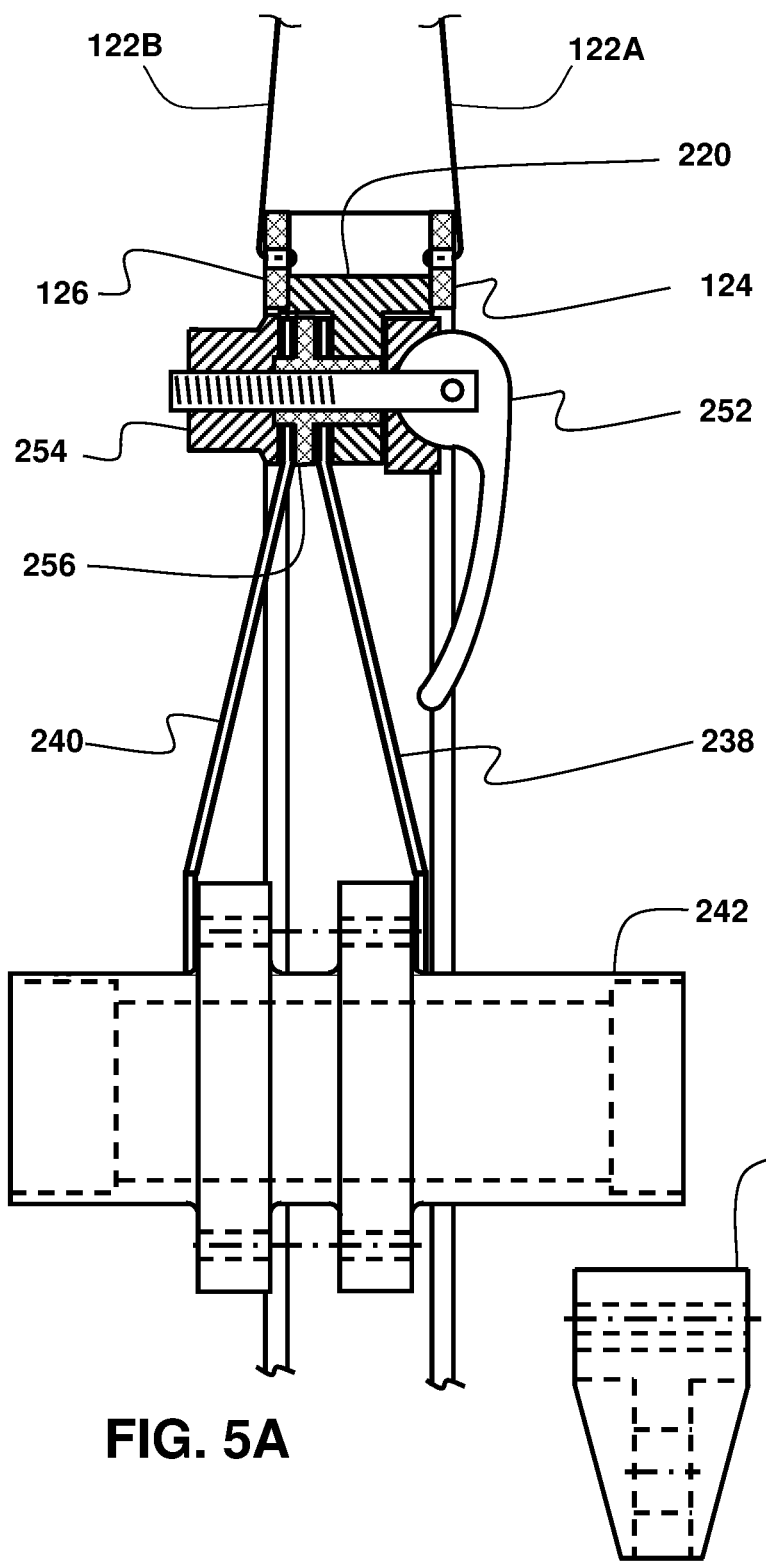
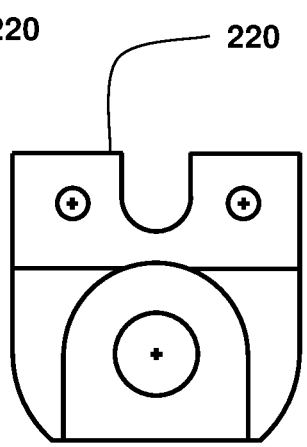
FIG. 5A  FIG. 5B  FIG. 5C

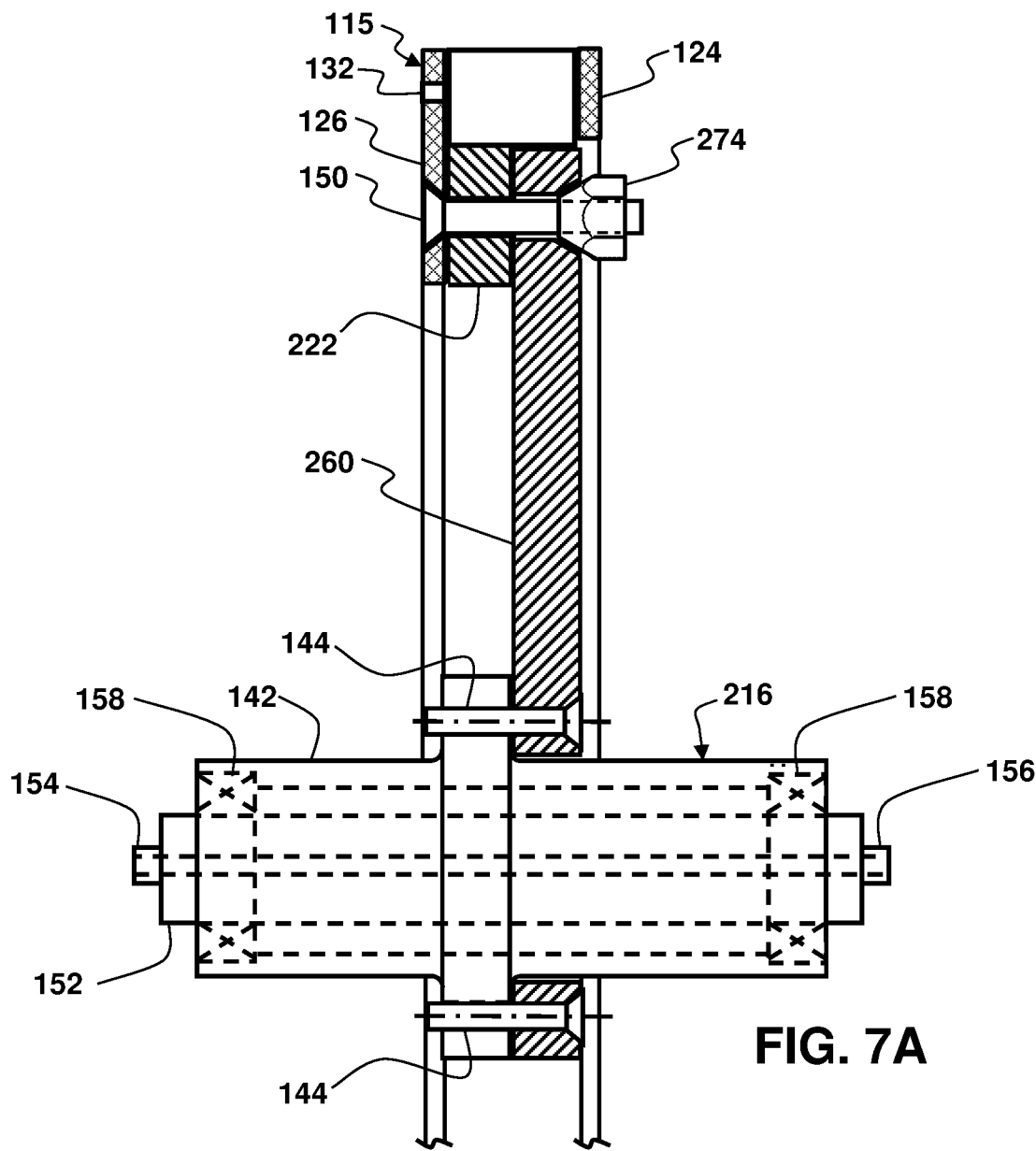
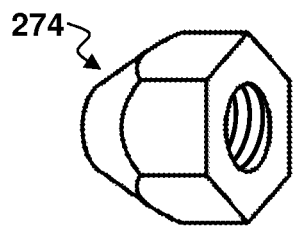
FIG. 7B
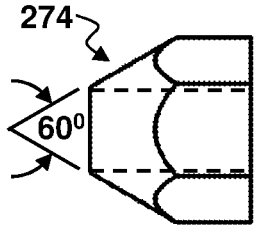
FIG. 7C
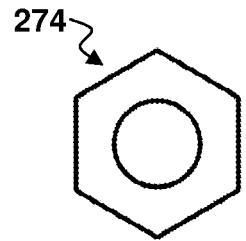
FIG. 7D

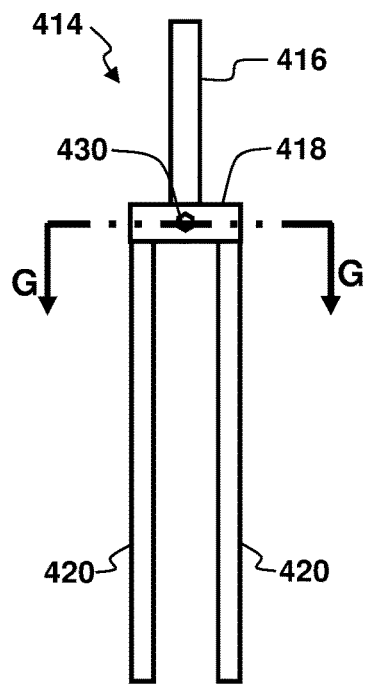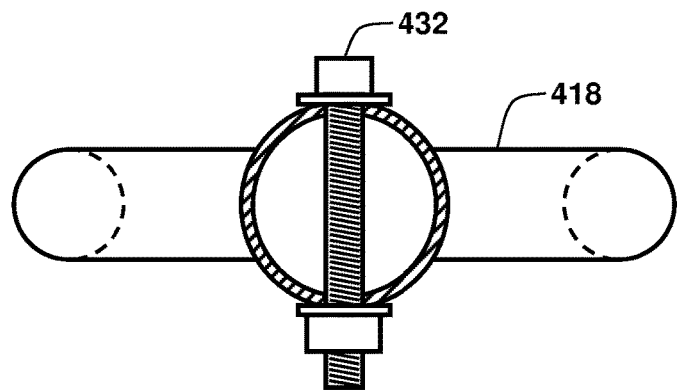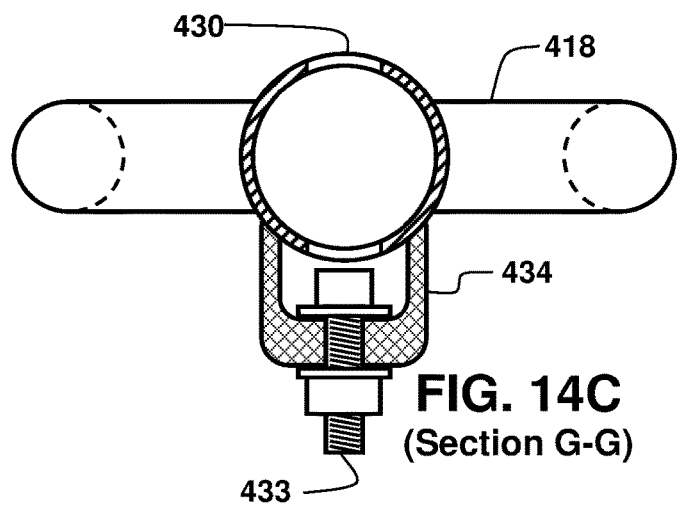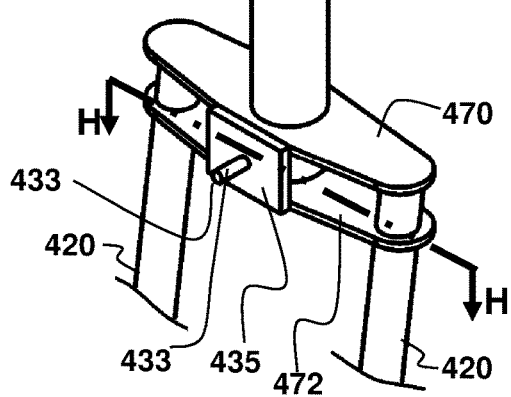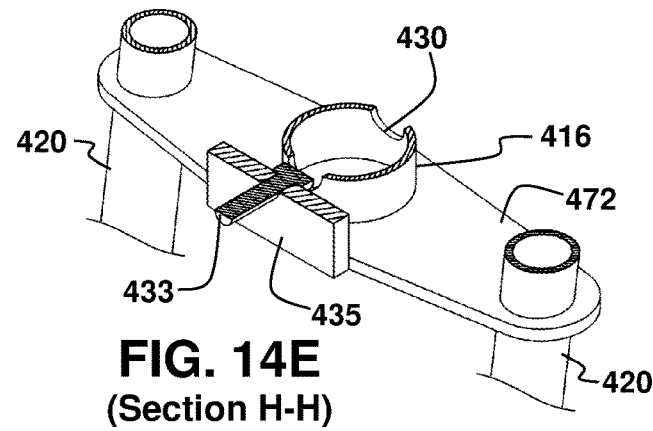
FIG. 14A
FIG. 14B
Prior Art
FIG. 14C
(Section G-G)
FIG. 14D
FIG. 14E
(Section H-H)

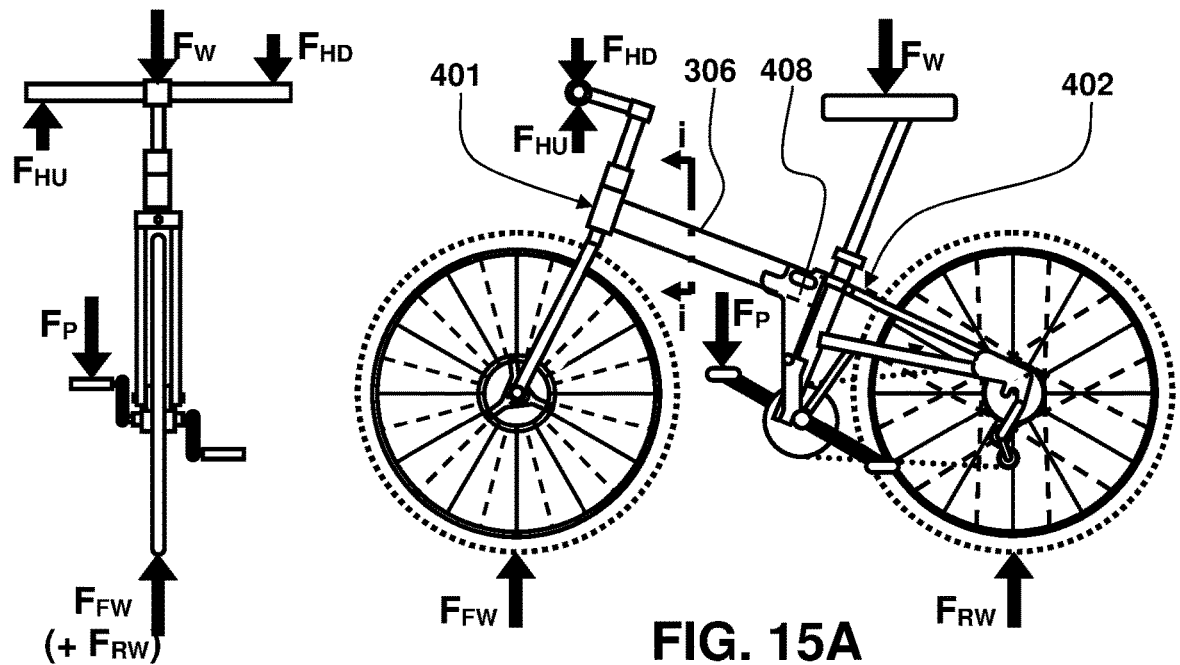
FIG. 15A
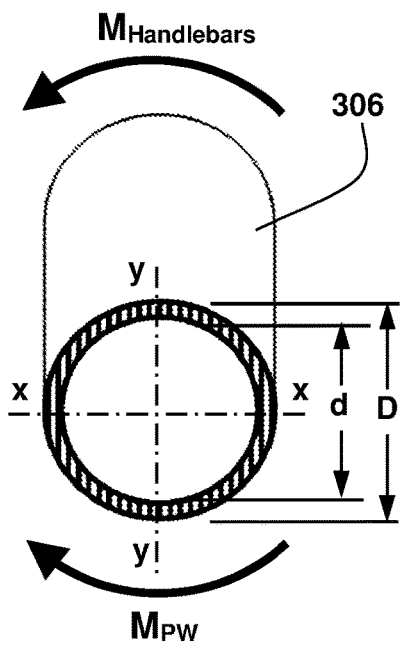
FIG. 15B
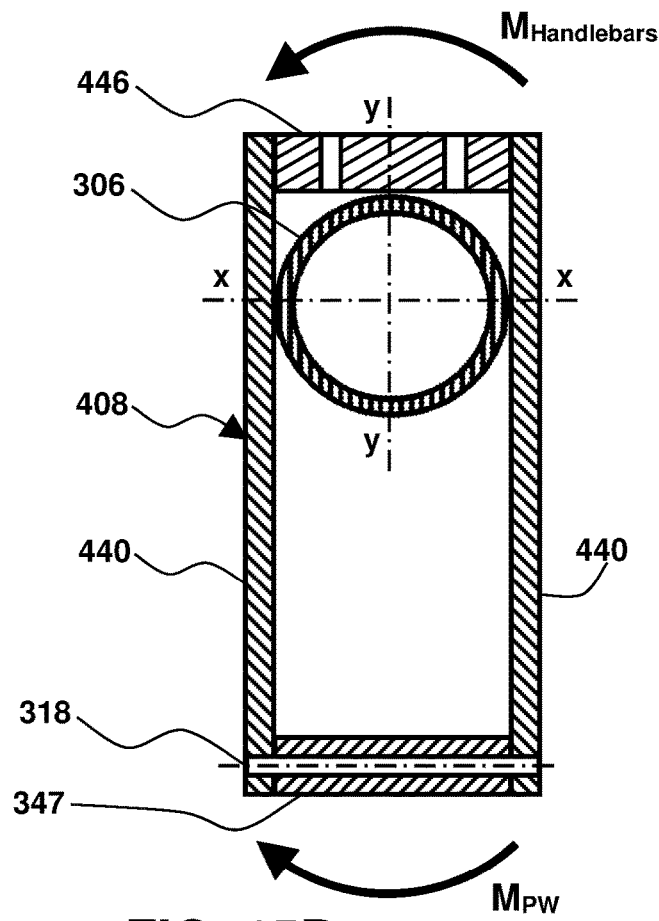
FIG. 15C
FIG. 15D

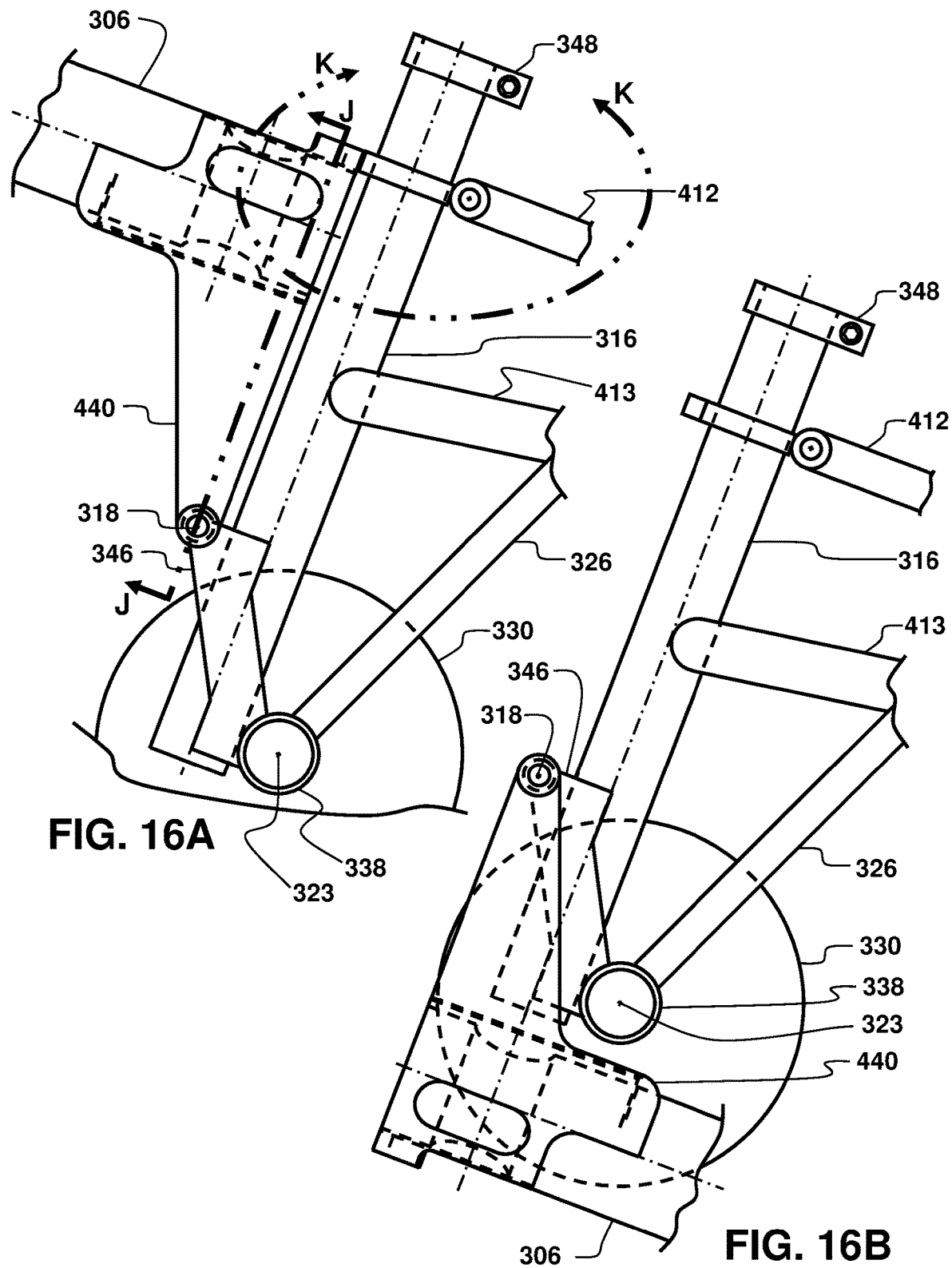

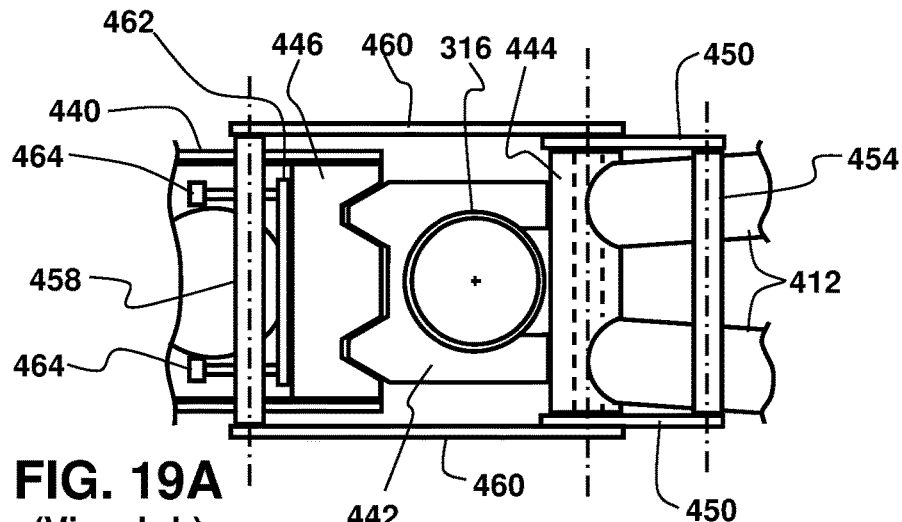
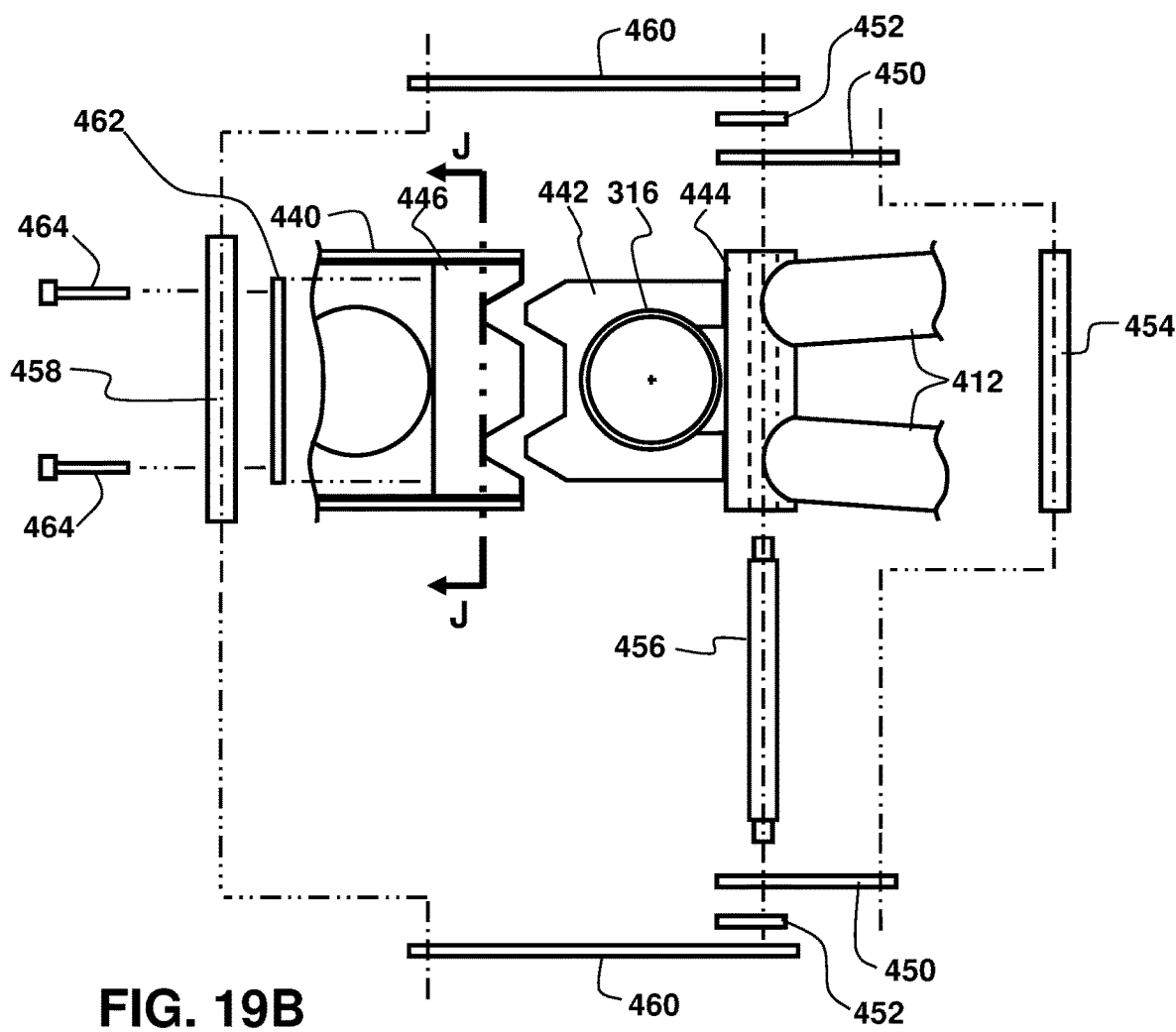

SPOKED HUMAN-POWERABLE VEHICLE WHEEL WITH USER-REMOVABLE HUB AND PLURALITY OF CONICAL HUB-TO-ANNULUS ATTACHMENT ELEMENTS

This patent application is a continuation-in-part of U.S. patent application Ser. No. 16/239,505 filed 3 Jan. 2019, which claims benefit of U.S. Provisional Patent Application Ser. No. 62/619,874 filed 21 Jan. 2018, and is a continuation-in-part of U.S. patent application Ser. No. 15/230,487 filed 8 Aug. 2016, now U.S. Pat. No. 10,202,162. U.S. Pat. No. 10,202,162 claims benefit of U.S. Provisional Patent Application Ser. No. 62/299,342 filed 24 Feb. 2016, and is a continuation-in-part of U.S. patent application Ser. No. 14/544,975, filed 11 Mar. 2015, now U.S. Pat. No. 9,440,486, which claims benefit of U.S. Provisional Patent Application Ser. No. 61/951,826 filed on 12 Mar. 2014, the entire disclosures of all of these aforementioned patents and applications are incorporated by reference herein.

BACKGROUND

This disclosure relates to systems and methods for improving the ability to pack a human-powerable wheeled vehicle when not ridden, and to unpack it for riding. Human-powerable wheeled vehicles can include unicycles, bicycles, tricycles, quadricycles, wheelchairs, strollers, push scooters, and powered versions of such vehicles (such as e-bikes) that use human power and other power sources, such as electric motors or gasoline engines.

To minimize weight, human-powerable vehicles typically use space frame structures for strength and stiffness, but space frames occupy a large physical volume, which is undesirable for storage and transport. Wheels with spokes in tension between a hub and rim are an example of a difficult-to-pack structure due to the conical bulge and axle in the wheel center (hub region). Two assembled wheels with conical centers do not easily pack together into a small space. Separately, however, the wheel components (spokes, rims, tires, and hubs) occupy little volume before being assembled as a wheel.

It is beneficial for bikes, or similar, to be packed compactly, protected from impact, and covered when transported by cars, public transit (buses, trains, etc.), planes, boats, etc. The packed bike might be carried or rolled short distances at a station or airport. Packed human-powerable vehicles are stored and locked more easily than when "ready to ride."

One example is bike transport on commercial aircraft. Many airlines charge for each piece of checked luggage. They charge more for oversize items (typically specified as length+width+height greater than 62 linear inches) and/or overweight items (typically more than 50 pounds). Airlines might refuse to take the human-powerable vehicle if not properly packed and are often not responsible for damage during transit. Observation of how luggage is handled shows that a packed bike must sustain impacts from all directions and angles. Luggage must be openable and searchable by airport security personnel and must be easily repacked after inspection of each item in a case.

Folding bike embodiments with small wheels and tires (20 inch or less) generally don't perform as well on a variety of road surfaces and terrains as bicycles with normal full-size wheels. In this document and related claims, full-size wheels are defined as wheels with a nominal outside tire diameter of 24 inches or greater and small wheels have tires nominally 20 inches in diameter or smaller. Here is a list of common small and full wheel and tire sizes:

| Common name (nominal outside diameter of tire) | Outside diameter of rim | Bead seat diameter (inside diameter of tire) |
|---|---|---|
| 700C/29 inch | 648 mm (25.5 inches) | 622 mm (24.5 inches) |
| 650B/27.5 inch | 610 mm (24 inches) | 584 mm (23 inches) |
| 26 inch | 585 mm (23 inches) | 559 mm (22 inches) |
| 24 inch | 533 mm (21 inches) | 507 mm (20 inches) |
| 20 inch | 477 mm (19 inches) | 451 mm (18 inches) |
| 20 inch | 432 mm (17.75 inches) | 406 mm (16.25 inches) |
| 16 inch | 375 mm (14.75 inches) | 349 mm (13.75 inches) |

Some bicycles with small wheels use ingenious folding to convert from a packed to a ridable bike quickly, cleanly, and without tools. Some small wheel bikes fold compactly enough to fit within the 62-linear inch size requirement and 50-pound weight limit. It is much easier to fit into 62 linear inches when the wheel is less than one third of the total length+width+height, when the nominal outside diameter of the tire is 20 inches or less.

There are full-size wheeled bikes that can pack into the 62 linear inches, but these require time, tools, expertise, and finesse to disassemble, pack, and reassemble. Referring to the bike wheel sizes listed, a typical road bike uses 700C wheels, with an outside tire diameter of 27 to 29 inches and an outside rim diameter of about 25.5 inches. The typical target packed size for such bikes is 26×26×10 inches. It takes removing the air from the tires, many disassembly steps, detailed instructions, tools, covers to wrap each part, and patience to pack all the parts into these dimensions and prevent damage during transport.

One challenge with fitting a bike with full-size wheels into 62 linear inches is that the wheels are large in diameter and fat in the center due to the tension spokes in a triangular configuration, when viewed in cross section, or a dual conical configuration when viewed three dimensionally. The spokes typically terminate in a set of holes in one plane in the rim and terminate in two parallel planes in a circular configuration in the hub. In a cross section view, this looks like a triangle that is wide at the hub and narrow at the rim. When two wheels with fat centers are put into a 26×26×10 inch case, there is little room for anything else. Saving space by compactly storing the wheels can simplify packing the other bicycle parts. It is known to have wheels that disassemble to save space, but disassemble-able wheels typically do not use tension spokes in a triangular/conical configuration. Wheels with triangular/conical spokes in tension are desired because this space frame configuration has a high strength to weight ratio. Weight is paramount for a human-powerable vehicle.

Many bicycles that are transported as checked luggage require an uncollapsible structural case, which can add to total luggage weight. There is also the issue of what to do with the case when one arrives at a destination and wants to start riding. It is better if the bike is packable in a compact arrangement that needs minimal or no external transport container or uses a transport container that can be converted to a usable part of a rideable bike.

In summary, the goal is a system/method for packing a human-powerable vehicle that (a) fits the vehicle/bike in one piece of luggage that meets applicable size and weight restrictions, is (b) lightweight and performs well when ridden, (c) is quick to pack/unpack; and (d) requires minimal tools and packaging for transporting when packed. (e) Ideally, such a system/method would not need a separate uncompactable suitcase. (f) The system/method should be as cost effective and simple to manufacture. It should be (g) safe and (h) reliable.

BRIEF DESCRIPTION OF THE DRAWINGS

This disclosure is described in conjunction with the appended figures in which:

FIG. 2A shows a perspective view of a spoked bicycle wheel with a central annulus, a user detachable hub, and three eccentric cam quick release mechanisms to attach the annulus to the hub;

FIG. 2B shows the user detachable hub of the wheel of FIG. 2A;

FIG. 2C shows the central annulus of the wheel of FIG. 2A;

FIG. 5A shows an alternate embodiment of a spider-to-annulus attachment system (section B-B of FIG. 3A) that can be substituted for the system shown in FIG. 4;

FIG. 5B shows a first view (in the same orientation as FIG. 5A) of the mounting block that can be used with the embodiment in FIG. 5A;

FIG. 5C shows a second view of the mounting block of FIG. 5B;

FIG. 7A shows section C-C of FIG. 6B;

FIG. 7B provides a close-up perspective view of a lug nut suitable for the assembly shown in FIG. 6A to FIG. 7A;

FIG. 7C is a side view of the lug nut of FIG. 7B;

FIG. 7D is an end view of the lug nut of FIG. 7B;

FIG. 14A shows a front fork suitable for use on a bicycle;

FIG. 14B shows a prior art example of section G-G of FIG. 14A;

FIG. 14C shows an embodiment of the section G-G of FIG. 14A that has a mounting bolt that does not block the passage of a collapsible steerer tube extender;

FIG. 14D shows a perspective view of the crown region of an alternate front fork that uses two parallel plates to create the crown;

FIG. 14E shows section H-H of FIG. 14B;

FIG. 15A shows examples of some of the forces on a typical bicycle, such as the bicycle shown in FIG. 10A;

FIG. 15B shows a front view of the bicycle of FIG. 15A;

FIG. 15C shows section i-i of FIG. 15B to illustrate the torsional forces on the front section of a bicycle frame when a rider is standing on the pedals;

FIG. 15D shows a forward-looking view of the connection module between the front frame section and the rear frame section (view J-J in FIG. 16A);

FIG. 16A shows a side view of a part of the frame of FIG. 10B when the hinge is in a ride configuration;

FIG. 16B shows a side view of the part of the alternate frame of FIG. 16A in a folded configuration;

FIG. 19A shows view L-L of FIG. 18B;

FIG. 19B is an exploded top view of the components shown in FIG. 19A;

Figure 1A:
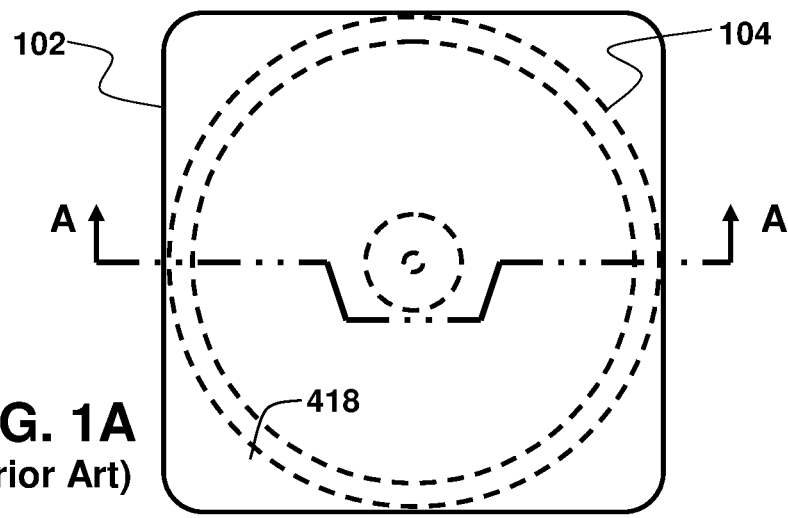
FIG. 1A shows an axial view of two spoked 700C bicycle wheels in a 26×26×10 inch container.

It should be understood that the drawings are not necessarily to scale. In certain instances, details that are not necessary for an understanding of the invention or that render other details difficult to perceive may have been omitted. It should be understood that the invention is not necessarily limited to the particular embodiments illustrated herein.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It should be understood that various changes could be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, those skilled in the art will know that different materials, manufacturing processes, fastening systems, configurational arrangements, and components may be substituted.

1. Definitions

In one embodiment, the system and/or method is for a wheeled human-powerable vehicle. For purposes of this document and the appended claims, a wheeled human-powerable vehicle is defined as any vehicle having wheels that is configured for a human to add or exclusively provide locomotive power. Examples include bicycles, motor-assisted bicycles (such as mopeds, e-bikes, etc.), wheelchairs, tricycles, unicycles, quadricycles, tandems, push scooters, etc.

In this disclosure and the appended claims, the term bicycle (or bike) is used to describe a human powerable vehicle having two main wheels that is configured to transport a human. The term bicycle includes tandems, recumbents, bicycles with training wheels, and any other combination of a plurality (at least two) wheels, with any attachment between them, or no other components or attachment between them. Thus, a bicycle also comprises any pair of wheels, with or without any other components.

In one embodiment, the system and/or method being documented comprise a foldable human-powerable vehicle. A foldable human-powerable vehicle can be any human power-able vehicle comprising a frame that comprises at least two sections and a hinge or connected pivot point wherein a first frame section can be rotated about the pivot point or hinge relative to a second frame section and secured when the human powerable vehicle is configured for transporting a human. The folding human-powerable vehicle can be of any other shape or configuration using any other components capable of being understood by anyone skilled in the art.

In one embodiment, the system and/or method being documented can comprise an annulus, annular module, or ring-shaped module. For purposes of this disclosure and the appended claims, an annulus (or annular module) shall include any ring-shaped structure having a central region in the form of opening or aperture that facilitates the nesting of components partially or completely inside of one another. An annulus can be monolithic. An annulus can be assembled from multiple components. An annulus can be substantially flat with all features lying in one flat plane having a thickness many times smaller than the outside diameter of the annulus. An annulus can be thick in its axial direction. An annulus can be composed of elements that create attachment points that are planar (or co-planar) without the annulus necessarily occupying all spaces in the volume or plane connecting those points. An annulus can be cup-shaped with one side that is not open or only partially open. An annulus can have a completely open center throughout its entire shape.

In one embodiment, the system and/or method being documented comprise an annular wheel. A wheel can be any circular component that is intended to rotate about a central axis. A wheel can comprise a bearing. For purposes of this disclosure and the appended claims, a wheel does not necessarily need to have a bearing or central hub. A wheel can also be a circular component to which an axle, a bearing, or a hub is to be attached. Thus, a wheel can be annular, with a central opening or aperture that facilitates the nesting of components partially or completely inside of one another. A wheel can be monolithic. A wheel can be assembled from multiple components. A wheel can use spokes. The spokes can be in tension. A wheel can be of any other shape or configuration using any other components capable of being understood by anyone skilled in the art.

2. Compact Storage of Multiple Wheels

Figure 1B:
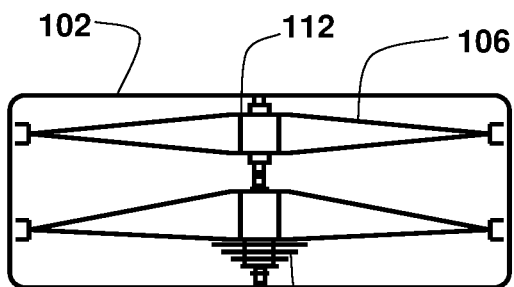
FIG. 1B shows section A-A of FIG. 1A for two prior art spoked 700C bicycle wheels.
Figure 1C:
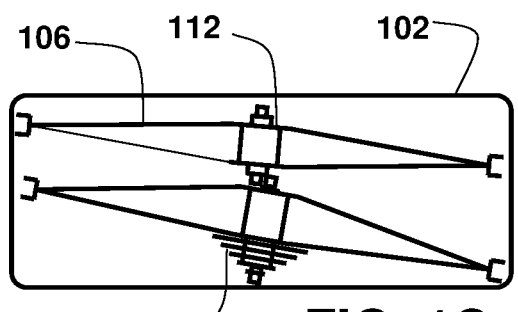
FIG. 1C shows section A-A of FIG. 1A for two prior art spoked 700C bicycle wheels when the wheels are angled slightly to reduce total stack height.
Figure 1D:
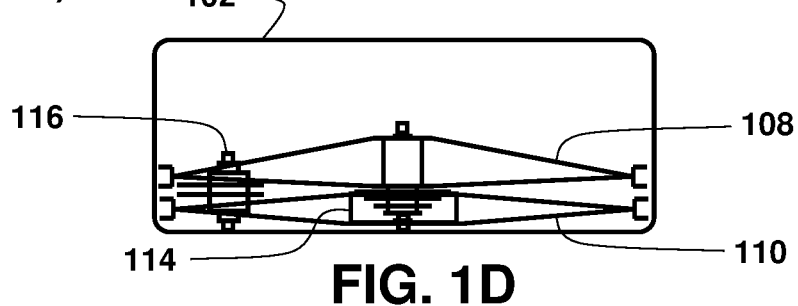
FIG. 1D shows section A-A of FIG. 1A when the prior art spoked 700C front wheel has been replaced with a spoked wheel incorporating a central annulus with an aperture that allows the axle of the rear wheel to nest inside the aperture.
Figure 1E:
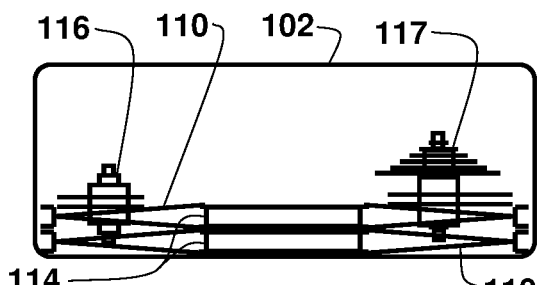
FIG. 1E shows section A-A of FIG. 1A when the prior art spoked 700C front wheel and the prior art spoked 700C rear wheel have both been replaced with spoked wheels incorporating central annuli and removable hubs and both wheels are placed adjacent to one another in a 26×26×10 inch container.
Figure 1F:
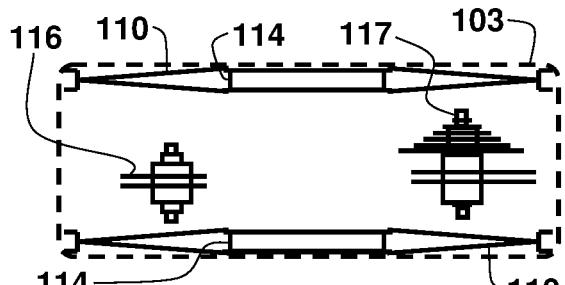
FIG. 1F shows section A-A of FIG. 1A when the prior art spoked 700C front wheel and the prior art spoked 700C rear wheel have both been replaced with spoked wheels incorporating central annuli and removable hubs and both wheels are placed on opposite sides of a 26×26×10 inch physical volume.

FIG. 1D, FIG. 1E, and FIG. 1F illustrate elements of three configurations and methods that can be employed in embodiments of the present invention. To understand these configurations and methods, it is best to start with the prior art. FIG. 1A shows an axial view of one or more bicycle wheels 104 in a container 102. In this example, the bicycle wheels 104 are spoked and have the dimensions of standard 700C or 29-inch wheels. This means that the wheels 104 have rims with an outside diameter of approximately 25.5 inches (648 mm). The container 102 has been sized to meet the airline checked luggage requirement of 62 linear inches (1575 mm). Given a 25.5-inch (648 mm) standard outside diameter of 700C bicycle rims, the fact that the rims will most likely have tires on them (which could be deflated), and the fact that the container walls will have a thickness that must be within the total dimensions, the minimum length and the minimum width of the container will be approximately 26 inches. Subtracting 26+26=52 inches from the 62-linear inch size limit, the container can have a maximum height of about 10 inches. Therefore, the container shown at 102 in FIGS. 1A, 1B, 1C, 1D, and 1E is 26×26×10 inches. In the prior art, the typical container used for transporting bicycles in this way could be made of a hard-shell plastic in a clamshell configuration, or it could be a soft-shell bag, or it could be a container made of a combination of hard and soft components.

FIG. 1B, which is a side view of section A-A of FIG. 1A, illustrates the next issue when trying to pack a bicycle into a maximum 62 linear inch airline size container using the systems and methods known in the prior art. Referring to FIG. 1B, a prior art spoked 700C front wheel is shown at 106 and a prior art spoked 700C rear wheel is shown at 108. The standard dropout spacing for a front wheel is 100 mm. The axle typically extends an additional 5 mm per side beyond this 100 mm so the wheel can fit into the front dropouts, making a total axle length of 110 mm (4.3 inches) for a front wheel. The narrowest standard dropout spacing for a rear wheel is 130 mm for a road bike. It is 135 mm for some road bikes and many mountain bikes. The rear wheel also typically has 5 mm of additional axle length on each side in order to fit into the dropouts for a total axle length of 140 mm (5.5 inches). In FIG. 1B, the two wheels 106 and 108 are axially aligned and the total height of the two stacked wheels is therefore 110 mm+140 mm=250 mm, which is approximately 9.8 inches. Thus, the stack height of the two hubs and the two axles almost exactly takes up the entire interior height of the 10-inch high container 102 once the wall thickness of the container is subtracted from 10 inches. Other bicycle parts (such as the frame, handle bars, pedals, seat, etc.) must fit into the remaining space or must be placed into a second piece of luggage, which could cost extra. The remaining space in a container 102 in the prior art systems and methods for packing a bicycle are minimal and broken up into multiple small regions. Tilting the wheels as shown in FIG. 1C does not give much additional space because it is not possible to tilt the wheels to a very great angle and stay within the 26×26×10 inch physical volume. Thus, many compromises must be made, it takes a considerable time and experimentation to try to get the bike to fit at all, and many people give up on this packing method as a solution. Furthermore, fitting the bike wheels, frame, and components into the container in this way can result in damage as parts rub against each other. To prevent damage caused by rubbing, each part is typically individually wrapped in a protective material, which requires additional time, items, space, expense, and weight.

FIG. 1D illustrates a configuration and method that simplifies compact packing of a bicycle of the same size. The container 102 and rear wheel 108 shown in FIG. 1D are the same as the prior art illustrated in FIG. 1A, FIG. 1B, and FIG. 1C. The configuration of the spoked front wheel, shown at 110 in FIG. 1D, has been changed by replacing the central hub assembly, shown at 112 in FIG. 1B and FIG. 1C with an annulus (or annular module or ring-shaped module), shown at 114 in FIG. 1D, and a user removable hub (or other removable module for connecting the annulus wheel to the rest of the bicycle) shown at 116. The annulus 114 has a concentric central aperture region. This central aperture region of the annulus allows at least part of the thick central hub (and axle) of the rear wheel 108 to nest inside the front wheel 110. As shown in FIG. 1D, the entire space in the container 102 above (or to the side, depending upon how one looks at it) the rear wheel 108 then becomes clear and available for packing other parts of the bicycle. The rear wheel 108 in FIG. 1D sits at the same position in the container 102 as for the prior art (FIG. 1B and FIG. 1C). Thus, the wheel configuration with a removable hub greatly facilitates the packing of a bicycle. The two wheels with the removable hub shown in FIG. 1D represent a simple embodiment of a packable bicycle that fits into 62 linear inches. Advantages of the front wheel embodiment shown in FIG. 1D can include:

(a) more compact storage of the bicycle (especially if this is a bicycle using full-size wheels);
(b) potential for storing two bicycles with traditional mountain bike wheels, that are smaller than 700C wheels, into a 62-linear inch size package;
(c) improved potential (due to having more space) for rigidly (i e immovably and securely) attaching bicycle parts together to eliminate the need for wrapping each bicycle part prior to packing; and
(d) more room for the other bicycle components allows for more soft padding on the outside of the packed bicycle, which makes it easier to eliminate the weight, cost, and transportation of a hard-shell suitcase.

The two wheels illustrated in FIG. 1D do not necessarily need to be a front wheel with a central annulus 110, a removable hub 116, and a rear wheel with a non-removable hub 108. The rear wheel could have a removable hub. The front wheel could have a fixed hub. The two wheels could be two front wheels. The two wheels could be two rear wheels. The two wheels could be two wheels from a vehicle that has more than two wheels. The two wheels could be for two different vehicles. The two wheels could both have removable hubs. One or both of the two wheels could have removable centers that are not hubs, they could be removable axle assemblies, for example, with the bearings being in the front wheels and the central annulus being inside the races of the bearings. To illustrate examples of such embodiments, FIG. 1E and FIG. 1F show a configuration in which the front wheel and the rear wheel 110 both comprise an annulus 114 with detachable hubs, 116 and 117. The user-detachable front hub is shown at 116 and the user-detachable rear hub is shown at 117. This front hub 116 and rear hub 117 could be placed anywhere in the space available, such as embedded partially in the spoked wheels, as shown in FIG. 1E or completely in the volume reserved for the bicycle frame, as shown in FIG. 1F. This flexibility in where the two hubs 116 and 117 are placed helps to maximize the efficiency of using the available space.

In the configuration shown in FIG. 1E, the two wheels with central annuli 110 are adjacent to each other in the 26×26×10 inch container, 102. In the configuration of FIG. 1F, the two wheels 110 are on opposite sides of a flexible 26×26×10 inch bag 103. Placement of the two annular spoked wheels 110 in the configuration shown in FIG. 1F can have the following advantages:

(a) any small protrusions of the bike frame components can extend through the spoke region of the wheels 110 and the entire packed bicycle can still fit within the overall 10-inch height;

(b) the sides of the annular spoked wheels 110 can be part of the protective structure for the packed bicycle on the 26×26 inch top and bottom surfaces of the volume;

(c) the rims (typically with rubber tires on them) can protect the 26×10 inch front, rear, right side, and left side surfaces of the volume as shown in FIG. 1F; and (d) by using the wheels as part of the protective structure, the storage device 103 can be have fewer or no rigid (or hard) components, such as the flexible 26×26×10 inch bag, shown at 103. A storage device 103 with few or no hard components will also pack more easily when not used to store the bicycle.

3. Wheel with Central Annulus

FIG. 2A shows a perspective view of a spoked wheel 120, and a user detachable hub 116. The hub 116 shown in FIG. 2A could also be called a removable front wheel center module. The wheel 120 and hub 116 could be used to facilitate the packing of a bicycle, as was shown and described with reference to FIG. 1D, FIG. 1E, and FIG. 1F. The spoked wheel 120 can be of any size and shape capable of being understood by anyone skilled in the art. Common human powerable vehicle spoked wheel tire sizes can include 700C/29 inch, 650B/27.5 inch, 26 inch, 24 inch, 20 inch, and 16 inch as were described earlier in this document. The spoked wheel 120 comprises a rim, shown at 118, an inner annulus (or inner annular module or ring-shaped module) 124 and/or 126, and a plurality of spokes, shown at 122A and 122B that radiate outwards from the inner annulus to connect the annulus to the rim. The rim 118 is circular and is located concentrically to the central axis of the wheel 120. It should be noted that the rim 118 could be of any other size capable of being understood by anyone skilled in the art. The rim used on a wheel of a human-powerable vehicle can be made of any material capable of being understood by anyone skilled in the art. Examples of rim materials include aluminum, steel, titanium, wood (such as birch, spruce, oak, etc.), carbon fiber reinforced composite, glass fiber reinforced composite, glass, and plastic. The rims can be fabricated using any process capable of being understood by anyone skilled in the art including the use of extrusion, machining, casting, molding, bending, stamping, autoclaving, heating, vacuum forming, injection molding, riveting, and welding.

The spoked wheel 120 shown in FIG. 2A has 18 spokes. Other common spoke counts can include 3, 4, 5, 6, 8, 10, 12, 16, 18, 20, 24, 28, 32, 36, 40, 48, 72, 96, and 144 spokes. The spoke count can be any quantity capable of being understood by anyone skilled in the art. The inner annulus includes spoke-to-annulus attachment points, shown at 132. These spoke-to-annulus attachment points 132 are configured for spokes, 122A and 122B, that radiate outwards from the inner annulus. In the embodiment shown, the spoke-to-annulus attachment points 132 are in a circular configuration on two offset parallel planes separated by spacers 128. In the embodiment shown, the spacers 128 comprise a plurality of threaded tubular elements, having internal threads.

FIG. 2C provides a view of just the central annulus 114 of the wheel that was shown at 120 in FIG. 2A. The circular configuration of the spoke-to-annulus attachment points 132 is concentric to the center of the wheel 120. In the embodiment shown, the spoke-to-annulus attachment points 132 are axial through holes. In the embodiment shown, the two offset (non-co-planar) parallel planes are in the form of two annular (or ring shaped) disks, 124 (first annular disk) and 126 (second annular disk), and are separated by the annular disk spacers 128. These annular disks 124 and 126 could also be called rings or annuli. In the embodiment shown, the annular disks, 124 and 126, are located concentrically to the central axis of the wheel, providing a central annulus that is concentric to the axis of rotation of the rim.

Referring to the embodiment shown in FIG. 2A, the spokes, 122A and 122B, are configured to be in tension. The spokes, 122A and 122B, are in a generally triangular configuration if the wheel was looked at in a section view, with the two planes of spoke-to-annulus attachment points 132 being offset. The spokes, 122A and 122B, are connected to the rim 118 at rim spoke attachment points, shown at 160. In the embodiment shown, the rim spoke attachment points 160 for all spokes are in a common plane, in a circular configuration, and concentric to the axis of the axis of rotation of the wheel. The resulting configuration of the spokes, 122A and 122B, can also be described as approximating two cones (more specifically conical frustra), which if the tops where not cut off, would have their apexes in the center of rotation of the wheel. It is also possible for the rim spoke attachment points 160 to be located in multiple offset parallel planes. For example, it is possible to attach the spokes from the first annular disk 124 to a plane on the rim that is offset and parallel to the plane on the rim where the spokes from the second annular disk 126 are attached. In the embodiment shown, the rim spoke attachment points 160 are radial through holes in the rim 118. The placement of the spokes, 122A and 122B, from the spoke-to-annulus attachment points 132 to the rim 118 can be in any configuration capable of being understood by anyone skilled in the art. The type of spokes, 122A and 122B, used can be any type of spoke capable of being understood by anyone skilled in the art. A typical example is spokes having shafts that comprise stainless steel (an alloy of iron, nickel, and other materials) and nipples (used by a user or bike shop mechanic to tension the spokes by rotation) that comprise brass. It is also known to use plastic or composite spokes that comprise carbon fiber or Kevlar (TRADE). The spokes 122A and 122B described herein are user-tensionable spokes, which means that they will have a feature that allows a user to change the length. Such a tensioning feature is typically threads on one end of the spoke that engage with a helically threaded nipple that can be rotated to tighten or loosen the spoke and therefore adjust spoke tension.

Further referring to FIG. 2A, the embodiment of the user detachable hub shown at 116 has three fingers that extend radially. The three fingers comprise hub attachment points. The user detachable hub 116 can be attached to the wheel 120 by a user without significantly affecting spoke tension as will be described in the sections that follow. The system shown in FIG. 2A uses three eccentric cam quick release devices, comprising eccentric cam quick release mechanisms, shown at 252, and hand tightenable nuts, shown at 254. These quick release mechanisms are also shown in, and described with reference to, FIG. 13B. It can be understood that the user detachable hub 116 will be at least partially inside of the central aperture of the annular module when the hub is installed in the wheel.

The annulus module 114 in FIG. 2C can also be called an inner annulus, an inner annular module, or a ring-shaped module. The annulus 114 shown in this embodiment comprises two parallel annular disks, shown at 124 and 126, separated by nine disk spacers, shown at 128. The disk spacers 128 can be attached to the annular disks, 124 and 126, by disk-spacer assembly bolts that engage internal threads in the disk spacers 128. The annular disks, 124 and 126, comprise spoke-to-annulus attachment points, shown at 132. The spoke-to-annulus attachment points 132 are configured for spokes that will radiate outward from the annulus 114. The spoke-to-annulus attachment points 132 are in a circular configuration. In the embodiment shown, the spoke-to-annulus attachment points 132 are axial thru holes designed for spokes with j-bends. The spoke-to-annulus attachment points 132 can be any other type of attachment point capable of being understood by anyone skilled in the art, such as radial through holes, and attachment points that comprise slots. The embodiment of the annulus 114 shown has 9 spoke attachment points per disk, for a total of 18 spoke-to-annulus attachment points 132. There can be any number of spoke-to-annulus attachment points 132 per annular disk above a minimum of 2 and the number of spoke-to-annulus attachment points 132 does not need to be the same for both annular disks. The annulus 114 also includes three hub attachment points shown at 134.

One important benefit of having an annulus is that the center of the wheel is open. This provides the opportunity for part of a second wheel to nest inside of this annulus to reduce overall stack height for multiple wheels. An analysis of various wheels and hubs has identified the following diameters as being typical for the centers of wheels that one might want to nest inside the annulus:

| Diameter of a hub in various locations | Typical diameter |
|---|---|
| Outside diameter on non-cassette side for a rear wheel that does not have disk brakes taken 1 inch from end of axle | 1 inch (25 mm) |
| Outside diameter of a disk brake flange | 2 inches (50 mm) |
| Outside diameter of an 18-tooth cog | 4 inches (100 mm) |
| Outside diameter of a 36-tooth cog | 6 inches (150 mm) |
| Outside diameter of a 42-tooth cog | 7 inches (175 mm) |
| Outside diameter of a 48-tooth cog | 8 inches (200 mm) |
| Outside diameter of a large disk brake | 8 inches (200 mm) |

Given the information above, it is beneficial to have the aperture of the annulus be as large as possible, and 1 inch (25 mm), 2 inches (50 mm), 4 inches (100 mm), 6 inches (150 mm), 7 inches (175 mm), and 8 inches (200 mm) are good targets to shoot for.

FIG. 2B provides more detail of an embodiment of a user detachable hub at 116, which was also shown in FIG. 2A. The detachable hub 116 comprises two parallel spiders, shown at 138 and 140 that are attached to a hub body (or sleeve), shown at 142. Each spider has three fingers that extend outwards to annulus attachment points. In the embodiment shown in FIG. 2A and FIG. 2B, There are three finger spacers, shown at 148, which ensure that the fingers of the parallel spider are in the correct positions and can be compressed when placed into the annulus 114 in FIG. 2C. The detachable hub also comprises a central axle, which has two frame attachment regions, one on each end, shown at 154 and 156. These frame attachment regions, 154 and 156, will fit into the dropouts on a bicycle frame. For example, if this is a hub for a front wheel, the frame attachment regions, 154 and 156 will fit into the dropouts on the front fork of the bicycle frame. If this is a hub for a rear wheel, the frame attachment regions will fit into the dropouts on the rear triangle of the frame, which are typically either part of the chain stays, the seat stays, or of an integrated rear triangle that comprises both seat stays and chain stays. The detachable hub 116 also comprises bearings (typically 2 sets), which are typically inside the hub body (or sleeve) 142 and allow the sleeve 142 to rotate about the axle. The remaining parts and configuration possibilities of the detachable hub can be similar to other bicycle hubs and capable of being understood by anyone skilled in the art. For example, the central axle can be a hollow cylinder that is designed for attachment to a bicycle frame using a quick release skewer that is similar to the quick release mechanisms shown in other parts of this document and can be understood by looking at the quick release mechanism shown in FIG. 13B. The bearings can be cartridge bearings or open unsealed bearings.

Figure 3A:
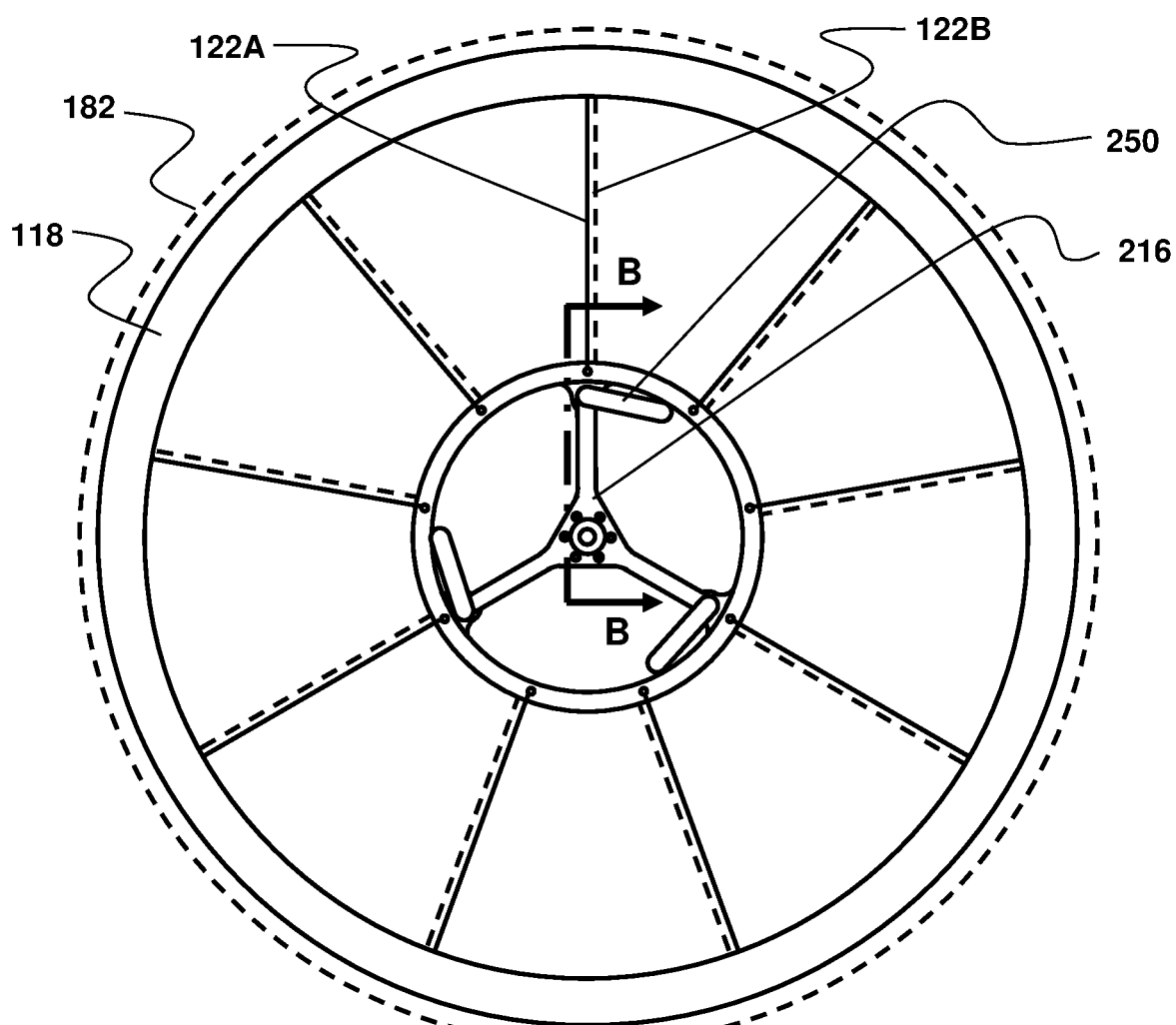
FIG. 3A shows an axial view of the wheel of FIG. 2A.
Figure 3B:
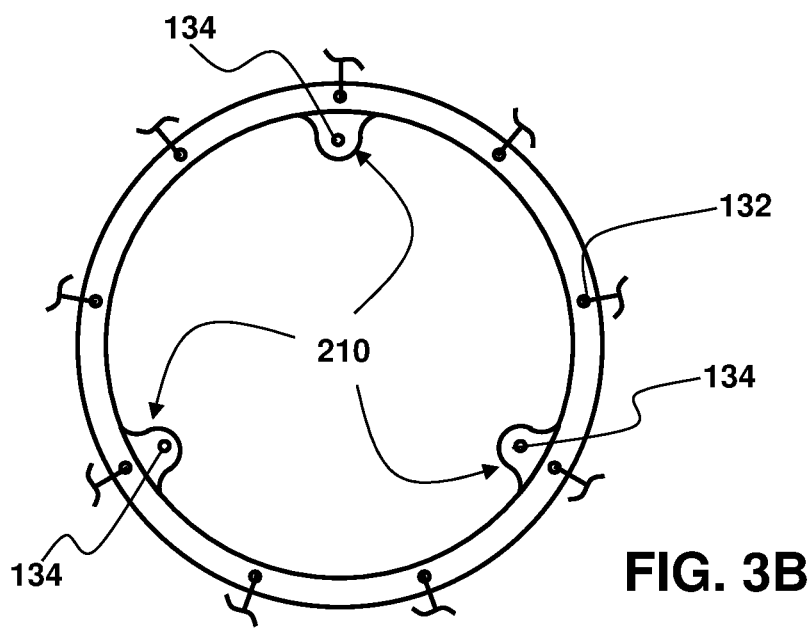
FIG. 3B shows an axial view of the central section of the wheel of FIG. 3A with the hub removed.

FIG. 3A shows an axial view of the assembled wheel of FIG. 2A. A tire is shown as a dotted line at 182. The rim is shown at 118. FIG. 3B shows an axial view of the central section of this wheel with the hub (116 in FIG. 2A) and quick release devices (250 in FIG. 2A) removed. For clarity, the near spokes 122A coming from the closest (front) annular disk (124 in FIG. 2A and FIG. 2C) are shown as solid lines and the far spokes 122B coming from the second (rear) disk (126 in FIG. 2A and FIG. 2C) are shown as dotted lines. Annulus-to-hub mounting tabs are shown at 210 in FIG. 3B and are located on the rear disk (126 in FIG. 2A and FIG. 2C) and inside the circle defined by the annulus to spoke attachment points 132. The three hub attachment points are shown at 134.

Figure 4:
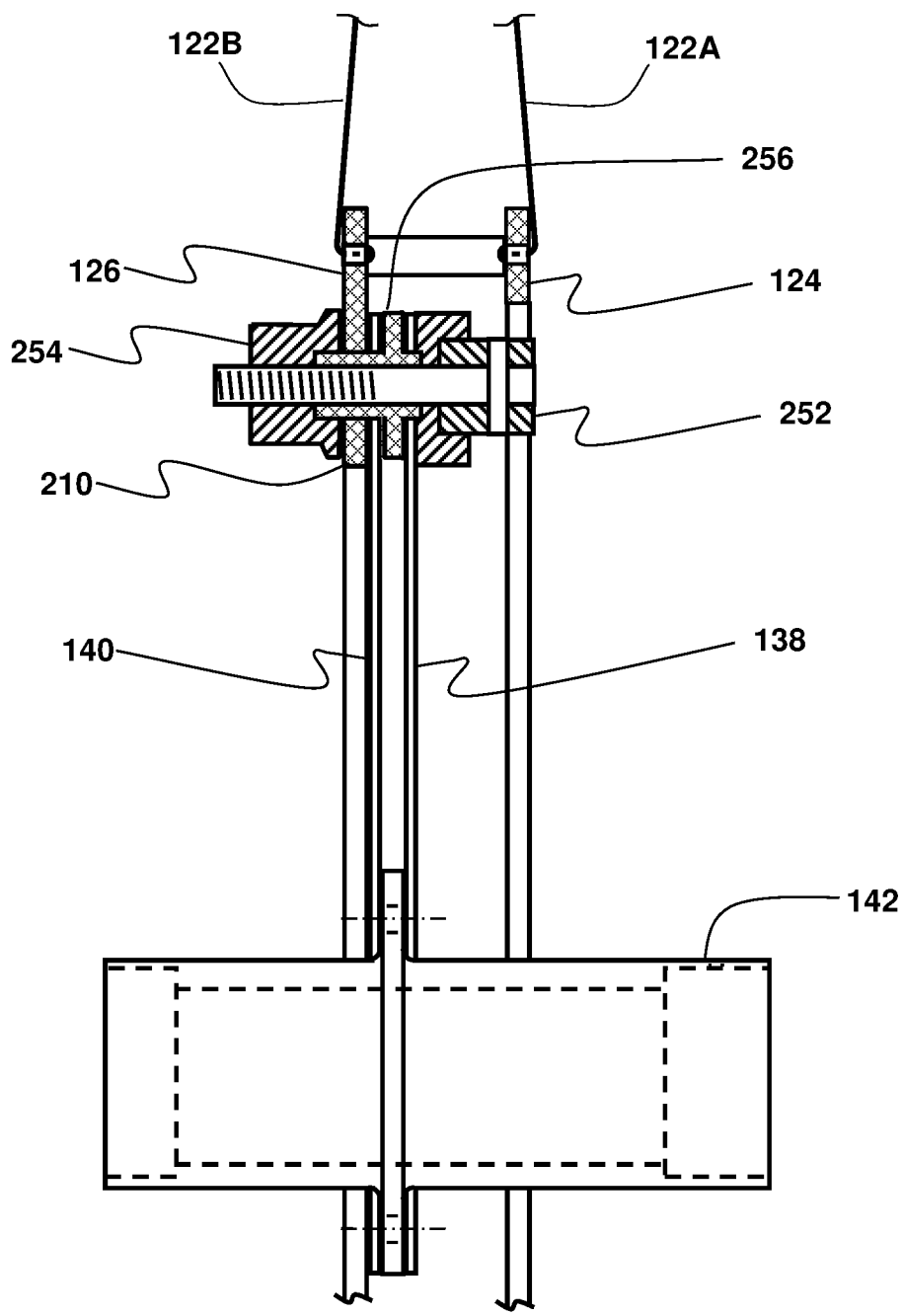
FIG. 4 shows section B-B of FIG. 3A.

FIG. 4 shows section B-B of FIG. 3A; including a hub body (also known as a hub shell or sleeve) 142, a first flat spider 138, a second flat spider 140, a first disk 124, a second disk 126 that includes an annulus-to-hub mounting tab 210, an eccentric quick release mechanism 252, a hand tightenable nut 254, and two spokes 122A and 122B. Also shown is an attachment bushing 256 that can be used to secure the first flat spider 138 and the second flat spider 140 to each other and provide a hollow shaft that fits into the annulus-to-hub mounting tab 210. In this configuration, the two flat spiders, 138 and 140, and attachment bushing 256 combine to provide a rigid coupling between the sleeve (or hub shell) 142 and the features (attachment bushing shaft) used to attach the annular module to the hub module.

4. Alternate Annular Wheel Embodiments

FIG. 5A shows section B-B of FIG. 3A for an alternate embodiment of a spider and annulus attachment system that can be substituted for the system shown in FIG. 4. In FIG. 5A, the spokes are shown at 122A and 122B, the eccentric quick release mechanism is turned 90 degrees and is shown at 252. The hand tightenable nut is shown at 254. The two disks 124 are identical and have no annulus-to-hub mounting tabs (210 in FIG. 3A and FIG. 4). Instead, an annulus-to-hub mounting block 220 spaces the disks 124 and provides an attachment point for the spiders. In the embodiment shown in FIG. 5A, the first spider 238 and second spider 240 are further apart at the point where they are attached to an alternate hub body (hub shell, or sleeve) 242 than they are at the point where they are attached at the rings 124 through the annulus-to-hub mounting block 220. By having the rings be closer together at the point where the spiders attach, the number of spacers needed is reduced and the overall structure for the wheel can be made flatter. Using spiders that have a triangular configuration allows the spiders to be made of substantially thinner material and yet the overall structure provides high axial stiffness because the angled beams in the spiders would need to change in length for the rings to move axially relative to the hub. Further referring to FIG. 5A, the spiders, 238 and 240, can be bolted to flanges on the alternate hub shell 242 (alternate hub body or alternate sleeve), which has the remaining hub components such as bearings mounted in it. At their distal points, each pair of fingers of a spider is separated and held by the attachment bushing 256. The attachment bushings 256 mount into the annulus-to-hub mounting blocks 220, that are shown in FIG. 5B and FIG. 5C, and can be clamped in the annulus-to-hub mounting blocks 220 using hand-actuated cam fasteners that each comprise an eccentric cam quick release device 252 and hand tightenable nut 254. The rings 124 can be spaced apart and held in this spacing by the annulus-to-hub mounting blocks 220. There can also be ring (or annular disk) spacers (such as those shown at 128 in FIG. 3C) to separate the two rings 124. The attachment bushing 256 was shown with reference to FIG. 4. This attachment bushing(s) 256 can serve the following purposes. (1) The bushing(s) can be made of a hard material, such as steel that better facilitates the transmission of force from the narrow spiders to the rings. (2) The bushing(s) can have flanges that space the spiders apart. When the both spiders are on the same side of the location where they are attached to the rings (either the mounting tabs in FIG. 3B and FIG. 4 or the annulus-to-hub-mounting block 220 in FIG. 5A) the packing and unpacking of the human-powered vehicle is simplified because the hub+spiders can be loaded axially directly into the rings 124.

The rings 124 that have been illustrated could simply be cut from sheet metal (such as ⅛" thick flat 6061-T3 aluminum plate) and this cutting operation could be performed using a water jet, laser cutter, plasma cutter, hole saw, milling machine, or lathe using techniques capable of being understood by anyone skilled in the art. The rings 124 could be anodized after they have been made to size.

Alignment of the rim and tire to the center of rotation of the wheel at its axle is one of the technical challenges in configuring, designing, fabricating, and using a strong and reliable bicycle wheel. This alignment is more difficult if the wheel comprises a hub that is detachable from the other wheel components, such as the embodiments described herein—where misalignments can occur at the interface between the annulus and the detachable hub. There are two alignments necessary:

(1) Concentricity (also known as radial alignment, runout, or eccentricity), which can be defined as the distance the axis of rotation of the wheel moves up and down as the wheel rolls on a flat surface, and is also the alignment of the axis of rotation of the hub (i.e. the axle) with the axis of rotation of the rim; and (2) Axial alignment, which can be defined as the distance the rim of the wheel wobbles in a direction parallel to the axis of rotation as the wheel rim rotates 360 degrees about the axle.

Figure 6A:
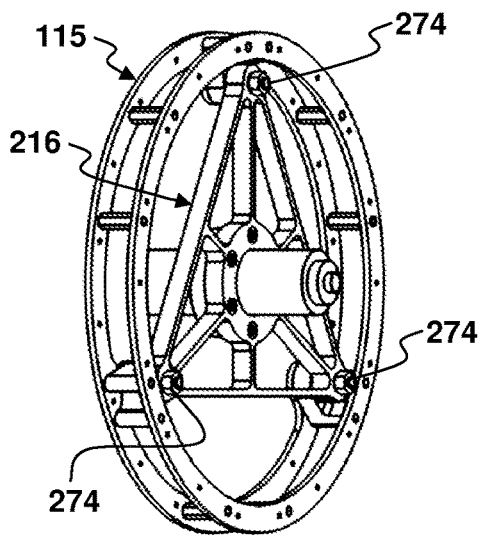
FIG. 6A shows a perspective view of another embodiment comprising a central annulus, a user detachable hub, and three conical attachment elements in the form of lug nuts to attach the annulus to the hub.
Figure 6B:
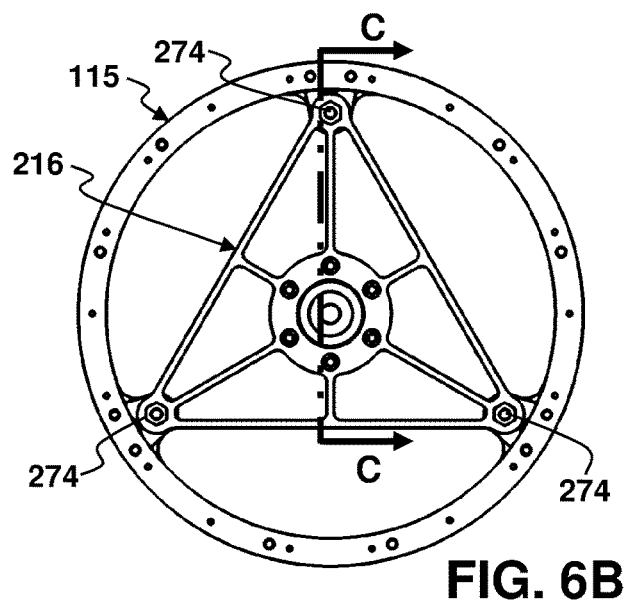
FIG. 6B shows an end view of the assembly of FIG. 6A.
Figure 6C:
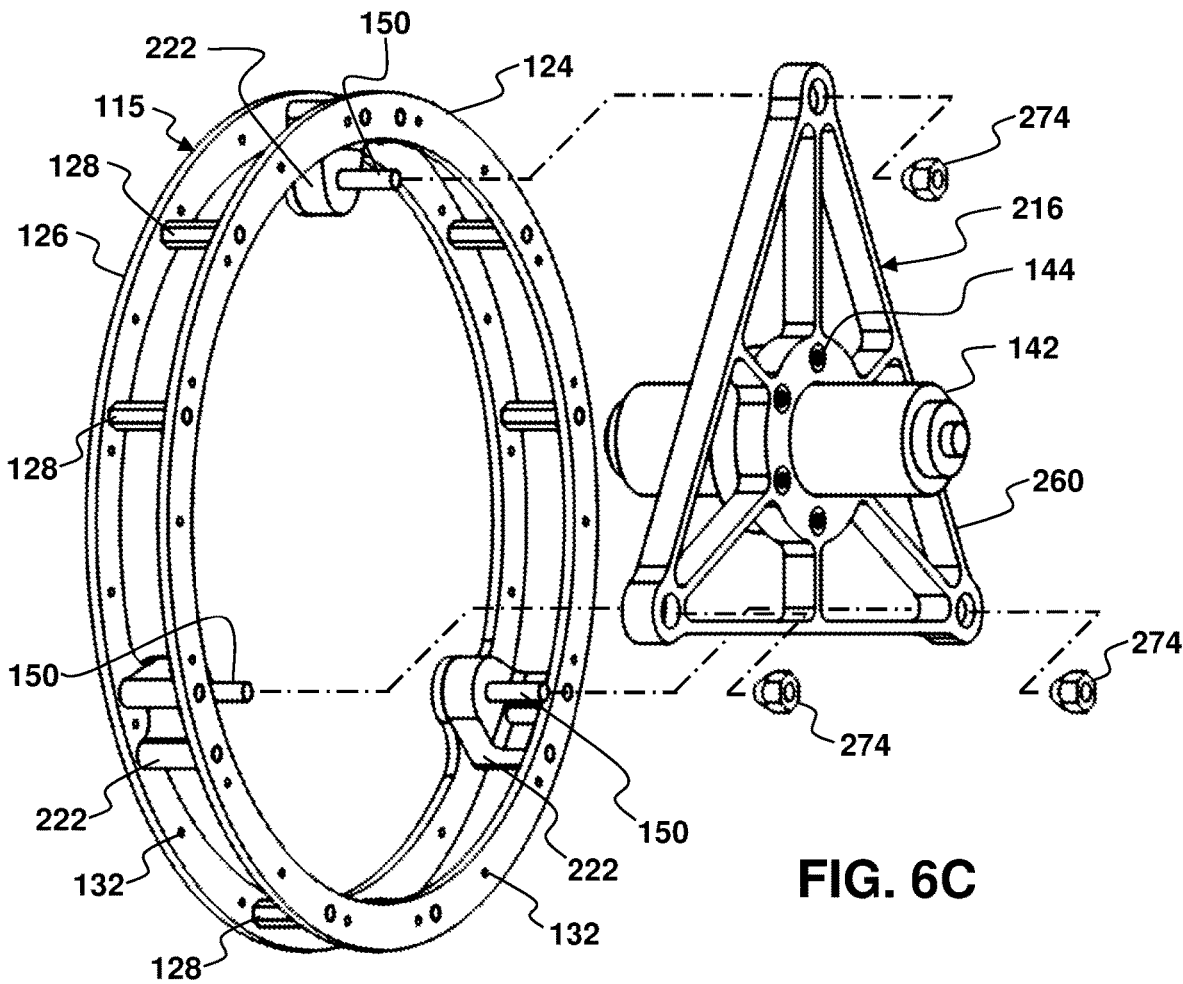
FIG. 6C shows an exploded view of the assembly of FIG. 6A.

In the embodiments described herein, axial alignment can be facilitated by ensuring that the (a) the spider (or other part of the detachable hub) has a flat surface that is perpendicular to the axis of rotation of the hub in the region of engagement with the annulus; (b) that the annulus has a flat surface that is parallel with the axis of rotation of the rim in the regions of engagement with the spider (or other hub part); and (c) that the spider (or other hub part) surface is pressed against the annulus surface. In the embodiments described herein, radial alignment can be facilitated by using a conical feature to press the annulus to the spider (or other part of the hub module). FIGS. 6A to 7D illustrate an embodiment that uses these principles to facilitate radial and axial alignment. More specifically: FIG. 6A shows a perspective view of another assembly comprising an alternate annulus module 115, an alternate user detachable hub module 216, and three lug nuts 274 with conical frustum surfaces. The three lug nuts are configured for user attachment and detachment of the alternate annulus 115 to the alternate hub module 216. It can be understood that these lug nuts 274 will apply a force parallel to the axis of rotation of the rim, and parallel to the axle when the lug nuts are tightened. FIG. 6B shows an end view of the assembly of FIG. 6A with the alternate annulus module 115, the alternate hub module 216, and the three lug nuts 274. FIG. 6C shows an exploded view of the assembly of FIG. 6A with the alternate annulus module 115, the alternate hub module 216, and the three lug nuts 274. FIG. 7A shows section C-C of FIG. 6B, and this section view also illustrates the alternate annulus module 115, the alternate hub module 216, and one lug nut 274.

Further referring to FIG. 6C and FIG. 7A, the alternate annulus module 115 comprises a first annular ring 124 and a second annular ring 126, which can be similar to the rings that were described previously. The alternate annulus module 115 is configured for 36 spokes and there are 18 spoke holes (also referred to as spoke to annulus attachment points) on each ring, examples of which are indicated at 132. The spoke holes on both rings are on the same circular diameter, but the spoke holes on one ring are rotated 10 degrees from the spoke holes on the other ring so there is one spoke hole every 10 degrees with the spoke holes alternating between rings. The second annular ring in this embodiment has three mounting tabs similar to what was shown at 210 in FIG. 4 and the first annular ring in this embodiment does not have mounting tabs, which is also the same as for the embodiment shown in FIG. 4. The alternate annulus module 115 comprises six disk spacers, examples of which are indicted at 128, and three alternate annulus-to-hub mounting blocks, shown at 222. There are three hub-to-annulus attachment bolts 150 that have a tapered engagement surfaces that fit chamfers in the mounting tabs of the first annular ring 126. These hub-to-annulus attachment bolts 150 are threaded into the alternate annulus to hub mounting blocks 222.

Continuing with the description of FIG. 6C and FIG. 7A, the alternate hub module 216 comprises a single thick spider, shown at 260, that is attached to a hub body (or hub shell or sleeve) 142, similar to what has been shown previously, using six spider attachment bolts, examples of which are shown at 144. This single thick spider 260 looks more like a spider web, and can also be called a mounting frame. This mounting frame 260 is monolithic. The mounting frame 260 can be fabricated from flat metal plate that is waterjet cut, laser cut, or cut in some other way capable of being understood by anyone skilled in the art. This produces a component that is highly functional for this application and yet low cost to manufacture. The lug nuts 274 comprise helical threads that are threaded onto the hub to annulus attachment bolts 150 and tightened so that the conical surfaces of the lug nuts 274 engage with conical chamfers in the single thick spider 260 (or mounting frame) to provide a secure engagement that minimizes eccentricity and angular misalignment (wobble) as described previously. The mounting frame 260 has ribs that run directly between the three conically-chamfered mounting features to maximize the stiffness to weight ratio of the mounting frame 260. The alternate hub module 216 also comprises an axle 152 which is coupled to the hub shell or sleeve 142 with two bearings, shown at 158. There are frame attachment regions 154 and 156 shown at the two ends of the axle 152. The axle 152 has a central through hole so that the system can be attached to the front or rear of a bicycle or other human powerable vehicle frame using quick release skewers (i.e. quick release mechanisms such as those shown in FIG. 13B), with one frame attachment region 154 and 156 on each leg of the front fork.

The geometry of the lug nuts 274 is shown in greater detail in FIG. 7B (isometric view), FIG. 7C (side view), and FIG. 7D (end view). In one embodiment, the included angle of the conical section of the lug nut is 60 degrees, as shown in FIG. 7C. This angle has been determined to optimize the axial clamping force and radial alignment force to provide the best alignment of the spoked wheel (such as 120 in FIG. 2A) with the axis of rotation of the hub. The axial clamping force is the force in the direction parallel to the axis of rotation of the rim that presses the hub (and more specifically the mounting frame or spider 260) against the annular module (and more specifically the annulus-to-hub mounting block 222). The radial alignment force is the force in a plane perpendicular to the axis of rotation of the rim, which is typically in an orientation aligned with a radial vector extending into or out of the center of rotation of the rim. This radial force is transmitted from the conical frustum surfaces of the lug nuts 274 to the conical chamfers in the mounting frame or spider 260 in FIG. 7A. The interface between the conical frustum sections of the lug nuts 274 with the conical chamfers of the mating mounting frame or spider 260 can ensure repeatable concentric alignment of the axis of rotation of the hub with the axis of rotation of the rim.

It should be noted that the embodiments shown in FIG. 6A through 7A use lug nuts. It is also possible to make embodiments of the present invention that use lug bolts. Referring to FIG. 7A, the lug nut 274 and hub annulus attachment bolt 150 could be replaced with a lug bolt that is threaded into the annulus to hub mounting block 222. It should also be noted that the conical chamfer feature that the lug nut 274 and annulus attachment bolt 150 (or a lug bolt) could be reversed so that the conical chamfer is on the mounting block 222 of the annular module instead of on the spider or mounting frame 260 that is part of the hub module.

Embodiments of the wheel system shown in FIG. 2A to FIG. 7D can be configured to allow a wheel to be trued very accurately once and to stay true even after the hub had been removed and installed multiple times. This can be accomplished by:

(a) Providing an orientation feature on the annular module;
(b) Providing an orientation feature on the hub module;
(c) Aligning the hub module and annular module orientation features when assembling the wheel;
(d) Truing the wheel with a hub module properly aligned with the annular module; and
(e) Always installing the hub module in the same alignment as when the wheel was trued.

The above procedure ensures that the hub module is always attached to the annular module with the same mounting feature of the hub module being connected to the same hub attachment point on the annular module. By following the above procedure, it is possible to true the wheel more precisely than the tolerances of the parts being used since the truing process can be used to compensate for any dimensional errors.

The orientation features on the hub module and the annular module can be any orientation feature capable of being understood by anyone skilled in the art, examples of which can include, but are not limited to:

(a) One or more stamped markings on the hub module and/or annular module, rim, or a spoke;
(b) One spoke, bolt, mounting block, or region of the spider, an/or other item that is a different color or shape or that has a special marking;
(c) A label or piece of tape on the hub module and/or the annular module, rim, or a spoke;
(d) A printed symbol on the hub module and/or the annular module, rim, or a spoke;
(e) The use of an existing orientation physical feature on the rim, such as the tire stem hole, the weld like, or an existing label on the rim; and/or
(f) A deliberate asymmetry in the location or shape of the attachment regions of the hub module and/or annular module that prevent the hub module and annular module from being assembled in anyway other than the preferred orientation.

The truing process of the user-tensionable spokes in the wheel embodiments described herein can be performed in the following way to accomplish the following objectives:

(a) Ensure that the spokes have a right amount of tension, typically about 100 kilograms of force and in the range of 60 to 140 kilograms of force;
(b) Ensure that the wheel has the appropriate dish (i.e. that the center of the rim is equidistant from the first frame attachment region 154 and second frame attachment region 156 (which can be seen in FIG. 2B and FIG. 7A and is done by increasing the tension of the spokes going to one of the planes, shown at 124 in FIG. 2A relative to the spokes going to the other plane, shown at 126 in FIG. 2A);
(c) Optimize concentricity (also known as radial alignment, runout, or eccentricity and described in more detail previously in this document) by tightening spokes at one clock position of the rim and loosing spokes at the opposite clock position of the rim; and
(d) Minimize wobble (i.e. optimize axial alignment as described in more detail previously in this document) by tightening the left-side spokes relative to the right-side spokes in a region to pull a region of the rim leftwards or vice versa.

Figure 8:
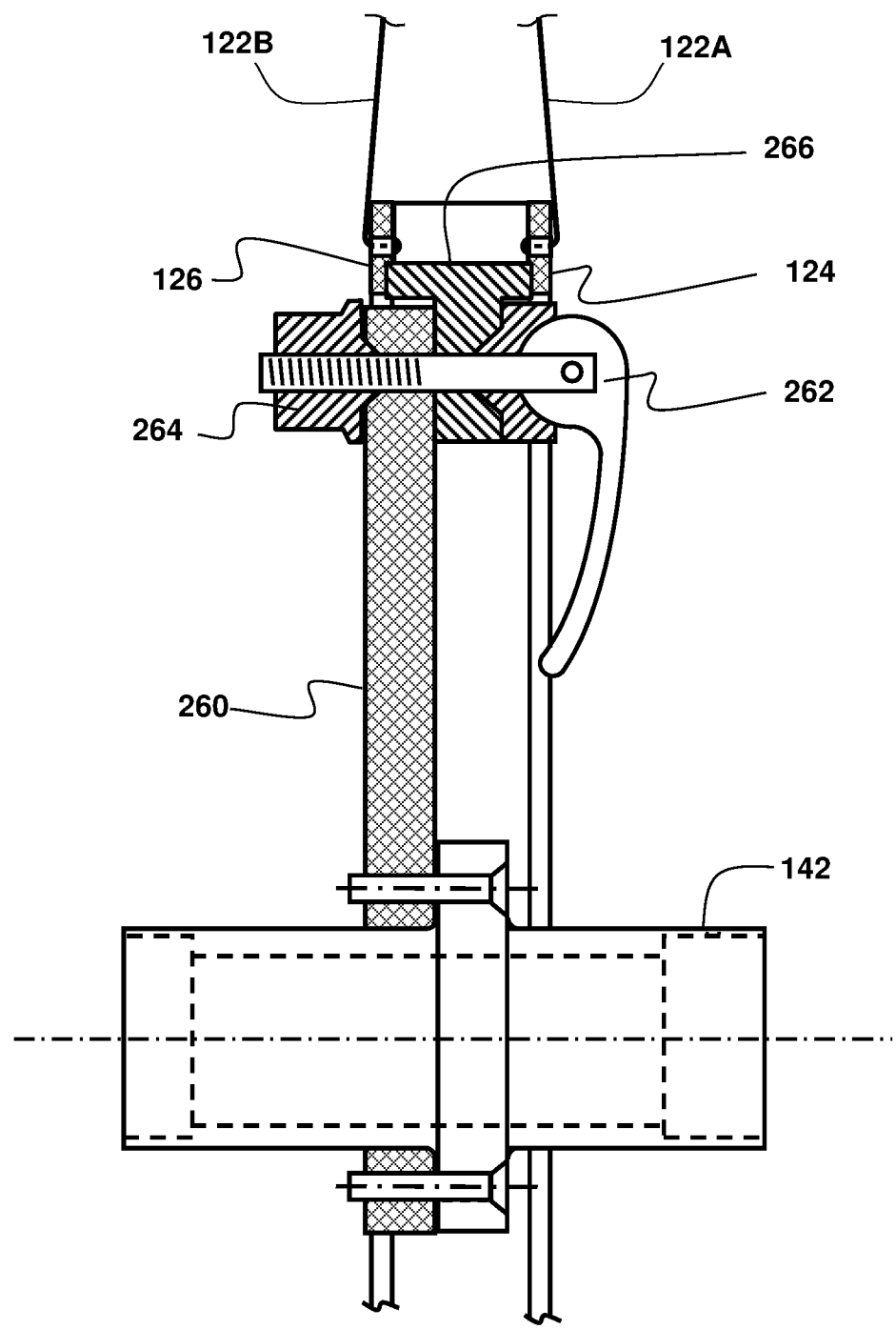
FIG. 8 is a section view of an embodiment that incorporates the conical lug nut principles of the embodiment shown in FIG. 6A to FIG. 7D with the eccentric cam quick release mechanisms of the embodiments shown in FIG. 2A through FIG. 5C to create a conical attachment element that is also an eccentric quick release mechanism.

FIG. 8 shows a section view of an annulus module and hub module that incorporates configuration elements from multiple embodiments that have been described in this document. This configuration addresses the following technical requirements:

(a) Lateral deflection of the rim as a result of lateral forces on the rim is reduced by because a single thick spider (mounting frame) 260 can be stiffer than a pair of spiders, such as the spider pair, 138 and 140 in FIG. 4, or the alternate spider pair 238 and 240 in FIG. 5A;

(b) Having the flat surface of the mounting frame 260 rest directly against the flat surface of the mounting block 266 for this configuration, minimizes wobble of the rim of the wheel; and (c) The use of a hand-tightenable nut with conical attachment interface, shown at 264, to clamp accurately to the single thick spider 260, and the use of an eccentric cam quick release mechanism with conical interface, shown at 262, to clamp accurately to a mounting block with conical feature, shown at 266, combines the ability to repeatably locate the hub concentrically to the rim, even as components wear, that was also shown in the embodiment of FIG. 6A to FIG. 7D, with the cam-actuated tool-free fastener that was shown in the embodiments of FIG. 2A to FIG. 5C.

The embodiment shown in FIG. 8 can be implemented using the same first annular ring 124 and second annular ring 126 that were shown with reference to FIG. 2A, FIG. 4, and FIG. 5A. The near spokes 122A and far spokes 122B could also be implemented in the same way as in previous figures. The hub body (hub shell or sleeve) 142 shown for the embodiment in FIG. 8 can also be very similar to the hub body, hub shell, or sleeve 142 that was shown in the other embodiments.

More broadly, it should be noted that embodiments of the wheels in the present invention can comprise any combination or set of permutations of the elements and features illustrated and/or described in this document. These elements and features can further include, but are not limited to:

a removable hub module that further comprises a brake disk to provide a wheel with a removable hub for bicycles that use disk brakes (if this is done on the front fork, the disk brake would engage with a disk brake caliper located on one leg of the front fork);

the use of any number of fasteners (such as lug nuts, lug bolts, and/or eccentric cam quick release devices) to attach an annular module to a hub module, not just the 3 shown in these embodiments;

using annulus-to-hub mounting tabs (210 in FIG. 3B and FIG. 4) instead of or in addition to mounting blocks (220 in FIG. 5A, FIG. 5B, and FIG. 5C);

using a matching pair of conical features on interface between the single thick spider, 260 in FIG. 8 and the mounting block, 266 in FIG. 8, in addition to or instead of some of the other conical features shown in FIG. 8;

a configuration of the annulus in which straight spokes instead of j-bend spokes are used and therefore the inner attachment points of the spokes are through holes in a hollow cylinder located on two parallel planes that are perpendicular to the central axis of the wheel;

the hub axle (and therefore the hub module and entire wheel) could be configured to attach the bicycle frame at only one point (i.e. on only one side) such as a front hub that is configured to attach to a fork similar to the "Lefty" fork made by Cannondale; and/or a wheel configuration that has no central hub. Instead, there could be a ring-shaped inner annulus (to which the spokes are attached) that further comprises one or more bearings that have a large central opening. One race of this bearing or bearings could be attached to the annulus. The other race could be attached to a ring-shaped element that does not rotate when the wheel rotates and this ring-shaped element could be attached to one arm of a front "fork" that then attaches to the rest of the bike frame in a way that is very similar to the "Lefty" fork made by Cannondale. Thus, the wheel and fork would always have a large diameter aperture that allows a real wheel to nest inside of the center of a front wheel.

5. Spoke Lacing Patterns

Figure 9A:
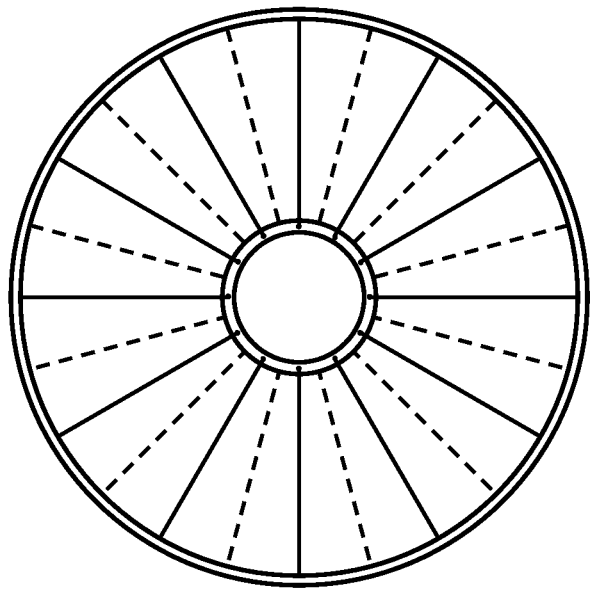
FIG. 9A shows radial spoking between an annulus and a rim.
Figure 9B:
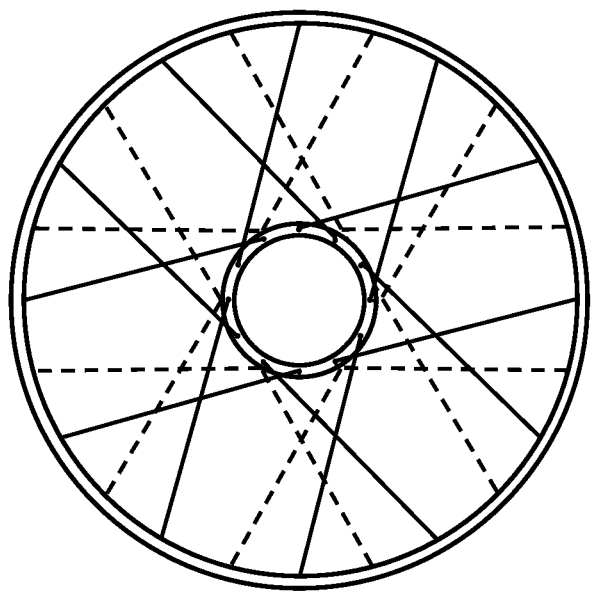
FIG. 9B shows tangential spoking from an annulus to a rim.
Figure 9C:
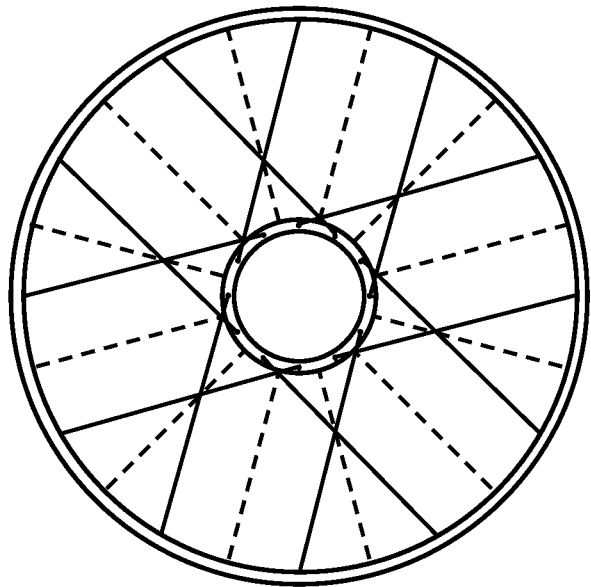
FIG. 9C shows a combination of radial and tangential spoking between an annulus and a rim.

FIG. 9A, FIG. 9B, and FIG. 9C show examples of spoke lacing patterns that can be used with embodiments of the present invention. For ease of understanding the spokes that reach the near plane of the annulus for these wheels are shown as solid lines and the spokes that reach the far plane of the annulus are shown as dotted lines. FIG. 9A shows an embodiment in which both the near plane and the far plane spokes are laced radially. FIG. 9B shows an embodiment in which both the near plane and the far plane spokes are laced tangentially. FIG. 9C shows an embodiment in which the spokes in the two planes are laced differently from each other. In the configuration show in FIG. 9C, the near plane spokes are tangentially laced and the far plane spokes are radially laced. There can be advantages and disadvantages to each of the types of spoke lacing patterns shown in FIG. 9A, FIG. 9B, and FIG. 9C. For example, the radial-radial pattern shown in FIG. 9A is often used for front wheels on bicycles with rim brakes because these wheels transmit no tangential force and this configuration maximizes the radial and axial loads that can be carried. Rear wheels are used to drive the bike forward and therefore must transmit torque (i.e. tangential force) from the hub to the rim and the tires, so a tangential-tangential spoke pattern such as that shown in FIG. 9B is most often used. A mixed tangential-radial pattern, such as that shown in FIG. 9C can be beneficial in some situations.

6. Foldable Compact Bicycle and Bicycle Frame Embodiment

Prior art bicycles designed for compact storage and transport generally fall into the following non-exclusive categories:

GROUP A comprises bicycles such as the embodiments shown in U.S. Pat. No. 4,426,606 (Hon) and U.S. Pat. No. 5,975,551 (Montague) that (1) have a single fold about a substantially vertical axis at a point located forward of the seat tube (Hon) or proximate to the seat tube (Montague), (2) do not remove the rear wheel when folding, and (3) have a folded size in at least one direction that is larger than diameter the of the wheels and typically also wider than 10 inches because nothing has been done to optimize the placement of the central hubs of the wheels;

GROUP B comprises bicycles such as U.S. Pat. No. 4,182,522 (Ritchie) that (1) fold the rear of the frame down and under about a horizontal axis located behind the seat tube, (2) do not remove the rear wheel when folding, (3) fold the front tube about a vertical axis, and (4) do not remove the front wheel while creating a folded size that can be smaller than the airline 62 linear inch limit when small wheels are used; and GROUP C comprises bicycles such as U.S. Pat. No. 5,586,652 (Smilanick) that have a frame that disassembles after the front and rear wheels have been removed to allow the front frame section, rear frame section, and the two wheels of a bicycle with full size wheels to be separately packed into a 26×26×10 inch case that meets the airline requirements for full-size luggage not subject to a baggage surcharge.

Important differences between the present invention and the above groups of bicycles are illustrated in the table below:

|  | Group A | Group B | Group C | Invention |
|---|---|---|---|---|
| Frame fold axis | Vertical | Horizontal and vertical | Disassembled not folded | Horizontal |
| Fits 26 × 26 × 10 | No | Yes | Yes | Yes |
| Full size wheels | Some models | No | Yes | Yes |
| Wheels removed | Typically not | No | Yes | Yes |

The table above shows that embodiments of the present invention are similar to Group C in that a bicycle using full size wheels can fit into the 62-linear inch size (typically 26×26×10 inches if 700C wheels are used). Embodiments of the present invention differ from Group C in that embodiments of the present invention are based on a frame that can be folded, while bicycles in Group C have frames that are disassembled, not folded. The disadvantages of disassembling a bicycle frame can include:
(a) Assembly and disassembly can require special fasteners and/or tools;
(b) The cables that run from the front of the bike (typically on or near the handlebars) to the rear of the bike (for the derailleur and rear brakes, for example) typically need to be disconnected to pack the separable bicycle parts;
(c) The separable parts might need to be wrapped to keep them from rubbing against each other and causing damage;
(d) It might require detailed instructions, practice, and finesse to place each separable part in the case; and
(e) The entire process of disassembly and packing the bicycle is likely to take significantly more time than if at least the main bicycle frame sections could be folded together instead of needing to be detached from each other.

For the above reasons, it is highly desirable to fold as many parts of the bicycle instead of disassembling and packaging these parts.

Figure 10A:
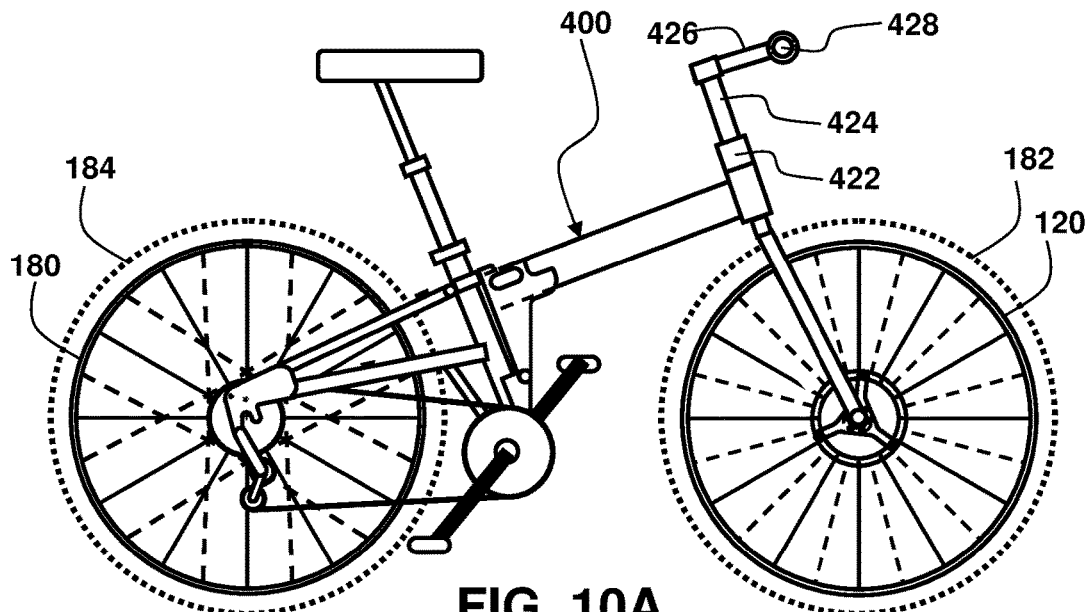
FIG. 10A shows a bicycle that comprises a folding frame and an annulus front wheel with a removable hub.

FIG. 10A illustrates the main components of an embodiment of a human-powerable bicycle that uses a folding frame and full-size wheels. The system shown in FIG. 10A is in its unpacked or "ride" mode. This system comprises a folding bicycle frame 400, a spoked first wheel 120 that is also a front wheel, a first tire on the first wheel 182, a second wheel 180 that is also a rear wheel, and a second tire 184 on the second wheel. The embodiment shown in FIG. 10A also comprises a tool-free handlebar height and rotation module 422 (which can comprise a steerer tube extender 424), a stem 426, and foldable handlebars 428, which are also shown in FIGS. 10B, 10C, 10D, 10E, and 10F. The tool-free handlebar height and rotation module 422 shown in these figures has two functions: (a) it can allow a user to adjust the height of the handlebars; and (b) it can allow the user to rotate the handlebars by 90 degrees. In one embodiment, the tool-free height and rotation module 422 is a Speedlifter Twist product available from by shulz GMBH of Saarbrucken, Germany. It is also possible to implement the two functions of the tool-free handlebar height and rotation module in two different sub-modules. For example, the Montague Octagon Steerer Tube Extender can be used to adjust the height of the handlebars in a tool-free way. The Dahon D4D Flatpak Stem can be used to rotate the handlebars 90 degrees relative to the forks in a tool-free way.

Figure 10B:
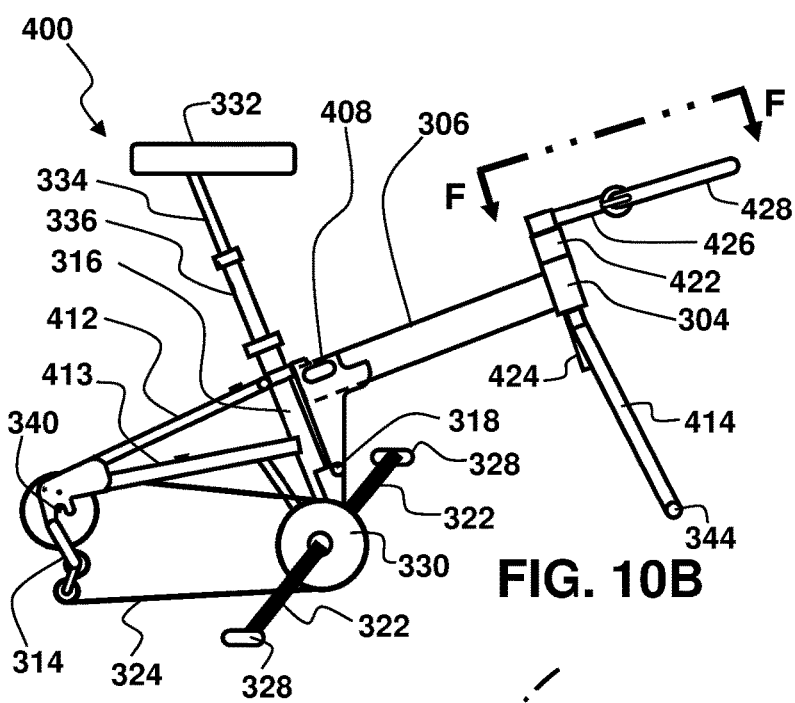
FIG. 10B shows the folding bicycle frame of FIG. 10A without the front and rear wheels and with the handlebars folded and the steerer tube extender collapsed inside the steerer tube.

FIG. 10B shows the folding bicycle frame of FIG. 10A at 400, without the wheels and tires. The folding bicycle frame 400 can have a front frame section. The front frame section can include a front tube 306, which could also be called a top tube, a front frame tube, or a down tube. A head tube 304 can be permanently attached one end of the front tube 306 and a connection module 408 (which could also be called hinge module, fold module, adapter module, or folding joint) can be permanently attached to the other end of the front tube 306. The connection module 408 can comprise a front fame pivot element and a front frame fastening element. The front frame section can include a front handlebar module, that is attached to a front fork 414, that rotates inside the head tube 304. The front fork 414 can be configured for holding the front wheel in a pair of front dropouts 344.

Further referring to FIG. 10B, the folding bicycle frame 400 can have a rear frame section that attaches to the front frame section. The rear frame section shown in FIG. 10B has a pair of upper rear stays (which can also be called upper seat stays) 412 and a pair of lower rear stays (which can also be called lower seat stays) 413. Note that both the upper rear stays 412 and the lower rear stays 413 in the embodiment shown in FIG. 10B are elevated stays (i.e. the rear stays are designed to be above the chain or belt 324. On bicycles, the drive side is typically the right (or starboard) side and the non-drive side is typically the left (or port) side of the bicycle when viewed from the rear looking forward. The drive side is the side that the chain (or drive belt) is on. It is also the side of the wheel that typically has a cog for engaging a chain or drive belt 324. The rear stays in FIG. 10B have rear dropouts 340 at the end of the stays that is opposite of the end of the rear stays that is attached to the seat tube 316. The rear dropouts 340 are configured for holding a side of the center (e.g. central axle) of the rear wheel (180 in FIG. 10A). The drive-side rear stays can have a rear derailleur 314 mounted near its dropout. The end of the rear stays opposite of the dropouts 340 are fixedly, immovably, and permanently attached to a main seat tube 316 (which can also be called a rear frame section seat tube). The rear stays and main seat tube 316 can be rotatably connected to the connection module 408 of the front section at a folding frame pivot axis 318 through the use of a rear frame pivot element that is permanently attached to the other rear frame section components, and is rotatably connected to a front frame pivot element of the connection module 408 on the front frame section. In one embodiment, a shaft and bushings are used to create the pivot or hinge.

The main seat tube 316 (and other parts of the rear frame section) can be rigidly and detachably attached to the front frame section using a rear frame fastening element that is attached to the rear frame seat tube 316. This rigid connection can also be called an immovable connection. The rear frame fastening element can be attached to a front frame fastening element.

Further referring to FIG. 10B, the rear frame section can also have cranks 322 (one on the starboard side of the frame and one on the port side of the frame) that are connected to the main seat tube 316 through a crankshaft and bottom bracket housing that are not visible in FIG. 10B. The bottom bracket housing is fixedly, permanently, and immovably attached to the main seat tube 316. To further clarify, the bike frame shown in FIG. 10B can have the following attributes:
(a) The frame has a front frame section and a rear frame section;
(b) The front frame section comprises a front frame tube having a head tube attached at one end and a connection module attached at the other end;

(c) The head tube is configured for rotatable attachment to a front fork;
(d) A front wheel can be mounted into the dropouts of the front fork and this front wheel could be one with a removable center section so that the front wheel fits compactly over the center of a rear wheel when the removable center section has been removed;
(e) The front fork is also configured for the attachment of a front handlebar;
(f) The front frame section has two points of engagement with the rear section, a pivot connection and a user detachable rigid (immovable) attachment connection;
(g) The user detachable connection on the front frame section is used when the bicycle is unfolded and placed into "ride" mode;
(h) The rear frame section comprises a rear frame seat tube, a bottom bracket housing, a drive side rear stay and a non-drive side rear stay, all of which are rigidly, securely, immovably, and permanently attached to each other;
(i) The pivot connection allows the front frame section to pivot relative to the rear frame section about a horizontal axis that is located in front of the seat tube; and
(j) The rigid attachment connection attaches the front frame section to the rear frame section at a point proximate to the seat post clamp.

Additionally FIG. 10B shows that the rear stays on each side of the rear section of the folding bicycle frame 400 are in an elevated chain stay configuration, which means that the bicycle chain 324 (or a belt, such as a toothed rubber belt) can be removed from the bicycle frame 400 without the loop of the bicycle chain 324 (or belt) needing to be opened or the frame needing to be opened or disassembled. This can be accomplished by having a pair of chain stays 413 (one on each side) that connect between the bottom bracket housing and the rear dropouts 340 in a configuration that is above the bicycle chain 324 (or belt). These "elevated chain stays" 413 can also be called lower rear stays, to distinguish them from upper rear stays 412 that are above the lower chain stays. Additional components shown in FIG. 10A include pedals 328 that are connected to the cranks 322. These pedals 328 could be user removable without needing any tools. Examples of tool-free user-removable pedals can include MKS EZY pedals, Wellgo POP-OFF pedals, and DAHON QUICK DRAW pedals.

FIG. 10B also shows a front chain ring 330 that connects the cranks 322 to the bicycle chain 324 (or belt), a seat 332, a seat post 334 that is connected to the seat 332, and a telescoping seat tube 336 that connects the seat post 334 to the main seat tube 316. It should be noted that the telescoping seat tube 336 is optional. In some embodiments, the seat post 334 is directly connected to the seat tube 316.

The front forks 414 shown in FIG. 10B have been configured to allow a steerer tube extender 424 to telescope inside the center of the steerer tube (416 in FIG. 14A and FIG. 14D) that is part of the front fork 414. Thus, the steerer tube extender 424 can be at least partially below the bottom of the steerer tube when the handlebars are moved to their lowest point, as shown at 424 in FIG. 10B. The steerer tube extender 424 can be at least partially visible between the tool free handlebar adjustment element 422 and the stem 426 when the handlebars are raised, as shown in FIG. 10A.

Figure 10C:
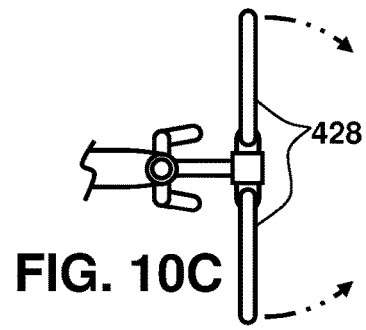
FIG. 10C shows view F-F of FIG. 10B before the handlebars are folded.
Figure 10D:
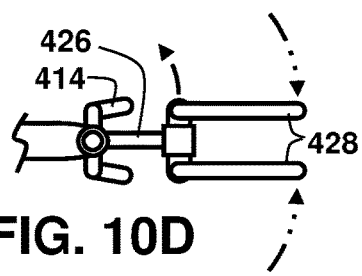
FIG. 10D shows view F-F of FIG. 10B with the handlebars folded.
Figure 10G:
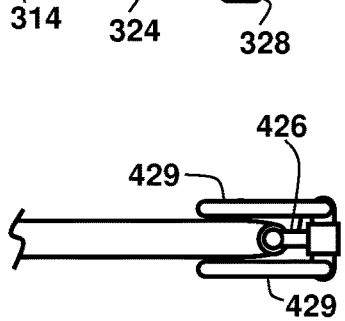
FIG. 10G shows the view of 10F for a system that uses alternate folding handlebars that fold in the direction of the stem and adjacent to the stem.
Figure 10F:
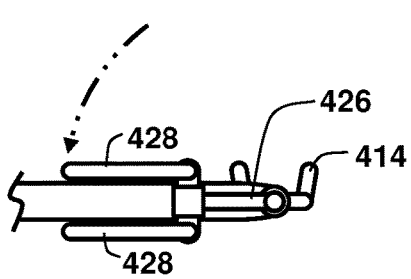
FIG. 10F shows the view of 10E with the front fork, stem, and handlebars rotated an additional 90 degrees counterclockwise.
Figure 10E:
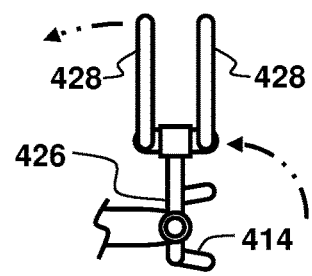
FIG. 10E shows view F-F of FIG. 10B with the handlebars folded and the stem rotated 90 degrees counterclockwise relative to the front fork.

Referring in greater detail to the foldable handlebars 428, these are shown unfolded in a side view in FIG. 10A. The foldable handlebars 428 are shown folded in a side view in FIG. 17O. The foldable handlebars 428 are further illustrated in FIG. 10C, FIG. 10D, FIG. 10E, and FIG. 10F, which are based on view F-F of FIG. 10B (a top view of the handlebars, stem, and fork). In FIG. 10C, the foldable handlebars 428 are unfolded and in a "normal ride" mode. The rest of the bike is also in a "normal ride" mode. In FIG. 10F, the foldable handlebars 428 are folded and the rest of the bike is also in a "packed mode". The steps to get from a "ride mode" to a "packed mode" can generally be implemented in any order and comprise the following:

(a) Removing the front wheel and the rear wheel as shown by comparing FIG. 10A, which has the wheels on the rideable bicycle, with FIG. 10B, which shows a folding bicycle frame 400 without the wheels.
(b) Moving the handlebars 428 and stem 426 down by telescoping the steerer tube extender 424 inside the steerer tube (416 in FIG. 14A and FIG. 14D) that is part of the front fork 414 in FIG. 10B. This can be seen by comparing FIG. 10A with FIG. 10B.
(c) Folding the handlebars 428 together, which can be seen by comparing FIG. 10C with FIG. 10D.
(d) Rotating the stem 426 and handlebars 428 relative to the front fork 414, which can be seen by comparing FIG. 10D with FIG. 10E. In the embodiment shown, this is a rotation of approximately 90 degrees about the central axis of the steerer tube.
(e) Rotating the fork 414, stem 426, and handlebars 428 together, which can be seen by comparing FIG. 10E with FIG. 10F. In the embodiment shown, this is a rotation of approximately 90 degrees about the central axis of the steerer tube. This rotation is done in the same direction as the rotation of the stem and handlebars relative to the front fork, making for a total rotation of the stem and handlebars of approximately 180 degrees, which orients the ends of the foldable handlebars 428 to point towards the rear of the bike.

The foldable handlebars 428 used in the embodiment shown in FIG. 10A to FIG. 10E can be any handlebars similar to the ones shown in this document. There is utility in having foldable handlebars 428 that fold away from the stem 426 as this will allow both the stem 426 and the handlebars 428 to be pointed in the same direction away from the axis of the steerer tube. This minimizes the packed size of the folding bicycle frame 400 when the foldable handlebars 428 and stem 426 are rotated a total of 180 degrees to face the rear of the bike. One example of folding handlebars 428 that can used in embodiments of the present invention are the handlebars made by Smaller International of Taiwan. Another example is the folding aero bar system made by Morf Technologies. The Morf Technologies aero bar system further comprises bar ends that stay parallel with each other when the handlebars are folded, which provides for additional hand positions for riding. The Morf Technologies folding handlebars can convert from a first ride mode in which the bars are perpendicular to the direction of travel to a second ride mode or "aero bar" mode in which the bars and bar ends are aligned with the direction of travel. The conversion from "perpendicular" mode to "aero bar" mode can be done while the bike is being ridden, which can be an additional functional benefit. If the stem is short, it is also possible to use folding handlebars that fold toward the rear if the front stem is rotated forward such as the alternate configuration using the alternate folding handlebars 429 shown in FIG. 10G. Lekuma, in Taiwan makes one example of handlebars that fold rearwards relative to the stem that can be used with embodiments of the folding frame shown herein.

Figure 11A:
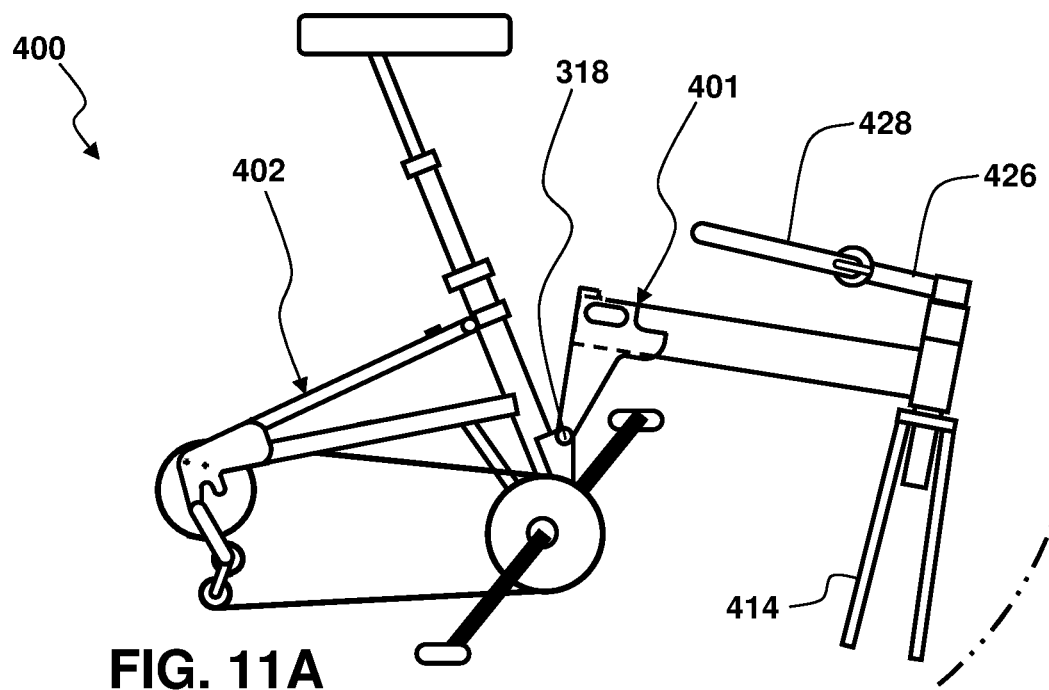
FIG. 11A shows the configuration of FIG. 10B with the front fork, stem, and handlebars in the position shown in FIG. 10F and with the front frame section rotated about 30 degrees relative to the rear frame section at a frame hinge (or pivot) point.
Figure 11B:
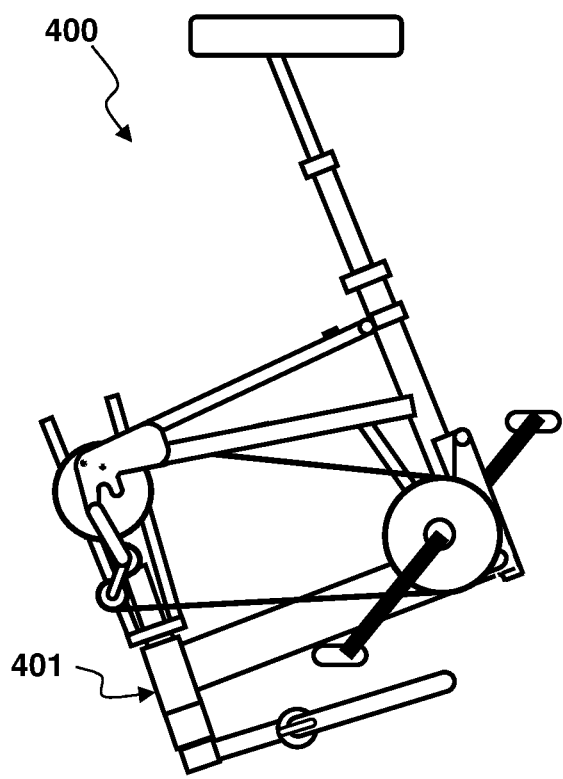
FIG. 11B shows the configuration of FIG. 11A with the front frame section now rotated 180 degrees from the original position that was shown in FIG. 10B.
Figure 11C:
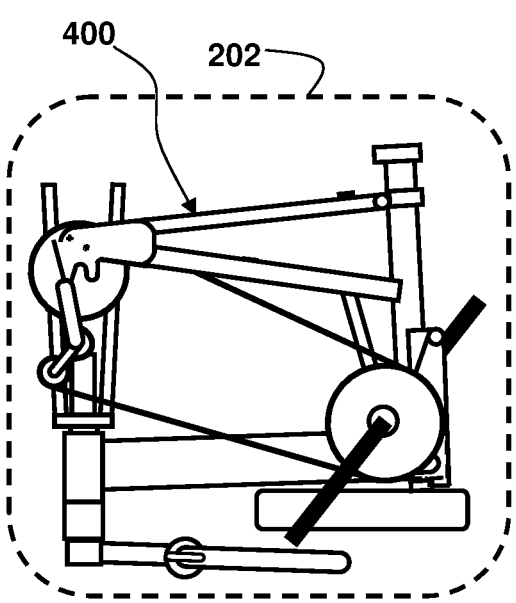
FIG. 11C shows the configuration of FIG. 11B with the seat and seat post inserted into the opposite (bottom) end of the seat tube, the pedals removed, and the resulting assembly placed into a 26×26 inch volume.

FIG. 11A, FIG. 11B, and FIG. 11C illustrate one method for packing the folding bicycle frame shown at 400 in FIG.

10B into a small size. The first step, shown in FIG. 11A is to detach the rear frame fastening element 320. This allows the front frame section (comprising the head tube 304, front tube 306, and connection module 408 in FIG. 10A) to rotate clockwise about an axis that is (a) located at the folding frame pivot axis 318 (b) is perpendicular to the plane of the frame and the plane of the rear wheels, and (c) could also be defined as being parallel to the axis of rotation of the rear wheels and the axis of rotation of the crankshaft in the central axis of the hollow cylindrical bottom bracket housing. In FIG. 11A the front frame section has been rotated about 30 degrees from its original "ride" position. The front fork 414 has also been rotated about 90 degrees in the head tube 304 to more clearly reveal the front handlebar module 194. In FIG. 11B, the front frame section has been rotated approximately 180 degrees relative to the rear frame section, which means that that the parts of the front fork 414 are between the rear stays (412 and 413 in FIG. 10B) and proximate to the rear dropouts. In FIG. 11B, the seat post and telescoping seat tube that were shown in FIG. 10B have also been nested together. When the seat post and/or the telescoping seat tube are moved as low as possible, the seat post and/or telescoping seat tube can extend downwards beyond the bottom of the main seat tube to a region below the bottom bracket housing. In FIG. 11C the pedals have been removed from the cranks and the front handlebar module 194 has been removed from the front fork 414 and packed adjacent to the front tube 306. Because the front handlebar module 194 has a substantially straight section, it can easily and compactly be strapped to the front tube 306. In one embodiment, a mounting unit for a bicycle pump can be re-purposed for securely holding the front handlebar module 194 when the frame is packed. After the steps described above, the entire folded bicycle frame fits within a 26×26 inch size, shown at 202. Using this configuration and folding technique it is possible to fit an entire bicycle frame into a size smaller than 26×26 inches, such as 24×24 inches, 24×22 inches, and/or 22×22 inches. The third dimension (thickness) of any of these folded frames can be approximately 6 inches (the width of the rear dropouts), less than 7 inches, less than 8 inches, less than 9 inches, or less than 10 inches.

Figure 12A:
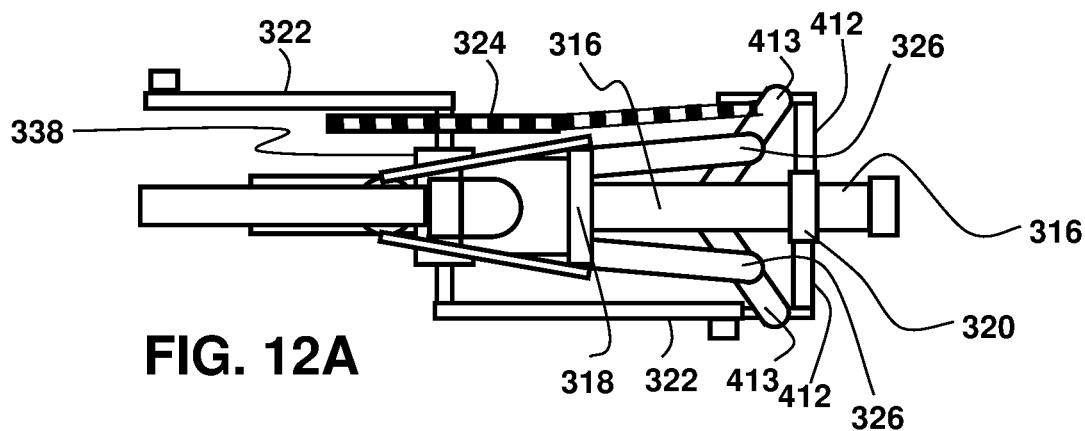
FIG. 12A shows a side view of the folded bicycle frame of FIG. 11C.
Figure 12B:
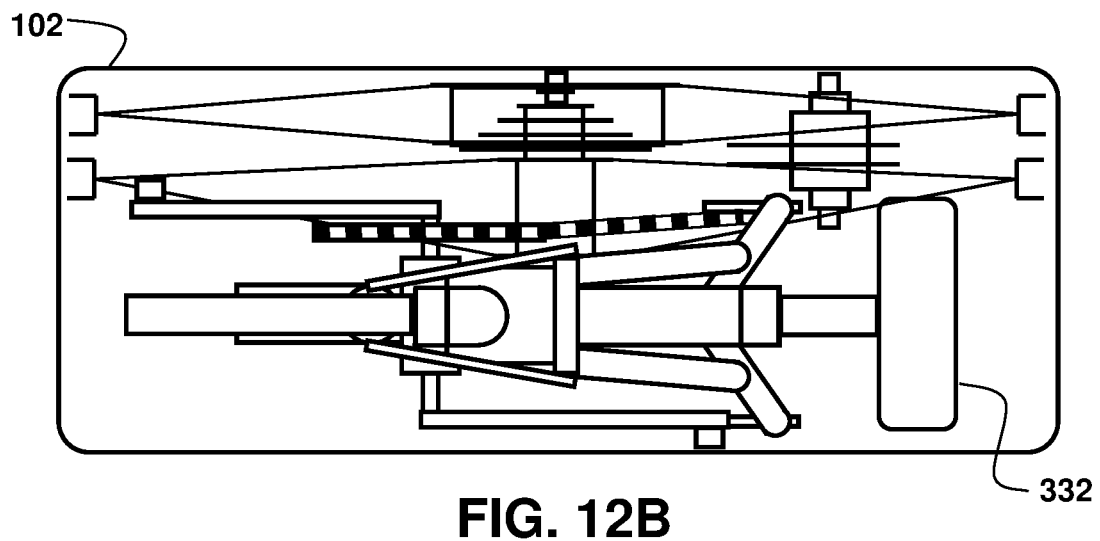
FIG. 12B shows the folded bicycle frame of FIG. 12A and the front and rear wheels and seat of FIG. 10A packed into a 26×26×10 inch physical volume similar to the configuration that was shown in FIG. 1D.
Figure 12C:
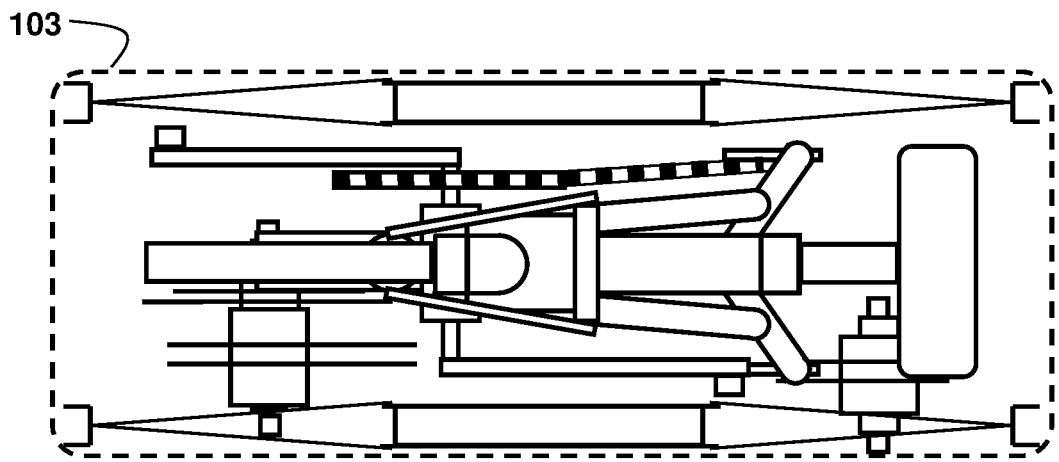
FIG. 12C shows the folded bicycle frame of FIG. 12A and the front and rear wheels of FIG. 1E packed into a 26×26×10 inch physical volume similar to the configuration that was shown in FIG. 1F.

FIG. 12A shows a side view (which could also be called an end view) of the folded bicycle frame of FIG. 11C. FIG. 12B adds the front and rear wheels of FIG. 10A, and the seat and packs the entire bicycle, including the wheels, into the 26×26×10 inch container 102 of the configuration that was shown in FIG. 1D. FIG. 12C packs everything into the flexible 26×26×10 inch bag 103 of the configuration that was shown in FIG. 1F. To help in understanding these illustrations:

(a) the seat is shown at 332;
(b) the lower rear stays are shown at 413;
(c) the upper rear stays are shown at 414;
(d) the bicycle chain is shown at 324;
(e) the rear stay stiffeners are shown at 326;
(f) the cranks are shown at 322;
(g) the bottom bracket housing (crankshaft housing) is shown at 338;
(h) the lower pivot element is shown at 318;
(i) the user detachable upper attachment element is shown at 320; and
(j) the main seat tube is shown at 316.

Figure 13A:
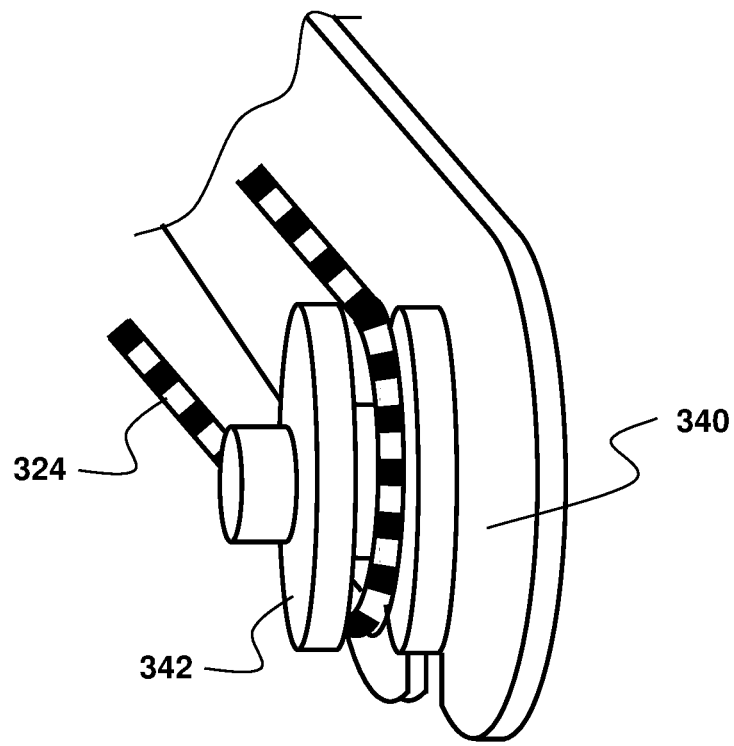
FIG. 13A shows a chain keeper that can be used to guide the chain around the rear dropout when the rear wheel has been removed, such as the configurations shown in FIG. 10B, FIG. 11A, FIG. 11B, and FIG. 11C.

When the rear wheel is removed from the frame, as shown in FIG. 10B, FIG. 11A, FIG. 11B, and FIG. 11C, the bicycle chain, 324 in FIG. 10B, (or belt) is no longer connected to the rear wheel and can lay loosely in the region of the rear dropout 340, which can result in damage during transit. To remedy this risk of damage, the rear wheel cog that held the chain or belt can be replaced by a chain keeper 342 that mounts into the drive side rear dropout 340 as shown in FIG. 13A and thereby guides the bicycle chain 324 (or belt). A chain keeper 342 typically comprises a toothless spool-shaped pulley that provides a slot that guides the chain (or belt) around an arc of approximately 180 degrees. The chain keeper 342 can be attached to the rear dropout using any detachable attachment method, such as mechanical hardware in the form of a bolt that goes through the pulley and nut that secures the pulley to the dropout 340.

Figure 13B:
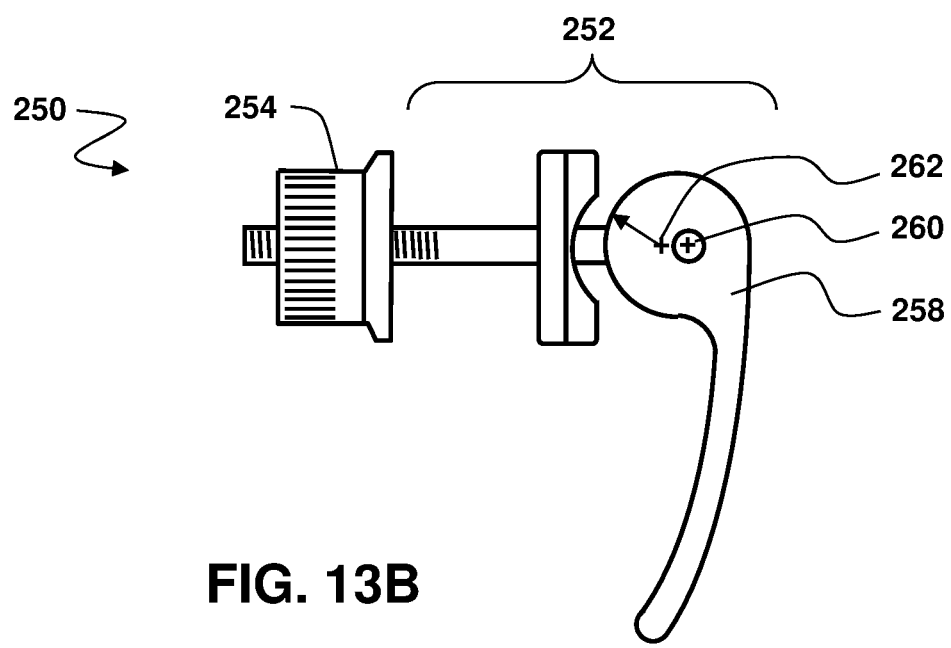
FIG. 13B illustrates a quick release cam mechanism suitable for use with embodiments of the present invention.

In one embodiment, the bolt and nut described with reference to the chain keeper in FIG. 13A can be replaced by an eccentric cam quick release device 250 shown in FIG. 13B. An eccentric cam quick release device 250 typically consists of a hand tightenable nut 254 that is screwed onto an eccentric cam quick release mechanism 252. Such devices 250 with M5 (5 mm) threads are typically used as quick release devices for holding bicycle wheels into dropouts and such devices 250 using M6 (6 mm) threads are typically used for clamping a seat post into a main seat tube on a bicycle. In embodiments of the present invention, such eccentric quick release devices can also be used as the user detachable upper attachment element 320 as shown in FIG. 10B, as a method for attaching a hub 116 to a wheel as illustrated in FIG. 2A, to secure the chain keeper 342 to the rear dropout, as shown in FIG. 13A; to secure a seat post into a main seat tube or a telescoping seat tube; to secure a telescoping seat tube into a main seat tube; to attach wheel to a frame; to attach a rack to frame; to attach handlebars to a front fork; and/or to attach a something to a rack. Operation of the eccentric cam quick release mechanism 252 in FIG. 13B can best be understood by observing that the eccentric cam, shown at 258 has an eccentric cam center of rotation 260 that is offset from the center of curvature of the eccentric cam surface, which has been shown at 262 as a radius arrow.

7. Fork with Clearance for Steerer Tube Extender

FIG. 14A shows a generic front fork 414 for a bicycle and identifies the main elements of a typical bicycle front fork: a steerer tube 416; a fork crown 418; and fork blades 420. The fork crown 418 typically has a fork crown through hole 430 that can be used for attaching rim brakes and fenders to the front fork 414.

FIG. 14B shows section G-G of FIG. 14A for a prior art fork crown 418. In the prior art, the fork crown through hole 430 was designed for a through bolt 432 to be used for attachment of frame parts (brakes, fenders, etc.) to the front fork. However, the fact that the through bolt 432 extends across the center of the steerer tube would prevent the use of a telescoping steerer tube extender (424 in FIG. 10B) that extend through the center of the steerer tube from the top of the steerer tube to a region below the through hole 430.

FIG. 14C shows section G-G of FIG. 14A with an embodiment that addresses the interference issue between the steerer tube extender (424 in FIG. 10B) and the through bolt 432. In the embodiment shown in FIG. 14C, the front fork further comprises a mounting bracket 434 that is attached to the front or rear of the fork crown 418. There is an alternate bolt 433 attached to the mounting bracket 434 and that can be used for the same purposes as the through bolt 432 prior art embodiment shown in FIG. 14B. The alternate bolt 433 can be accessed for insertion and tightening through the fork crown hole 430, which could now be larger in diameter than in the prior art to allow the bolt head to fit through.

FIG. 14D shows a perspective view of the crown region of an alternate front fork that uses two parallel plates to create the crown. Like the other embodiments shown, this alternate front fork also has a steerer tube 416 and fork blades 420. The fork crown comprises two plates: an upper fork crown plate 470 and a lower fork crown plate 472. There is a mounting plate 435 attached to the upper plate 470 and lower plate 472 and the alternate bolt 433 goes through only this mounting plate. FIG. 14E shows section H-H of FIG. 14D, to illustrate the location of the fork crown through hole 430, the alternate bolt 433, the lower fork crown plate 472, and the mounting plate 435. Also shown is a cross section of the steerer tube 416 and the fork blades 420.

8. Rigid Folding Joint Between Front and Rear Frame Sections

Structural rigidity (also known as stiffness) and strength are technical challenges in designing and fabricating lightweight bicycle frames. The challenges are even greater for folding frames than for non-folding frames. The region of the bicycle frame proximate to the pedals and cranks is one of the most critical for bicycle frame stiffness as there are many loads that come together in this region to cause the frame to flex and twist in a complex 3-dimensional fashion. This challenge is compounded in folding frames of the type described in this document because the folding connection between the front frame section and the rear frame section occurs in the highly loaded region proximate to the pedals and cranks. Two of the most functionally critical and noticeable deflections on a bicycle frame can be:
  (a) Twisting (torsion) of the bike frame. This will be discussed in greater detail in the paragraphs that follow.
  (b) For bikes that use a toothed drive belt, deflection of the rear dropouts as a result of tension in the upper section of the toothed belt between the front sprocket (connected to the crank) and the rear sprocket (connected to the rear wheel) which can cause the toothed belt to skip. The configuration of the rear stays, chain stay, and other components of the rear dropouts that are shown and described in conjunction with the elevated chain stay configurations of FIG. 10A and other sections of this document are critical to ensuring that there is sufficient rigidity to withstand these belt forces. A belt tensioner or other means for ensuring that there is no slack in the bottom section of the toothed belt is can also be important for ensuring that a belt drive system of this type performs as needed.

FIG. 15A, FIG. 15B, FIG. 15C, and FIG. 15D, provide a description of some of the forces on a bicycle frame that cause torsion and some of the structural elements, features, and configurations used in embodiments of the present invention to provide a torsionally stiff and lightweight folding bicycle frame. FIG. 15A shows a side view of the bicycle of FIG. 10A with some of the main vertical forces that could be applied by a rider. FIG. 15A has been turned around from what was shown in FIG. 10A so it is oriented to match the orientation of the details that will be shown in FIG. 16A through 18C, FIG. 20A, and FIG. 21B. FIG. 15B is a front view of the bicycle of FIG. 15A showing the same vertical forces. From physics, we know that forces that are aligned in one axis cancel each other out (principle of transmissibility) and forces that are opposite to one another but offset by a perpendicular distance create a moment equal the applied forces multiplied by the perpendicular distance between them. A moment that occurs in a first plane that is resisted by an equal and opposite moment in second plane parallel to the first plane creates torsion, a twisting force, in the structural elements between the first plane and the second plane.

In FIG. 15A, $F_W$ represents the weight of the bike rider when seated. This is resisted by $F_{FW}$, the reaction force upwards on the front wheel, and $F_{RW}$, the reaction force upwards on the rear wheel. As shown in FIG. 15B, these three forces are in the same plane (the vertical plane of the bicycle wheels when going straight), and therefore create no torsion. If the rider is pedaling, there will be a force $F_P$ applied to the pedals and this force $F_P$ is not aligned with the central plane of the bicycle. In the worst case, the rider is standing and the entire weight of the bike rider is applied as $F_P$ on the right pedal of the bicycle (and $F_W$ will be zero). FIG. 15B, shows that $F_P$ is not aligned in the same plane as $F_{FW}$ and $F_{RW}$ and this creates a moment, which will be shown at $M_{PW}$ (moment between pedal and wheels) in FIG. 15C and FIG. 15D. To balance $M_{PW}$, the rider who is standing on the pedals pushes up on one side of the handlebars and down on the other side of the handlebars as shown at $F_{HU}$ and $F_{HD}$ (handlebar up and handlebar down), which creates the moment shown as $M_{Handlebars}$ in FIG. 15C and FIG. 15D. Because $M_{PW}$ is not in the same plane as $M_{Handlebars}$, the front tube, 306 in FIG. 15A, and connection module, 408 in FIG. 15A, (also called the alternate hinge module) between the front frame section and rear frame section are subjected to a twisting (torsion) force which can noticeably distort the shape of the bicycle frame and create other issues (breakage, squeaking, etc.).

Referring in more detail to FIG. 15C, which is section i-i of FIG. 15A looking forwards, the clockwise twisting force from the pedals to the wheels $M_{PW}$ is resisted by a counterclockwise twisting force on the handlebars $M_{Handlebars}$, and this twisting force (torsion) is transmitted through the front tube 306, causing the front tube to twist about its central axis, the point shown at the intersection of line segment x-x and line segment y-y. For a hollow cylindrical tube such as the front tube, the torsional stiffness (rate of twist) per unit of length of the tube can be calculated using the following equations:

$$K/L=(E)(J)$$

$$J=\pi(D^4-d^4)/32$$

$$t=(D-d)/2$$

Where:
  K/L=rate of twist of the tube (K) per unit of length (L)
  E=modulus of elasticity of the tube material
  J=polar moment of inertia for the cross section
  D=outside diameter of the cylindrical tube
  d=inside diameter of the cylindrical tube
  t=wall thickness for the cylindrical tube Based on the above equations, there are four primary ways to increase torsional stiffness of the front tube 306, and therefore make the bike frame stiffer and more resistant to twisting forces:
  (a) Shorten the front tube;
  (b) Increase the outside diameter;
  (c) Increase the wall thickness (or decrease "d" while keeping "D" the same); and/or
  (d) Use a stiffer tube material. Steel is 2× stiffer than titanium, but also 2× heavier. Steel is 3× stiffer than aluminum, but also 3× heavier.

Given that the front tube cannot be shortened and the material has been chosen for other reasons, the main parameters that can be changed are tube diameter (D) and wall thickness (t). However, increasing wall thickness increases the weight of the tube. For these reasons, the front tube should be as large in diameter as is feasible within other constraints. More specifically, from this discussion and equations presented, it should be clear that doubling the height of something in the direction that opposes a torsional load results in a 16× improvement in stiffness. However, it also results in a 4× increase in weight and mass. Doubling the outside diameter and halving the wall thickness, gives a 4× improvement in stiffness with no increase in weight. The same principles can be applied to cross sections that are not circular, don't have the same wall thickness all the way around and have walls that may not be solid at all points along the length of the structure that must transmit torsion. These principles can be summarized as follows:

(a) Increasing the outside dimensions (the equivalent of "D" in the equations above) has an enormous beneficial effect on torsional stiffness. This should be the first priority in optimizing the structure.

(b) Increasing the wall thickness of any part of the structure increases torsional stiffness.

(c) Holes in the walls of any part of the structure (i.e. regions with zero thickness) results in a significant reduction in stiffness for the structure.

Figure 17A:
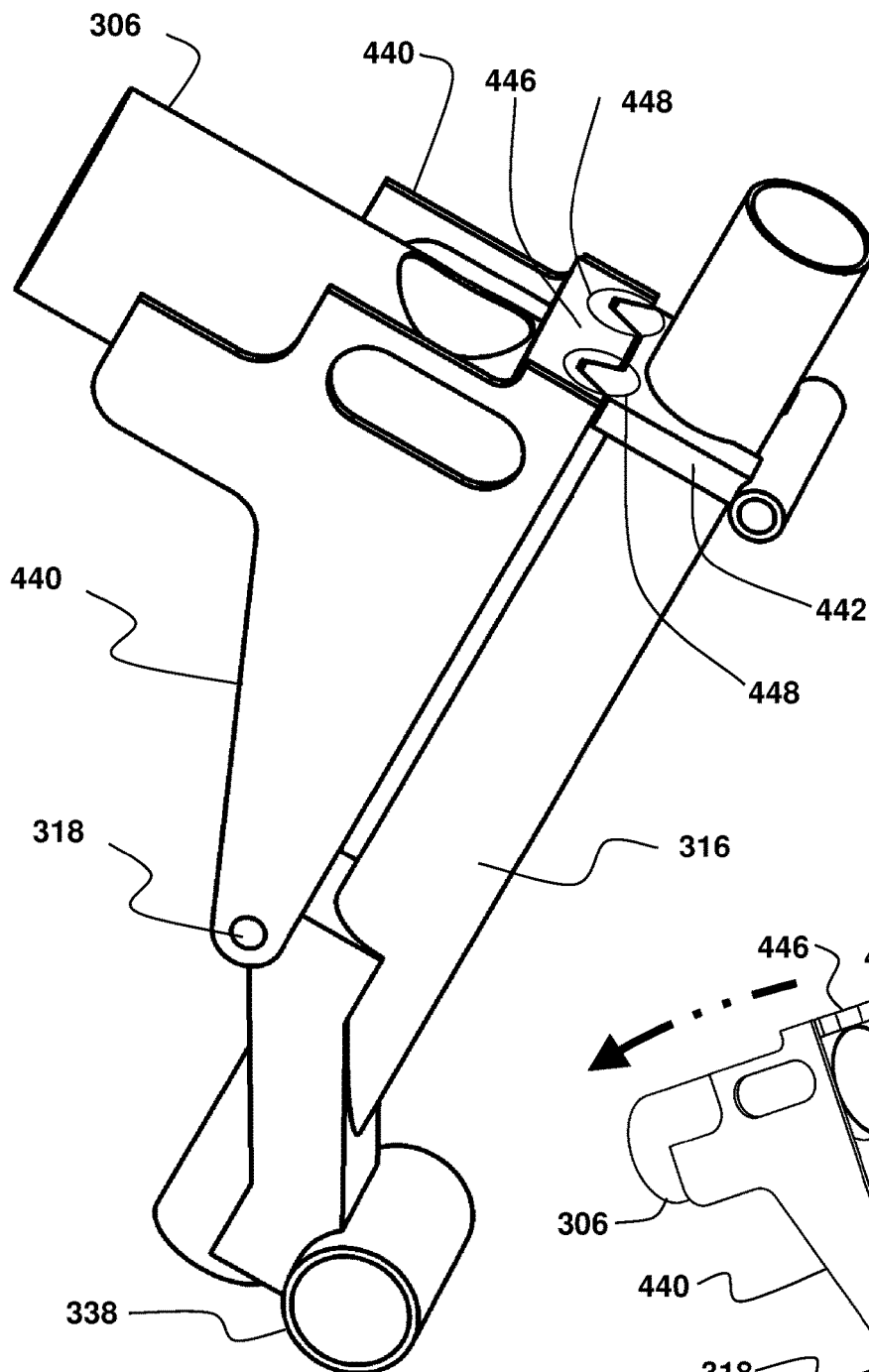
FIG. 17A shows a perspective view of some of the main elements of the hinge shown in FIG. 16A.
Figure 21A:
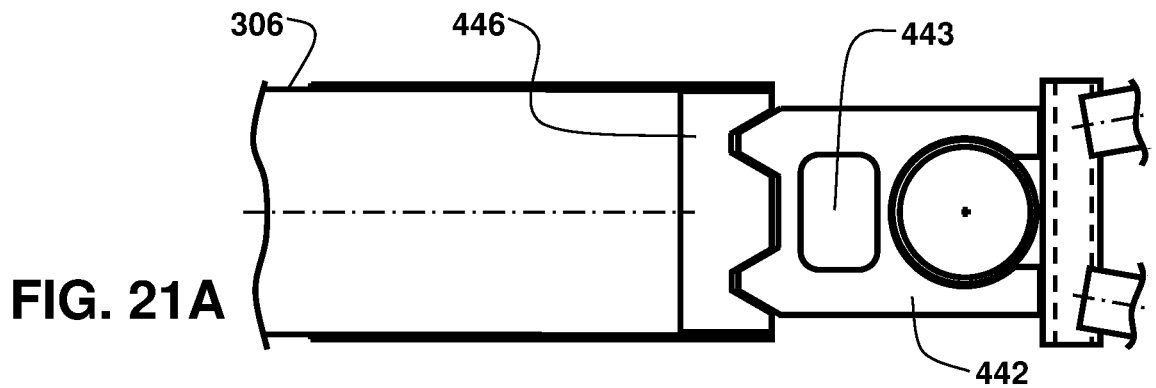
FIG. 21A shows a top view of an alternate embodiment of the clamp section of the hinge shown in FIG. 16A wherein the rear frame clamp block comprises an aperture.

Based on these principles for optimizing torsional stiffness, the best ways to increase the torsional stiffness of a bicycle frame is to increase the enclosed cross-sectional area and height and width of various elements of the system, especially those that are most flexible, regardless of whether those cross-sections are round or any other shape. FIG. 15D illustrates some of the things that have been incorporated to make the bicycle frame as stiff and lightweight as possible. FIG. 15D is an angled forward-looking section view of the connection module 408 at the interface between the front section and rear section of hinge module. Since the view in FIG. 15D is angled differently than section i-i of FIG. 15C, only the end section of the front tube 306 is visible. Specifically, FIG. 15D shows section J-J in FIG. 16A. This will also be illustrated from the top as section J-J in FIG. 19B and FIG. 21A. Referring to FIG. 15D, the same clockwise torsional load created by $M_{PW}$ (twist of the pedals relative to the wheels) which must be resisted by a counter-clockwise twisting force on the handlebars $M_{Handlebars}$, must be transmitted through the connection module 408. More specifically, torsional (twisting) forces are transmitted in the connection module 408 between the front frame section (401 in FIG. 11A and FIG. 15A) and the rear frame section (402 in FIG. 11A and FIG. 15A) through two interfaces:

(a) The interface between the front frame clamp block (front jaw), shown at 446 in FIG. 15D, FIG. 17A, and FIG. 19A, and the rear frame clamp block (rear jaw), shown at 442 in FIG. 17A and FIG. 19A; and (b) The folding frame pivot axis or hinge shown at 318 in FIG. 11A, and figures FIG. 16A through 17B.

The items that can be incorporated to make the interface between the front frame clamp block (front jaw) 446 and rear frame clamp block (rear jaw) 442 stiff, and therefore resistant to torsional forces, can include:

(a) Making the front frame clamp block 446 as thick (vertical dimension in FIG. 17D) as possible. In FIG. 17D, it can be seen that the front frame clamp block 446 is more than 2× thicker than the wall thickness of the front tube 306. The front frame clamp block 446 could be made more than 3×, more than 4×, or more than 5× thicker than the wall thickness of the front tube.

(b) Making the front frame clamp block 446 at least as wide (horizontal dimension in FIG. 17D) as the outer diameter of the front tube 306. It can also be observed from FIG. 17D that the front frame clamp block 446 is rectangular and has a width is at least 2×, at least 3×, and/or at least 4× its thickness. Similarly, from the drawings that show the front clamp block 446 and the rear clamp block 442, it is possible to see that the rear clamp block is also rectangular and also has a similar ratio between its width (horizontal dimension when looked at in a ridable orientation) and thickness (vertical dimension when looked in a ridable orientation). This ratio of width to thickness best matches the function of the clamp blocks (clamp jaws) to act as part of the structure that resists torsional (twisting) loads on the bicycle frame.

(c) Providing one or more vertically-oriented v-shaped features in the interface between the front jaw 446 and rear jaw 442, as can most clearly be seen at 448 in FIG. 17A. These v-shaped features have the shape of the letter "V" with flat bottoms. The pair of angled side surfaces of the v-shaped features resist lateral movement (i.e. horizontal movement perpendicular to the direction of engagement between the front jaw and rear jaw) when the front and rear jaws are pressed together. This lateral movement that is prevented can also be described as being movement parallel to the axis of rotation of the front frame section relative to the rear frame section (which is also parallel to the axis of rotation of the crankshaft and the axis of rotation of the rear wheel). The v-shaped features can also be seen from various perspectives as part of the front jaw 446 and rear jaw 442 in FIG. 17B, FIG. 19A, FIG. 19B, and FIG. 21A. When looking at these drawings, it is also noteworthy that the front jaw 446 and rear jaw 442 comprise rectangular blocks having a width at least 2×, 3×, 4×, or 5× their thickness.

The items that can be incorporated to make the folding frame pivot axis (or hinge, or pivot shaft) 318 region stiff, and therefore resistant to torsional forces, can include:

(a) Making the pivot shaft housing 347, shown in FIG. 15D, and associated pivot shaft bracket(s), shown at 346 in FIG. 16A and FIG. 16B, as large and therefore stiff as possible. In the embodiment shown, the pivot shaft housing 347 has a wall thickness at least the same as the wall thickness of the front tube 306. The wall thickness of the pivot shaft housing 347 could also be more than 2×, 3×, or 4× the wall thickness of the front tube 306 if additional stiffness is desired.

(b) Using a pivot shaft 318 that has as large as possible of a diameter. In the embodiment shown, the pivot shaft 318 has a diameter at least that of the wall thickness of the front tube 306. The diameter of the pivot shaft 318 could also be more than 2×, 3×, or 4× the wall thickness of the front tube 306 if additional stiffness is desired.

(c) Providing a tight fit between the pivot shaft 318 and the pivot shaft housing 347.

(d) Providing a tight fit between the pivot shaft 318 and the front tube brackets 440.

(e) Making the distance from the central axis of the pivot shaft 318 to the central axis of the front tube 306, as shown at the intersection of the x-x and y-y lines as great as possible to provide the maximum leverage.

The items that can be incorporated to make the connection between the pivot axis (or hinge, or pivot shaft) 318 region and front tube 306 stiff, and therefore resistant to torsional forces, can include:

(a) Making the thickness (horizontal dimension) of the front frame brackets 440 as great as possible. In the embodiment shown in FIG. 15D the front frame brackets are at least 1.5 thicker than the thickness of the front tube 306 walls. For greater stiffness, the front frame brackets could be more than 2×, 3×, 4×, or 5× the thickness of the front tube 306 walls.

(b) Making the width of the front frame brackets 440 (approximately horizontal dimension of the front frame brackets 440 as shown in FIG. 16A) as great as possible. As shown in FIG. 16A, the front frame brackets 440 are tapered to be narrower that their bottoms and wider in the region where they connect to the front tube 306. As can be seen in FIG. 16A, the front frame brackets 440 are wider than the diameter of the front tube 306 in the region where the front frame brackets 440 attach to the front tube. If even greater stiffness is desired, the front frame brackets could be more than 2×, more than 3×, or more than 4× wider than the front tube 306 diameter in this region.

The items that can be incorporated to make the connection between the front frame clamp block (front jaw) 446 and front tube 306 stiff, and therefore resistant to torsional forces, can include:

(a) Having the vertical engagement surface between the front jaw 446 and front frame brackets 440 be as large as possible.

(b) Providing a direct attachment point between the front jaw 446 and the front tube 306 as shown at the point of the top tube 306 that touches the front jaw in FIG. 15D.

Applying these principles for optimizing stiffness and the features described above, the hinge and clamp designs in the illustrated in FIG. 16A through FIG. 21B are specifically designed to maximize stiffness for a given amount of a material. The configuration illustrated in these drawings also simplifies manufacturability and the ease (and therefore speed) for a user to fold and unfold a bicycle frame of the type described in this document.

FIG. 16A shows a horizontally flipped side view of a part of the frame of FIG. 10B when the hinge module is in a ride configuration. FIG. 16B shows the same components as FIG. 16A when the alternate hinge is in a folded configuration. The following rear frame components are shown in the same locations in FIG. 16A and FIG. 16B:

(a) the bottom bracket housing, which can more generically be referred to as a human power input device housing, 338;
(b) the front chain ring 330;
(c) the rear stay stiffeners 326;
(d) the upper rear stays 412;
(e) the lower rear stays 413;
(f) the main seat tube 316;
(g) the lower pivot adapter brackets 346 that rigidly, fixedly, and permanently connect the lower pivot element 318 to the main seat tube 316 and human power input device housing (bottom bracket housing) 338; and
(h) the main seat tube clamp 348 that clamps the telescoping seat tube, 336 in FIG. 10B, or the seat post 334, into the seat tube 316.

In FIG. 16A the front frame section is in "ride" mode. This means that the rear frame components (i.e. rear frame section) described previously are clamped to the front frame components (front frame section) in region K-K of FIG. 16A. The front frame components visible in FIG. 16A and FIG. 16B comprise a front frame tube 306 and a front frame tube bracket 440. In FIG. 16B, the folding frame is in "packed mode" with the front frame section rotated (counterclockwise in this view) by approximately 180 degrees around the folding frame pivot axis 318 from the "ride mode" configuration that was shown in FIG. 16A. In FIG. 16A and FIG. 16B the folding frame pivot axis 318 is located above and forward of the bottom bracket shell 338, and more generally speaking the folding frame pivot axis 318 is located above and forward of the point of rotation of the cranks (crank rotation point shown at 323 in FIG. 16A and FIG. 16B) when the rear of the bicycle if viewed in its normal upright orientation.

Figure 17B:
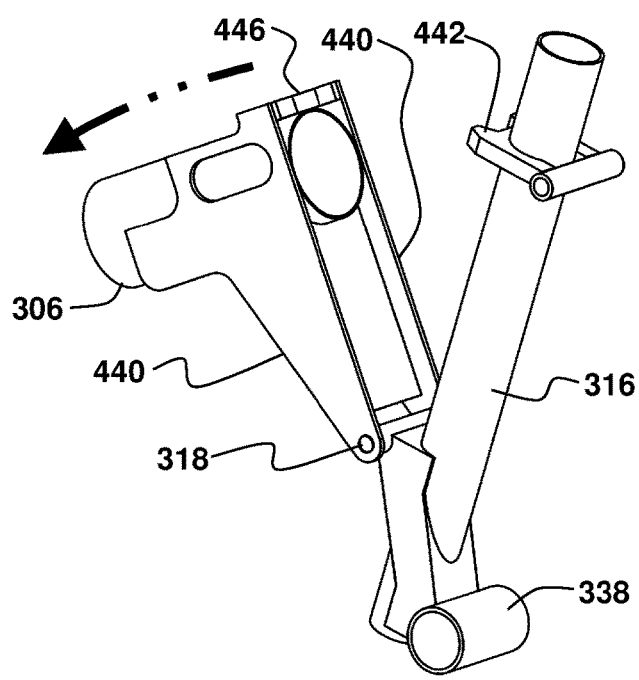
FIG. 17B shows the hinge of FIG. 16A when the front section has been rotated approximately 30 degrees clockwise.

FIG. 17A shows a perspective view of elements of the hinge module shown in FIG. 16A. Like in FIG. 16A, the hinge module (or connection module) is in a ride configuration. For clarity, the chain stays, lower seat stays, upper seat stays, and front chain ring, and main seat tube clamp that were shown in FIG. 16A are not shown with the hinge/connection module in FIG. 17A. FIG. 17B shows the hinge module of FIG. 17A when the front section has been rotated approximately 30 degrees clockwise. Referring to FIG. 17A and FIG. 17B, the folding frame pivot axis (or hinge section of the connection module) is shown at 318. The folding frame pivot axis 318 connects the front frame section to the rear frame section and allows the front frame section to rotate about a horizontal axis approximately 180 degrees to convert the bicycle frame from a rideable configuration to a folded configuration. A section of the front tube is shown at 306. Two sides of the front frame tube bracket are shown at 440. The front frame tube bracket 440 rigidly, fixedly, and permanently connects the folding frame pivot axis 318 (also known as a front frame pivot element, pivot, or hinge), the front frame tube 306, and the front frame clamp block 446 (also referred to as a front clamp element, a front frame jaw, a front clamp jaw, or a front jaw). The key elements of the rear frame, which are rigidly, fixedly, and permanently connected to the folding frame pivot axis 318 and to each other include the bottom bracket housing 338 (configured to hold the axis of rotation of the cranks), the seat tube 316, the rear frame clamp block 442 (also referred to as a rear clamp element, a rear frame jaw, a rear clamp jaw, or a rear jaw), and the rear frame pivot housing 444. In the embodiment shown in FIG. 17A and FIG. 17B the crankshaft housing 338 comprises a cylindrical bottom bracket housing configured for holding a crankshaft and bearings. In this configuration, the bearings rotationally couple the crankshaft (which can also be called an axle or spindle) to the cylindrical bottom bracket housing.

9. Clamping the Front Frame Section and Rear Frame Section Together

Figure 18A:
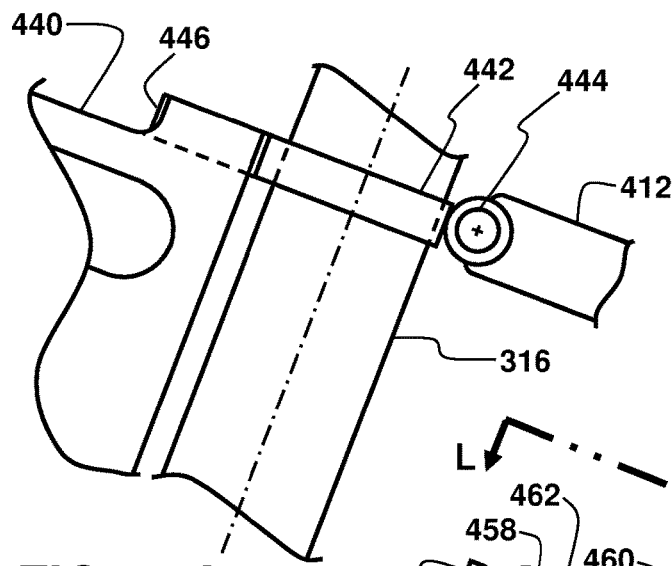
FIG. 18A shows the top of the hinge in region K-K of FIG. 17A.
Figure 18B:
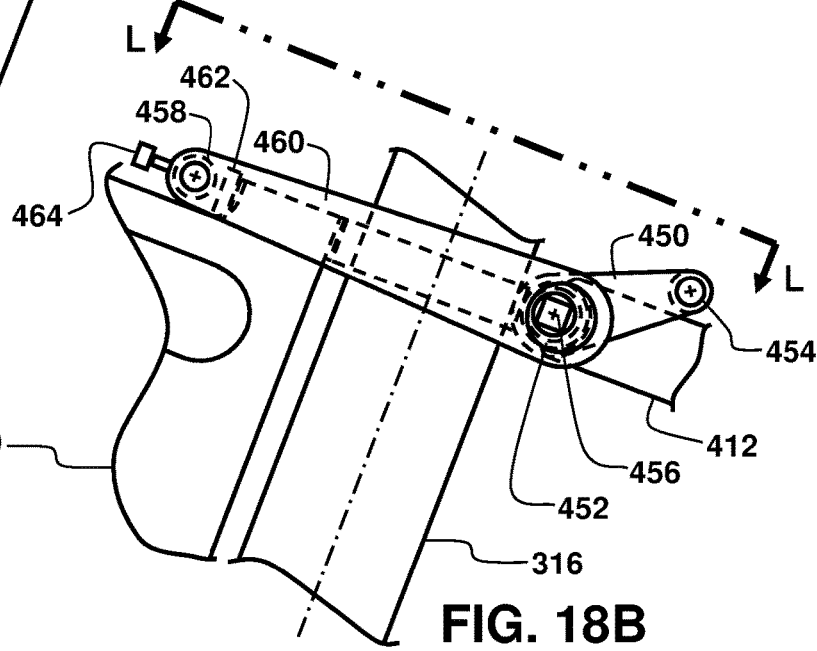
FIG. 18B shows the top of the hinge of FIG. 18A with an eccentric clamp mechanism in a clamped position.
Figure 18C:
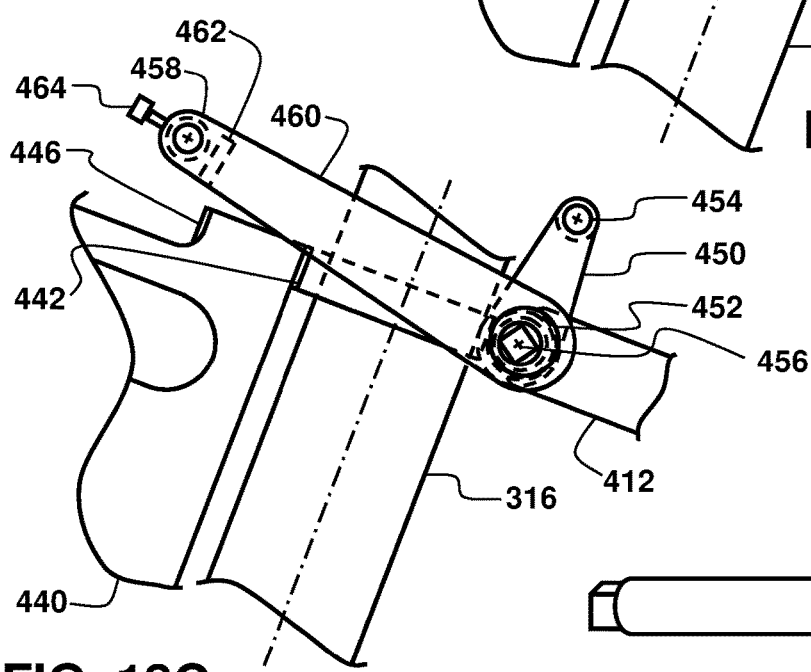
FIG. 18C shows the items shown in FIG. 18B in an unclamped position.

FIG. 18A, FIG. 18B, and FIG. 18C show the top of the hinge in region K-K of FIG. 16A. This region is used for securing the front frame section to the rear frame section by means of a user detachable rigid (immovable) attachment connection that is secured when the bicycle is in a "ride" mode. The rear frame section components identified in FIG. 16A that are also shown in FIG. 18A, FIG. 18B, and FIG. 18C are the seat tube 316, and the upper rear stays 412. The front frame section component identified in FIG. 17A that is also shown in FIG. 18A, FIG. 18B, and FIG. 18C is the front frame tube bracket 440. FIG. 18A shows that the rear frame section further comprises a rear frame clamp block 442 that is rigidly attached to the seat tube 316, and a rear frame clamp pivot housing 444 that is rigidly attached to the rear frame clamp block 442 and the upper rear stays 412. FIG. 18A and FIG. 18C also show that the front frame assembly further comprises a front frame clamp block 446 that is rigidly attached to the front frame tube bracket 440. The front frame clamp block 446 is pressed against the rear frame clamp block 442 when the front frame section and the rear frame section are clamped together in "ride mode."

It should be noted that in normal riding use, the weight of the rider ($F_W$ in FIG. 15A) will cause the rear frame clamp block 442 to press against the front frame clamp block 446 and if these two components are properly designed, no clamp is necessary to provide resistance against bending and torsion between the front frame section and the rear frame section. However, the front frame section would rotate relative to the rear frame section if the center of the bicycle were lifted and there was nothing holding the two frame clamp blocks, 442 and 446, together. Thus, at least some minimal clamping force between the rear frame clamp block 442 and the front frame block 446 is needed for cyclists to have a normal experience the folding system described herein. Such clamping force could be provided by devices as simple as a strap that connects the front frame section to the rear frame section in the region proximate to the rear frame clamp block 442 and the front frame clamp block 446.

Figure 18D:
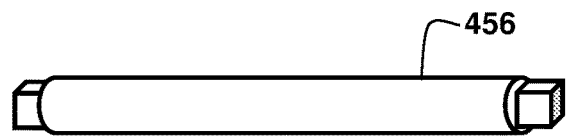
FIG. 18D shows an isometric view of the clamp shaft used in the eccentric cam clamp mechanism shown in FIG. 18B, FIG. 18C, FIG. 19A, FIG. 19B, and FIG. 20.

FIG. 18B shows the top of the hinge of FIG. 18A with a manually operable clamp mechanism in a position that secures the front frame section to the rear frame section by providing a force that pushes the front frame clamp block (446 in FIG. 18A) against the rear frame block (442 in FIG. 18A). This manually operable clamp mechanism is one example of a type of fastener that could be used detachably attach the front frame section to the rear frame section at the front clamp jaw and rear clamp jaw. FIG. 18C shows the eccentric clamp elements described with reference to FIG. 18B when the eccentric clamp mechanism of FIG. 18A is in an unclamped position. The eccentric clamp mechanism of FIG. 18B and FIG. 18C comprises a pair of wrench arms 450, a pair of clamp arms 460, and an eccentric disk 452 that causes the clamp arms 460 to move rearward when the wrench arms 450 are in the position shown in FIG. 18B and forwards when the wrench arms 450 are in the position shown in FIG. 18C. The wrench arms 450 move about an axis of rotation co-located with the horizontal central axis of the rear frame pivot housing, 444 in FIG. 18A. The clamp arms 460 move about an axis of rotation that is parallel and eccentric to the horizontal central axis of the rear frame pivot housing, 444 in FIG. 18A. A wrench arm connection bar 454, clamp arm connection bar 458, and clamp load distribution element 462 are shown by hidden lines in FIG. 18B and FIG. 18C. A clamp tightening bolt 464 is partially visible in FIG. 18B and FIG. 18C. There is also a clamp shaft 456 that rotates in the rear frame clamp pivot housing and has a square end as shown in FIG. 18B and FIG. 18C. To further clarify, FIG. 18D shows an isometric view of this clamp shaft 456.

FIG. 19A shows view L-L of FIG. 18B, which is a top view of the key components of the top of the hinge and the clamp in its clamped position. FIG. 19B is an exploded top view of the components shown in FIG. 19A. Referring to FIG. 19A and FIG. 19B, the front frame tube bracket is shown at 440 and the front frame clamp block is shown at 446. In the embodiment shown, these two components are rigidly, fixedly, and permanently connected to each other and to the front tube (306 in FIG. 16A and FIG. 16B). These components are part of the front frame section that rotates about the folding frame pivot axis (318 in FIG. 16A and FIG. 16B) when the front frame section and rear frame section are rotated relative to each other. Also shown are the rear frame clamp block 442, the main seat tube 316 (also called a rear frame seat tube), the rear frame clamp pivot housing 444, and the upper rear stays 412. In the embodiment shown, these four components are all rigidly, fixedly, and permanently connected to each other and are all part of the rear frame section that connects to the front frame section at the folding frame pivot axis, 381 in FIG. 16A and FIG. 16B.

As shown in FIG. 19A, the front frame clamp block 446 and the rear frame clamp block 442 comprise a plurality of angular teeth that mate with each other to provide a high resistance to the front frame section moving laterally or rotationally relative to the rear frame section when the front frame clamp block 446 is pressed against the rear frame clamp block 442. This resistance to relative motion improves the torsional stiffness, vertical cross-sectional moment of inertia, and horizontal cross-sectional moment of inertia of the front frame section relative to the rear frame section when the front frame clamp block 446 is pressed against the rear frame clamp block 442, and is important to the overall stiffness of the bicycle in response to torsion and bending forces applied to the bicycle frame.

Figure 20:
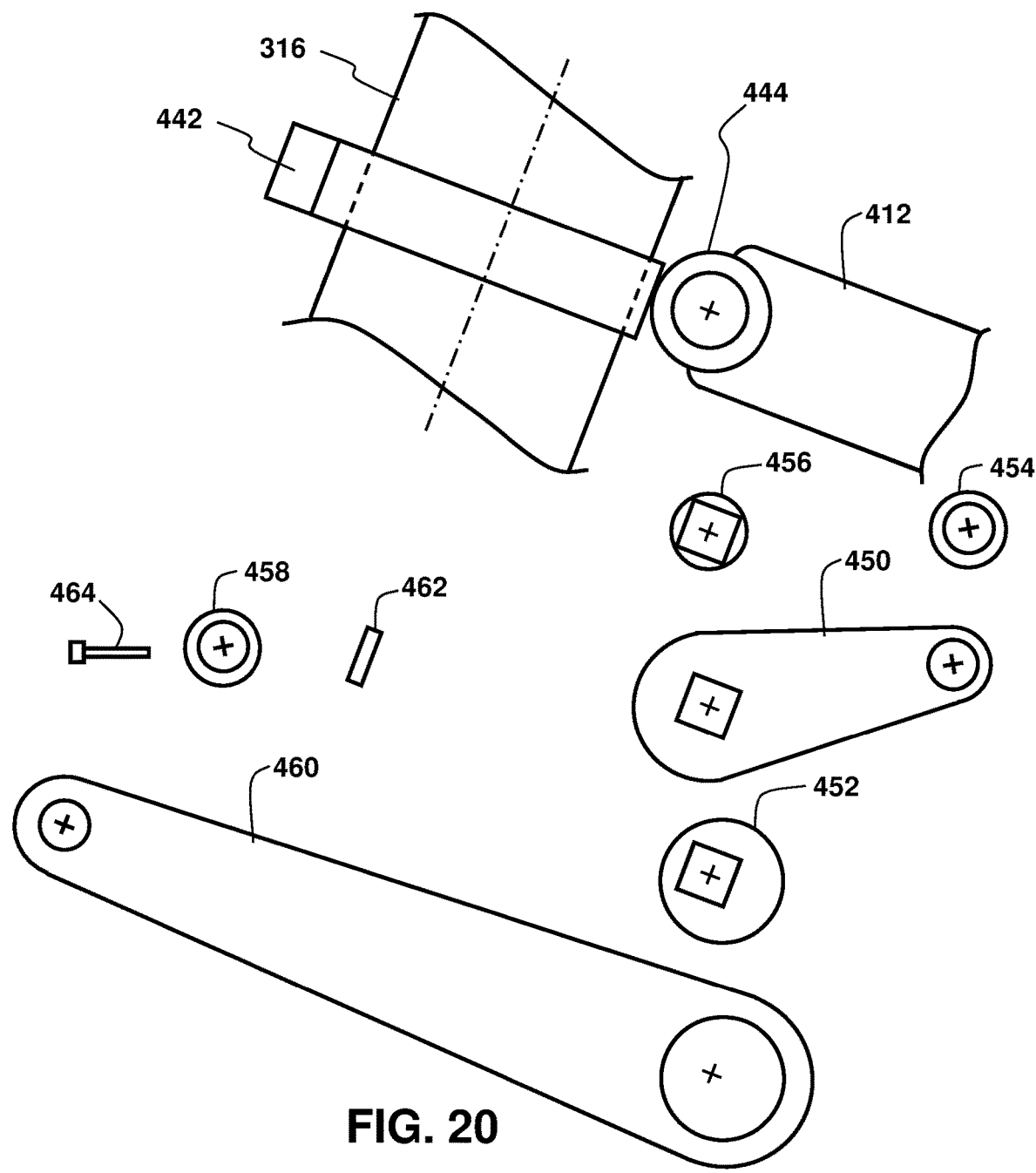
FIG. 20 is a side view of some of the components shown from the top in FIG. 19B.

FIG. 20 is a side view of the each of the main components of the clamp and the four rear frame section components (the rear frame clamp block 442, the main seat tube 316 also called a rear frame seat tube, the rear frame clamp pivot housing 444, and the upper rear stays 412) that were shown in FIG. 18A and FIG. 18B. Referring to FIG. 19A, FIG. 19B, and FIG. 20, the clamp in the embodiment shown in these drawings comprises the following components:

(a) the clamp shaft 456 (which is not visible in FIG. 18A because the clamp shaft is inside the frame clamp pivot housing 444 in this view);
(b) the wrench arms 450;
(c) the wrench arm connection bar 454;
(d) the eccentric disks 452 (which are not visible in FIG. 18A because the eccentric disks are inside the clamp arms 460 in this view);
(e) the clamp arms 460;
(f) the clamp arm connection bar 458;
(g) the clamp tightening bolts 464; and
(h) the clamp load distribution element 462.

Referring to the clamp illustrated in FIG. 18B to FIG. 20, the clamp shaft 456 can be a cylindrical shaft with square profiles at both ends. These square profiles can be centered on the rotational center of the cylindrical shaft. In the embodiment shown, the clamp shaft 456 rotates inside the rear frame clamp pivot housing 444 and this rotation can be facilitated through the use of bushings, bearings, and/or lubricants between the clamp shaft 456 and rear frame clamp pivot housing 444. The square profile on the end of clamp shaft 456 engages with a square aperture on the wrench arm 450. It is possible to configure the clamp with a single wrench arm 450 that is located on only one end of the clamp shaft 456 or it is possible to have two wrench arms 450 with one wrench arm on each of the two ends of the clamp shaft 456. The wrench arm 450 provides leverage to turn the clamp shaft 456. If two wrench arms 450 are used, the ends of the two wrench arms that are opposite of the square aperture can be connected to each other with a wrench arm connection bar 454. This wrench arm connection bar 454 can facilitate the application of torque to the wrench arms 450.

In the embodiment shown, the eccentric disk 452 comprises a circular disk with a square aperture that engages with the square profiles of the clamp shaft 456 so that the eccentric disk 452 rotates when the clamp shaft rotates. The square aperture in the eccentric disk 452 is offset from the center of the circular perimeter of the eccentric disk, which causes the center point of the eccentric disk to "orbit" around the center point of the square aperture. It should be noted that this eccentric orbit can also be created in other ways capable of being understood by anyone skilled in the art. For example, the square profiles at the ends of the cylindrical clamp shaft 456 could be offset from the rotational center of the cylindrical clamp shaft 456 and the square aperture of the disk 452 could be centered in the disk to produce this orbital motion. A 5-sided, 6-sided, or other profile and aperture combination could be used instead of the square profiles shown here. The wrench arm 450 or the eccentric disk 452 could have the raised profile and the other components could have apertures.

One end of the clamp arm 460 shown in these drawings has a circular aperture that fits around the circular periphery of the eccentric disk 452. Thus, when the wrench arm 450 rotates the clamp shaft 456, the center point of the eccentric disk 452 moves in an orbital path that can be converted to a linear motion of the end of the clamp arm 460 opposite the end that has the circular aperture (i.e. the clamp end of the clamp arm 460). By choosing a small offset and therefore a small orbital radius for the eccentric disk 452 relative to the length of the wrench arm(s) 450 a small force that rotates the wrench arms 450 can create a large clamping force at the clamp end of the clamp arms 460. In the embodiment shown, the clamp ends of the clamp arms 460 are connected together with a clamp arm connection bar 458. The clamp arm connection bar has two clamp tightening bolts 464 threaded through it. These clamp tightening bolts 464 can be hand tightened to approximately the right length for pressing the front frame clamp block 446 against the rear frame clamp block 442 when the clamp is engaged. A clamp load distribution element 462 can be used to spread the point loads from the clamp tightening bolts 464 over a larger area of the front frame clamp block 446. Thus, the clamp shown in this embodiment can be adjusted, tightened, and loosened by a user with no tools, and yet produce a high clamping force. The high clamping force can ensure that the angled teeth on the rear frame clamp block 442 are engaged with the mating angled surfaces of the front frame clamp block 446 to maximize stiffness and strength of the bicycle frame in a region proximate to the bottom bracket and cranks when the front frame section is clamped to the rear frame section and the bicycle is in "ride" mode.

With reference to FIG. 18B to FIG. 20, it can also be understood that one can use bolts to connect the clamp arms 460 to the clamp arm connection bar 458, bolts to connect the wrench arms 450 to the clamp shaft 456, and bolts and washers to secure the clamp arms 460, eccentric disks 452, the wrench arms 450, the clamp shaft 456, and the rear frame clamp pivot housing to each other. These bolts and washers can be any combination of fasteners and fastening methods capable of being understood by anyone skilled in the art.

10. Bicycle Frames with Bridge Adapters for Motors and/or Gearboxes

Many human-powerable vehicles, including bicycles, comprise a transmission. This transmission can include gears located on the rear wheel. These gears can be external gears that are shifted using a rear derailleur. These gears can be internal gears located in a multi-speed inner hub in the rear wheel. This multi-speed inner hub can be fixed to the spokes. This multi-speed inner hub can be removable from an annulus that uses spokes to attach to a rim. One example of a multi-speed inner hub is the 14-speed rear hub made by Rohloff in Germany. The transmission could also be external gears located in or near the bottom bracket shell or internal gears that attach to the frame and include the crankset.

Figure 21B:
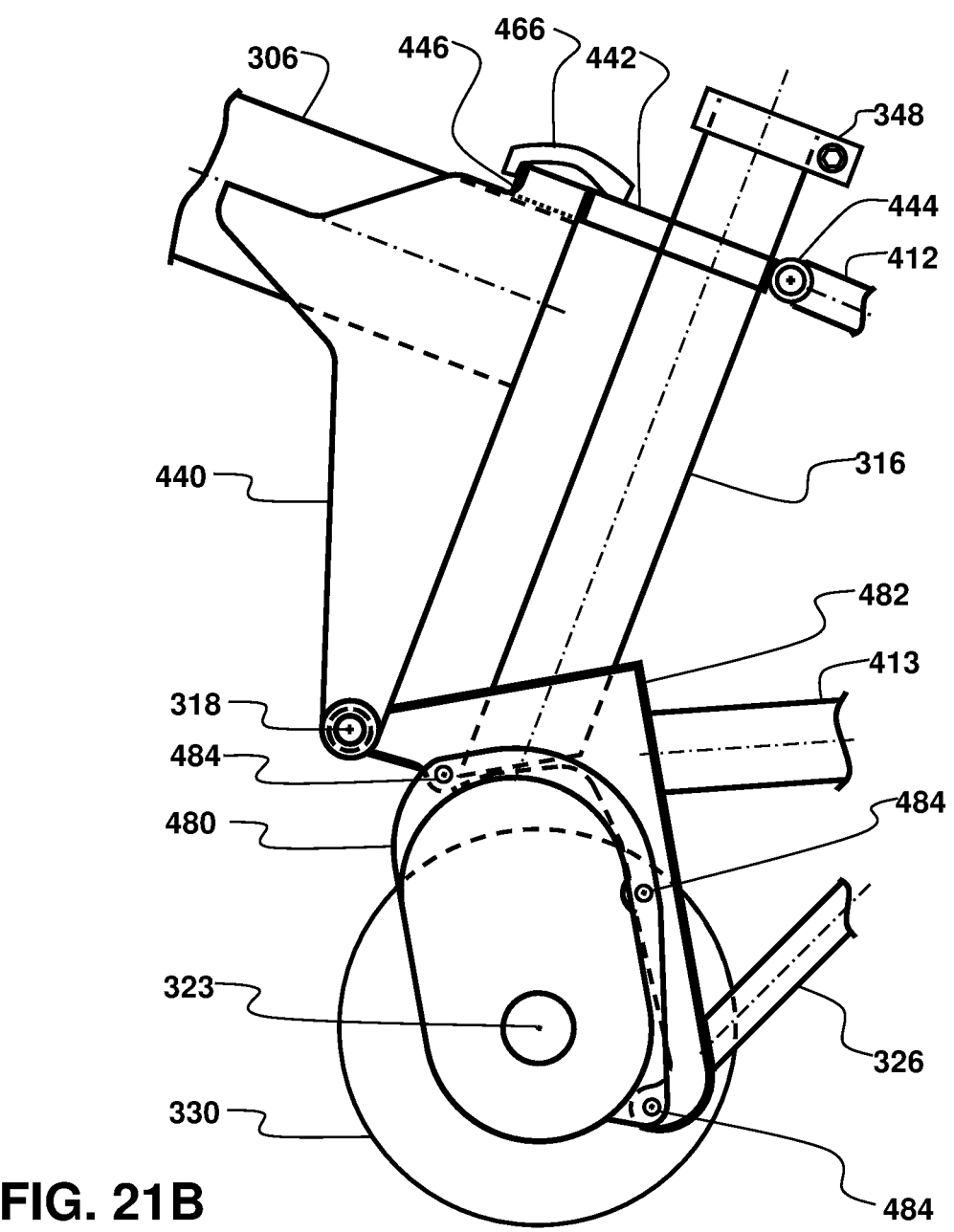
FIG. 21B shows an embodiment of the clamp section shown in FIG. 21A and the hinge shown in FIG. 16A that incorporates a bridge adapter configured for attachment of a motor or gearbox with cranks.

FIG. 21B shows an embodiment of the hinge shown in FIG. 16A that incorporates a bridge adapter 482 configured for the attachment of a motor (or internal gearbox) shown at 480. The attachment of the motor and/or gearbox to the frame can be made at six bridge to motor/gearbox attachment points 484, three of which are visible in the left side view of the frame section shown in FIG. 20B and three of which would be visible from the opposite (right) side. Attachments 484 could be made using bolts or any other fastening system or method capable of being understood by anyone skilled in the art.

In the embodiment shown in FIG. 21B, the crank rotation point 323 (or axis of rotation of the cranks) is part of the motor/gearbox 480. As can also be seen in this diagram, the center of rotation of the hinge (i.e. the folding frame pivot axis or hinge point) 318 is forward and above the axis of rotation of the cranks 323, and is integrated into the bridge adapter 482. The embodiment shown in FIG. 21B, can be used as part of a frame similar to the frame and folding system shown and described with reference to FIG. 10A through FIG. 11C. Important benefits of the embodiment shown in FIG. 21B over the embodiment shown in FIG. 16A can include, but are not limited to:

(a) The embodiment shown in FIG. 21B does not have a rear derailleur, which tends to stick out and is therefore easily damaged when transporting a packed bicycle;

(b) The embodiment shown in FIG. 21B can easily be configured to use a belt drive, which is cleaner when folding, unfolding, packing, and unpacking a bicycle;

(c) If the embodiment shown in FIG. 21B is used with an internal gearbox mounted to the bridge adapter, the entire gearing system is enclosed, which is easier to pack than a multiple cog rear cassette; and (d) The embodiment shown in FIG. 21B could also be combined with mid-drive motor if a motorized bicycle is desired.

Other elements of the embodiment shown in FIG. 21B are similar to the embodiment shown in FIG. 16A and serve the same functions including, but not limited to the front tube 306, the front frame tube bracket 440, the front chain ring 330, the rear stay stiffeners 326, the lower rear stays 413, the main seat tube 316, the upper rear stays 412, the rear frame clamp pivot housing 444, the main seat tube clamp 348, the rear frame clamp block 442, and the front frame clamp block 446.

11. Alternate Frame Clamping Systems and Methods

FIG. 21B also shows an alternate front frame section to rear frame section fastener 466, hereinafter also referred to as an alternate frame fastener. This alternate frame fastener 466 that can substitute for the eccentric clamp mechanism that was shown in FIG. 18B through FIG. 20. The alternate frame fastener 466 can be simpler and lighter than the eccentric clamp mechanism shown previously in FIG. 17B, for example. The alternate frame fastener 466 only needs to exert a compression force between a region in a hole (or aperture) in the rear frame clamp block (rear jaw) 442 and the front of the front frame clamp block 446. The hole or aperture in the rear frame clamp block is shown at 443 in FIG. 21A. Examples of alternate frame fasteners can include, but are not limited to:
(a) A C-clamp;
(b) A strap;
(c) One or more bolts;
(d) An eccentric latch; and
(e) A hinge clamp with angled surfaces to press the front jaw against the rear jaw similar to the ones used for the frame hinges on a Brompton bicycle in which the hinge clamp has angled surfaces to press the front clamp element against the rear clamp element when the hinge clamp is tightened in a direction perpendicular to the direction of the clamping force between the front clamp element and the rear clamp element.

Referring to the front clamp blocks (front jaws) 442 and rear clamp blocks (rear jaws) 446 shown in FIG. 16A through FIG. 21, it should be noted that these clamp blocks do not necessarily need to be permanently attached to the front frame section and rear frame section, respectively. These clamp blocks could also be detachably attached and replaceable by the user. For example, these clamp blocks could be bolted into their locations. Having these clamp blocks be detachably attached can provide the following benefits:
(a) The clamp blocks could be made of a different material than the parts they are attached to. For example, the front and rear frame sections could be steel (or titanium) and the clamp blocks could be aluminum. If the clamp blocks were permanently attached using a manufacturing process such as welding, it would be much more difficult to use a different material for the clamp blocks than the frame sections.
(b) The use of clamp blocks that can be of a different material makes it easier to make the front frame section and rear frame section from different materials. Since the clamp blocks are optimally made as a matched pair, they are usually made of the same material. There are other reasons such as wear and performance that also mean that it is preferable to make both front clamp block out of the same material as the rear clamp block.
(c) Having the clamp blocks replaceable allows them to be replaced if they wear with needing to make more expensive repairs to the bike frame.
(d) With replaceable clamp blocks, it becomes possible to make small adjustments to the height of the center of the bike. This facilitates the optimization of the use of one frame with different crank lengths or different wheel sizes to still give the same pedal clearance.

Figure 22A:
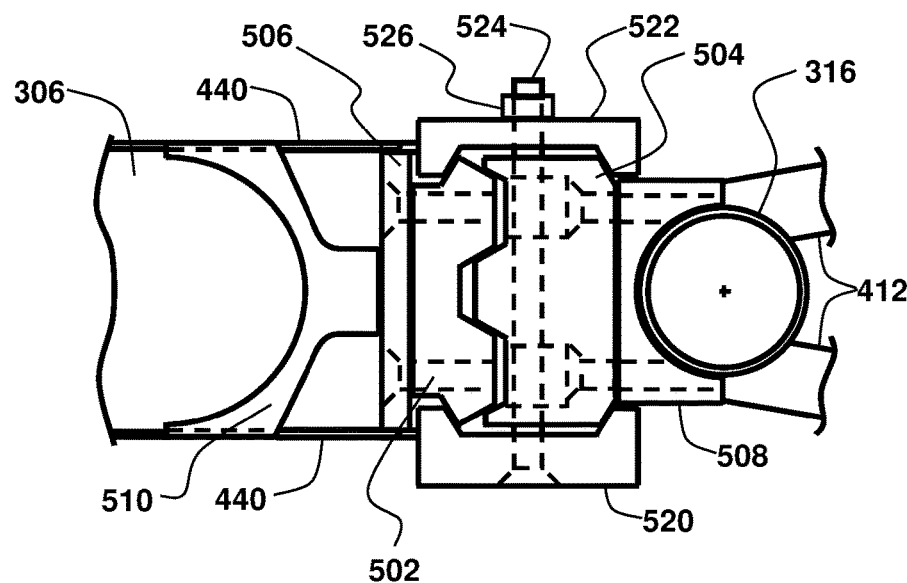
FIG. 22A shows view L-L of FIG. 18B for an alternative clamp module that uses replaceable clamp blocks and side clamps with angled engagement surfaces.
Figure 22B:
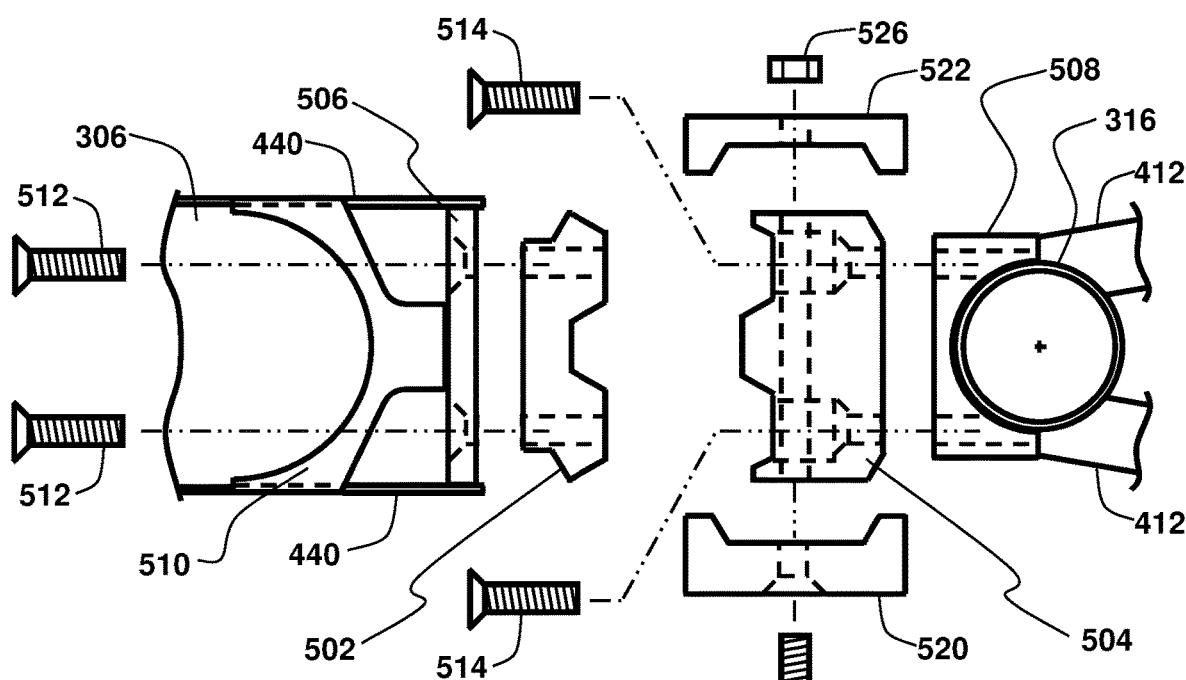
FIG. 22B is an exploded top view of the components shown in FIG. 22A.

FIG. 22A and FIG. 22B illustrate such a system with replaceable clamp blocks, as well as angled surfaces to press the front jaw against the rear jaw. The views shown in FIG. 22A and FIG. 22B is the same as the view shown in FIG. 19A and FIG. 19B. Referring in detail to FIG. 22A and FIG. 22B, the front tube is shown at 306, the front frame tube brackets are shown at 440, the seat tube is shown at 316, and the upper rear stays (or upper seat stays) are shown at 412. These elements were also shown in other embodiments of the clamping system. In this embodiment, a rear frame clamp base 508 is fixedly attached to the seat tube 316 and upper rear stays 412. A front clamp base 506 is fixedly attached to the front tube 306 and front frame tube brackets 440. There is also a front frame clamp base bracket 510 that fixedly connects the front tube 306, front frame tube brackets 440, and front clamp base 506. A replaceable front frame clamp block 502 is attached to the front clamp base 506 with a pair of front frame clamp block bolts, shown at 512. These bolts 512 facilitate the replacement of the replaceable front frame clamp block 502. Similarly, the replaceable rear frame clamp block 504 is attached to the rear frame clamp base 508 with a pair of rear frame clamp block bolts 514.

The embodiment shown in FIG. 22A and FIG. 22B also uses two side clamps with angled surfaces, shown at 520 and 522, to squeeze the replaceable front frame clamp block 506 against the replaceable rear frame clamp block 508. These side clamps can be squeezed together using a bolt 524 and a nut 526 as shown here. It is also possible to use a quick release clamp mechanism, such as that shown and described with reference to FIG. 13B for this purpose. The side clamps, 520 and 522 could also be top and bottom clamps, or just a top clamp and a flat plate on top (or bottom clamp and flat plate on top). These clamps can provide a high compressive force between the front frame section and the rear frame section.

Figure 23A:
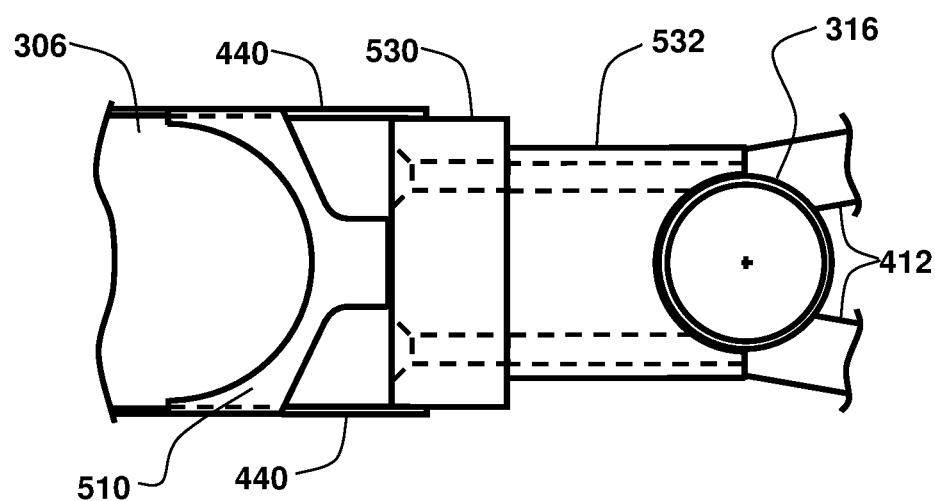
FIG. 23A shows view L-L of FIG. 18B for an alternative clamp module that uses two clamp bolts.
Figure 23B:
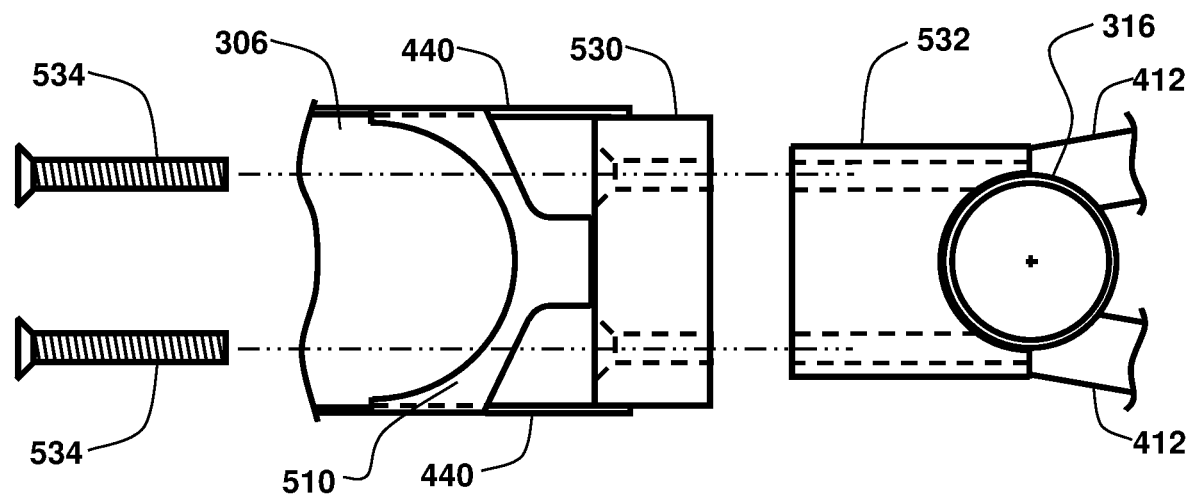
FIG. 23B is an exploded top view of the components shown in FIG. 23A.

FIG. 23A and FIG. 23B illustrate a system for clamping the front frame section to the rear frame section using bolts. In this case, no vertically oriented v-shaped features of the type shown at 448 in FIG. 17 may be needed. Referring in detail to FIG. 23A and FIG. 23B, the front tube is shown at 306, the front frame tube brackets are shown at 440, the seat tube is shown at 316, and the upper rear stays (or upper seat stays) are shown at 412. These elements were also shown in other embodiments of the clamping system. In this embodiment, an alternate embodiment rear frame clamp base 532 is fixedly attached to the seat tube 316 and upper rear stays 412. An alternate embodiment front clamp base 530 is fixedly attached to the front tube 306 and front frame tube brackets 440. There is also a front frame clamp base bracket 510 that fixedly connects the front tube 306, front frame tube brackets 440, and the alternate embodiment front clamp base 530. The alternate embodiment front and rear clamp bases 530 and 532 have threaded holes into which two frame clamp bolts 534 can be threaded and tightened to provide for a very simple system for clamping the front frame section to the rear frame section of a folding bike of the type described herein.

Figure 24A:
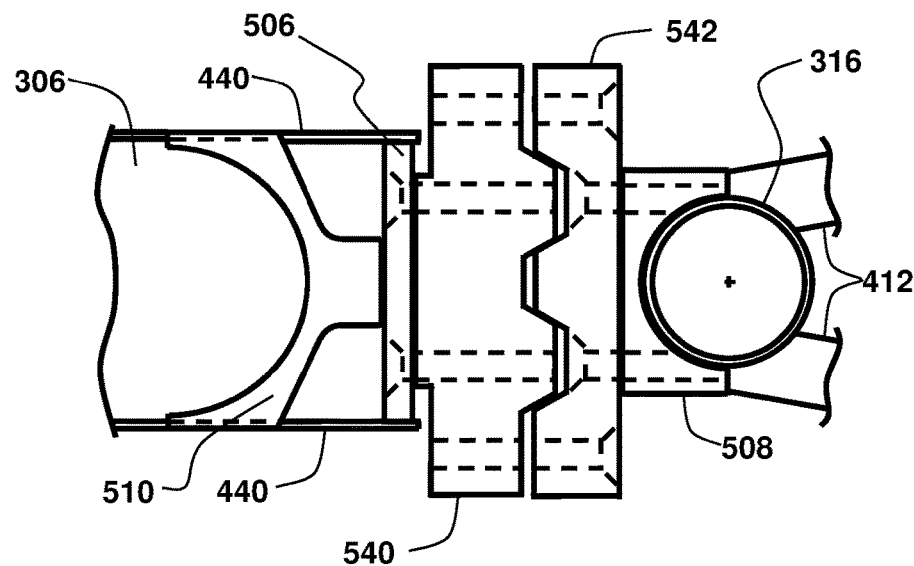
FIG. 24A shows view L-L of FIG. 18B for an alternative clamp module that uses replaceable clamp blocks and two clamp bolts.
Figure 24B:
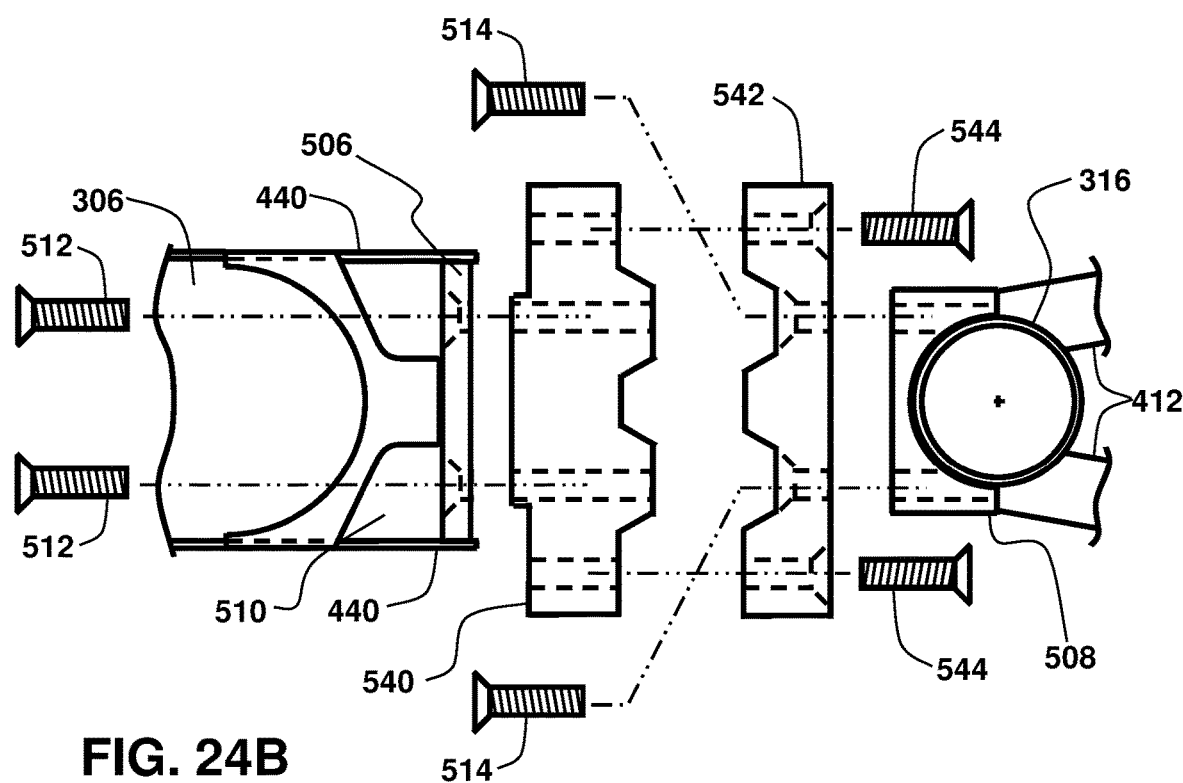
FIG. 24B is an exploded top view of the components shown in FIG. 23A.

It should be noted that the concept of replaceable front and/or rear clamp blocks that was described with reference to FIG. 22A and FIG. 22B can be combined with the concept of the frame clamp bolts, shown at 534 in FIG. 23A and FIG. 23B, that are used to detachably attach and detach the front frame section to the rear frame section. Such as system is illustrated in FIG. 24A and FIG. 24B. Referring to FIG. 24A and FIG. 24B, the front frame tube 306, front frame tube brackets 440, front frame clamp base 506, front frame clamp base bracket, and front frame clamp bolts are the same as for the embodiment shown in FIG. 22A and FIG. 22B. The upper rear stays 412, seat tube 316, rear frame clamp base 508, and rear frame clamp block bolts 514 are also the same. The replaceable rear frame clamp block that has angled side clamp engagement surfaces that was shown at 504 in FIG. 22A and FIG. 22B has been replaced by a replaceable rear frame clamp block that has a clamp bolt hole, and is shown at 542 in FIG. 24A and FIG. 24B. The replaceable front frame clamp block that has angled side clamp engagement surfaces that was shown at 502 in FIG. 22A and FIG. 22B has been replaced by a replaceable front frame clamp block that has a clamp bolt hole, and is shown at 540 in FIG. 24A and FIG. 24B. In the embodiment shown in FIG. 24A and FIG. 24B, alternate frame bolts shown at 544 serve the same function as the frame bolts shown at 534 in FIG. 23B to rigidly attach the front frame section to the rear frame section when the bike is in "ride mode". It can be understood that for the configuration shown in FIG. 24A and FIG. 24B could also be implemented using an eccentric cam quick release mechanism similar to the unit illustrated in FIG. 13B as a replacement for the alternate frame clamp bolts shown at 544 in FIG. 24B. It should also be noted that the replaceable front and/or rear clamp blocks in such a system could be implemented either with or without the vertically-oriented v-shaped features of the type shown at 448 in FIG. 17.

12. Additional Embodiments and Variations

Referring generally to all references made herein to nuts and bolts, these fasteners could also be so called "wing nuts" or "wing bolts" that comprise one or more ears that makes them hand tightenable. For example, the lug nuts shown at 274 in FIG. 6A through FIG. 7D could also be wing nuts that have a conical frustum feature. Similarly, the side clamp bolt, shown at 524 in FIG. 22A and FIG. 22B, and the side clamp nut, shown at 526 in FIG. 22A and FIG. 22B, could also have "wing" features that allow them to be tightened and loosened without the use of tools.

Referring generally to the embodiments shown in FIG. 10A through FIG. 24B, it should be noted that that the front frame tube 306 does not need to be a circular tube. This tube 306 could also have an over, square, or rectangular tubular cross section, or any other cross section capable of being understood by anyone skilled in the art. In fact, the front frame structural element connecting the head tube 304 to the hinge module (408 in FIG. 10B) or front frame connection bracket (440 in FIG. 16A) could be any structural element or elements that provides sufficient strength and stiffness including, but not limited to a space frame comprising a plurality of structural elements that are rigidly connected to each other in a configuration optimized for high strength, high stiffness, and low weight. This space frame could be made of tubular, flat, bent, and/or angled components, as well as components with special profiles, and/or any combination of any of these components.

Properly constructed, a packed human powerable vehicle assembly such as that shown in this disclosure could be covered with a bag and that bag could be a suitably sized and structured bicycle pannier or panniers, totally eliminating the need for a suitcase to be carried or disposed of when the bicycle modules are reconfigured to be a ridable bicycle. This is further facilitated by the fact that bicycle panniers often have rigid sidewalls to prevent the panniers from getting pushed into the bike wheel. These rigid sidewalls become excellent penetration protection for the cover of the compacted bicycle when the panniers are reconfigured to be part of a cover for a compacted bicycle.

In embodiments of the present invention, the frame can comprise any material capable of being understood by anyone skilled in the art. Examples of frame materials can include carbon steel (which comprises iron, carbon, etc and may include molybdenum and vanadium), stainless steel (which comprises nickel, iron, etc), aluminum, magnesium, titanium, glass, cardboard, carbon fiber reinforced composite, glass fiber reinforced composite, wood, plastic, or boron fiber reinforced composite. Examples of frame manufacturing processes can include welding, brazing, soldering, autoclaving, machining, molding, casting, gluing, painting, anodizing; and vacuum forming.

As noted in FIG. 10A, the first wheel and the second wheel can have tires. The tires, 182 and/or 184 can be made using any material and process capable of being understood in the art. For example, one or more of the tires 182 and/or 184, can be made of rubber. One or more of the tires can have a protective layer of an aramid (Kevlar) to help reduce the possibility of punctures One or more of the tires 182 and/or 184, can comprise metal studs. One or more of the tires 182 and/or 184, can comprise an inflatable inner tube. Inflation of the inner tube can be performed using a presta valve or a schrader valve. One or more of the tires can be tubeless. The tires can be inflated when packed. The tires can be deflated when the vehicle (bicycle) is packed.

The various alternative elements, features, and configurations described in this document can be combined in any way capable of being understood by anyone skilled in the art. A number of additional variations and modifications of the disclosed embodiments can also be used. The principles described here can also be used for in applications other than bicycles or similar human-powered vehicles, such as motorcycles. While the principles of the disclosure have been described above in connection with specific apparatuses and methods, it is to be clearly understood that this description is made only by way of example and not as limitation on the scope of the disclosure.

What is claimed is:
1. A wheel for a human powerable vehicle comprising:
a rim configured for holding a tire;
an annular module located concentric to a central axis of rotation of the rim wherein the annular module comprises:
a central aperture;
a plurality of first spoke attachment points located on a first plane, wherein the first plane is perpendicular to the central axis of rotation the rim, and the first spoke attachment points are in a circular configuration;
a plurality of second spoke attachment points located on a second plane, wherein the second plane is perpendicular to the axis of rotation of the rim and offset and parallel to the first plane, and the second spoke attachment points are in a circular configuration; and
at least three connection features wherein:
the connection features are configured for detachable attachment of a hub module; and
the connection features are located closer to the center of rotation of the rim than the first spoke attachment points and the second spoke attachment points;
a plurality of spokes in tension that connect the rim to the annular module;
a user-detachable hub module comprising:
an axle configured for attachment to a frame of the human powerable vehicle;
a sleeve that surrounds at least part of the axle;
at least one bearing that rotationally couples the axle to the sleeve; and
at least three mounting features that are rigidly coupled to the sleeve; and
at least three attachment elements that each comprise a conical frustum surface wherein:
the attachment elements are configured for:
user attachment and detachment of the hub module at the mounting features to the connection features of the annular module; and
applying a force in a direction parallel to the axis of rotation of the rim to press the hub module against the annular module; and
the conical frustum surfaces are configured for:
concentric alignment of the axis of rotation of the hub module with the axis of rotation the rim; and
transmitting a radial force wherein the radial force is:

transmitted between the hub module and the annular module; and
is transmitted in a plane perpendicular to the axis of rotation of the rim.

2. The wheel of claim 1 wherein:
the human-powerable vehicle comprises a human-powerable bicycle;
the user-detachable hub module is configured for placement at least partially inside the central aperture;
the spokes comprise user-tensionable spokes configured for adjusting:
wheel dish;
spoke tension;
concentricity of the central axis of the rim with the central axis of the axle; and
side-to-side wobble of rim when rotated about the axle;
the annular module comprises at least one orientation feature and the user-detachable hub module comprises at least one orientation feature wherein said annular module orientation feature and said user-detachable hub module orientation feature are configured for consistent pairing of the same mounting feature on the hub module to the same connection feature on the annular module;
the diameter of the circular configuration in the first plane is the same as the diameter of the circular configuration in the second plane;
the three connection features on the annular module are located inside of a cylindrical volume defined by the circular configuration in the first plane and the circular configuration in the second plane.

3. The wheel of claim 2 wherein:
the mounting features on the hub are located on a monolithic mounting frame;
the mounting features comprise conical chamfers;
the mounting frame comprises ribs that run directly between the conically-chamfered mounting features;
the mounting frame is constructed from a flat metal plate;
the mounting frame is attached to the sleeve with bolts; and
the attachment elements comprise helical thread.

4. The wheel of claim 3 wherein:
axle of the hub is configured for attachment to the front fork of a human-powerable bicycle frame wherein:
one end of the axle attaches to one leg of the front fork and the other end of the axle attaches to the other leg of the front fork; and
attachment between the hub and the front fork comprises a quick release skewer;
the hub further comprises a brake disk configured for use with a disk brake caliper located on one leg of the front fork;
each attachment element comprises a lug nut;
the included angle of the conical frustum surface is 60 degrees.

5. The wheel of claim 1 wherein:
the attachment elements comprise a fastener selected from the group of a lug nut and a lug bolt; and
the mounting features comprise conical chamfers.

6. The wheel of claim 1 wherein:
the attachment elements further comprise a quick-release mechanism.

7. The wheel of claim 1 wherein:
the annular module comprises at least one orientation feature and the user-detachable hub module comprises at least one orientation feature wherein said annular module orientation feature and said user-detachable hub module orientation feature are configured for consistent attachment of the same mounting feature of the hub module to the same connection feature on the annular module.

8. The wheel of claim 1 wherein:
the mounting features on the hub are located on a monolithic mounting frame; and
the mounting frame comprises ribs that run directly between the mounting features.

9. The wheel of claim 1 wherein:
the hub further comprises a brake disk configured for use with a disk brake caliper located on the frame of the human-powerable vehicle.

10. The wheel of claim 1 wherein:
the human-powerable vehicle comprises a human-powerable bicycle; and
axle of the hub is configured for attachment to the front fork of a human-powerable bicycle frame wherein one end of the axle attaches to one leg of the front fork and the other end of the axle attaches to the other leg of the front fork.

11. The wheel of claim 1 wherein:
the attachment elements comprise helical thread; and
the included angle of the conical frustum surface is 60 degrees.

12. The wheel of claim 1 wherein:
the attachment elements comprise a fastener selected from the group of a lug nut and a lug bolt; and
the connection features comprise conical chamfers.

13. The wheel of claim 1 wherein:
the human-powerable vehicle comprises a human-powerable bicycle; and
axle of the hub is configured for attachment to a rear triangle of a human-powerable bicycle frame wherein one end of the axle attaches to a drive side rear dropout and the other end of the axle attaches to a non-drive side rear dropout.

14. The wheel of claim 1 wherein:
the human-powerable vehicle comprises a human-powerable bicycle; and
axle of the hub is configured for attachment at only one side to the front fork of a human-powerable bicycle frame.

15. A system for a human powerable bicycle comprising:
a hub comprising:
an axle configured for attachment to the frame of the bicycle;
a sleeve that surrounds at least part of the axle;
at least one bearing that rotationally couples the axle to the sleeve;
at least three mounting regions that are fixedly connected to the sleeve, wherein the mounting regions are configured for detachably attaching an annular module to the hub;
the annular module comprising:
a plurality of first spoke attachment points located on a first plane, wherein the first plane is perpendicular to the central axis of rotation the axle, and the first spoke attachment points are in a circular configuration;
a plurality of second spoke attachment points located on a second plane, wherein the second plane is perpendicular to the axis of rotation of the axle and offset and parallel to the first plane, and the second spoke attachment points are in a circular configuration; and
at least three hub attachment regions;

at least three attachment elements with conical surfaces wherein the attachment elements are configured for:
  user attachment and detachment of the hub to the annular module; and
  applying an axial force pressing the hub against the annular module; and
wherein the conical surfaces are configured for:
  radially aligning the hub with the annular module.

16. The system of claim 15 wherein:
the hub is configured for placement at least partially inside a central aperture of the annular module; and
the hub attachment regions are located closer to the center of rotation of the rim than the first spoke attachment points and the second spoke attachment points.

17. The system of claim 15 wherein:
the system further comprises the spokes and the rim;
the central axis of rotation of the rim is aligned with the central axis of rotation of the annular module;
the conical surfaces are conical frustum surfaces;
the conical frustum surfaces are further configured for:
  transmitting a radial force between the hub module and the annular module in a plane perpendicular to the axis of rotation of the rim; and
  radially aligning the axis of rotation of the hub module with the axis of rotation of the rim.

18. The system of claim 15 wherein:
the hub module attachment points are located closer to the center of rotation of the rim.

19. A method for user attachment of a removable hub to a wheel of a human powerable vehicle, the method comprising the steps of:
  establishing a hub configured for attachment to a frame of the human powerable vehicle, wherein the hub comprises:
    an axle configured for attachment to the frame;
    a sleeve that surrounds at least part of the axle;
    at least one bearing that rotationally couples the axle to the sleeve;
    at least three mounting regions that are connected to the sleeve; and
  detachably attaching an annular module to the mounting regions wherein:
    the annular module comprises:
      a plurality of first spoke attachment points located on a first plane, wherein the first plane is perpendicular to the central axis of rotation the axle, and the first spoke attachment points are in a circular configuration;
      a plurality of second spoke attachment points located on a second plane, wherein the second plane is perpendicular to the axis of rotation of the axle and offset and parallel to the first plane, and the second spoke attachment points are in a circular configuration; and
    detachably attaching comprises:
      the use of at least three attachment elements that comprise conical surfaces;
      applying an axial force pressing the hub against the annular module; and
      radially aligning the hub with the annular module; and
    the attachment elements comprise conical surfaces.

20. The method of claim 19 wherein:
the wheel further comprises a rim and spokes wherein the spokes connect the spoke attachment points to the rim; and
the method further comprises the following steps for truing the wheel for correct dish, correct spoke tension, minimized eccentricity, and minimized wobble after repeated detachment and attachment of the annular module to the mounting regions:
  establishing an orientation feature on the hub;
  establishing an orientation feature on the annular module;
  aligning the hub orientation feature with the annular module orientation feature;
  using the attachment elements to attach the hub to the annular module;
  adjusting spoke tension to be approximately 100 kilograms for force and the approximately the same for all spokes;
  adjusting the dish of the hub by increasing the tension of the spokes connected to the plane, and reducing the tension of the spokes connected to the second plane to move the center of the rim closer to the first plane, or vice versa to move the center of the rim closer to the second plane;
  improving the concentricity of the rim relative to the hub by tightening the spokes on one clock position and loosening the spokes at the opposite clock position to bring the center of rotation of the rim closer to the center of rotation of the axle; and
  minimizing wobble of the rim by tightening the left-side spokes relative to the right-side spokes in a region to pull a region of the rim leftwards or vice versa.

* * * * *